(12) United States Patent
Okutsu et al.

(10) Patent No.: US 8,046,756 B2
(45) Date of Patent: Oct. 25, 2011

(54) MULTIFUNCTION PROCESSING APPARATUS AND CONTROL METHOD THEREOF

(75) Inventors: Toshihisa Okutsu, Kawasaki (JP); Junichi Goda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1184 days.

(21) Appl. No.: 11/679,304

(22) Filed: Feb. 27, 2007

(65) Prior Publication Data

US 2007/0201092 A1    Aug. 30, 2007

(30) Foreign Application Priority Data

Feb. 28, 2006  (JP) ................................. 2006-053803

(51) Int. Cl.
*G06F 9/44*    (2006.01)
(52) U.S. Cl. ...................................................... 717/178
(58) Field of Classification Search .................. 717/168, 717/169
See application file for complete search history.

(56) References Cited

U.S. PATENT DOCUMENTS

| | | | | |
|---|---|---|---|---|
| 5,504,903 A * | 4/1996 | Chen et al. | ......................... | 713/1 |
| 5,828,664 A * | 10/1998 | Weir | ............................. | 370/375 |
| 6,714,983 B1 * | 3/2004 | Koenck et al. | ................. | 709/230 |
| 2004/0205261 A1 * | 10/2004 | Osada | ............................... | 710/8 |
| 2010/0010706 A1 * | 1/2010 | Gormley | ......................... | 701/33 |

FOREIGN PATENT DOCUMENTS

JP   2004-213469 A   7/2004

OTHER PUBLICATIONS

Kikuchi, Masahiko "Output Terminal Device, Control Device Thereof, Program for Causing Computer to Control the Same and Recording Medium", Japanese Patent, Jul. 4, 2003, p. 1-37.*

* cited by examiner

*Primary Examiner* — Anna Deng
(74) *Attorney, Agent, or Firm* — Rossi, Kimms & McDowell LLP

(57) ABSTRACT

A program that is to be preferentially loaded into a memory is stored in a specific memory and the program stored in the specific memory is changeable to another program. Thus, the program that is to be preferentially loaded into the memory is thereby made changeable.

13 Claims, 56 Drawing Sheets

FIG. 4

| FUNCTION LOADING TABLE | | | 1600 |
|---|---|---|---|
| IDENTIFICATION NUMBER | FUNCTION NAME | PREFERENTIAL FUNCTION FLAG | LOADED FLAG |
| 0 | COPY | true | false |
| 1 | FAX | false | false |
| 2 | SCAN | false | false |
| 3 | PRINT | false | false |

FIG. 13

| FUNCTION LOADING TABLE | | | 1600 |
|---|---|---|---|
| IDENTIFICATION NUMBER | FUNCTION NAME | PREFERENTIAL FUNCTION FLAG | LOADED FLAG |
| 0 | COPY | false | true |
| 1 | FAX | false | true |
| 2 | SCAN | true | true |
| 3 | PRINT | false | true |

FIG. 15

| PREFERENTIAL FUNCTION TIME TABLE | 1652 |
|---|---|
| TIME | PREFERENTIAL FUNCTION NAME |
| 0~5 | FAX |
| 5~9 | COPY |
| 9~11 | PRINT |
| 11~14 | COPY |
| 14~17 | SCAN |
| 17~21 | PRINT |
| 21~0 | FAX |

FIG. 17

| Time | PREFERENTIAL FUNCTION | CONDITION |
|---|---|---|
| 5:00 | | |
| 6:00 | COPY | TURN POWER OFF |
| 7:00 | | |
| 8:00 | | TURN POWER ON UPON COMING INTO OFFICE IN MORNING, AND COPY MATERIAL FOR MORNING MEETING |
| 9:00 | PRINT | TURN POWER OFF |
| 10:00 | | PRINT OUT CHECKED E-MAIL |
| 11:00 | | TURN POWER OFF |
| 12:00 | COPY | LUNCH BREAK, COPY DOCUMENTS TO BE DISTRIBUTED DURING AFTERNOON MEETING |
| 13:00 | | TURN POWER OFF |
| 14:00 | | |
| 15:00 | SCAN | AFTER MEETING, SCAN RECEIVED DOCUMENTS TO BE DISTRIBUTED |
| 16:00 | | |
| 17:00 | PRINT | TURN POWER OFF |
| 18:00 | | |
| 19:00 | | PRINT MATERIAL FOR TOMORROW'S MEETING FOR CHECKING |
| 20:00 | FAX | |
| 21:00 | | |
| 22:00 | | |
| 23:00 | | |
| 0:00 | | TURN POWER OFF |
| 1:00 | | |
| 2:00 | | |
| 3:00 | | |
| 4:00 | | |

F I G. 18
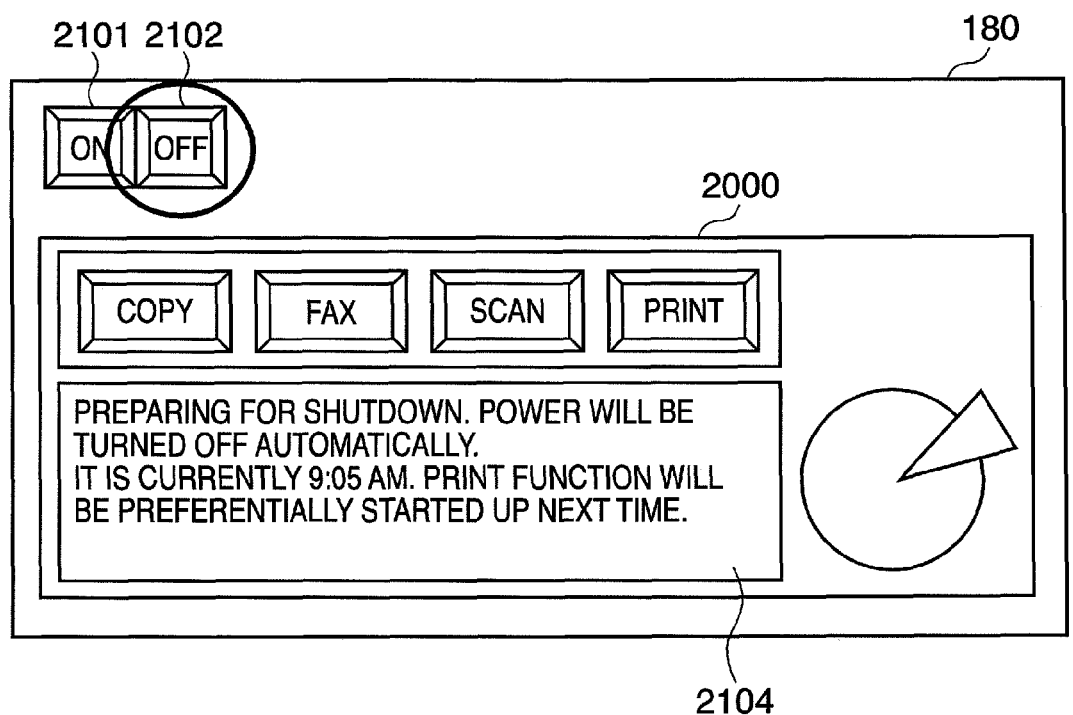

FIG. 20

| FUNCTION LOADING TABLE | | | 1600 |
|---|---|---|---|
| IDENTIFICATION NUMBER | FUNCTION NAME | PREFERENTIAL FUNCTION FLAG | LOADED FLAG |
| 0 | COPY | false | true |
| 1 | FAX | false | true |
| 2 | SCAN | false | true |
| 3 | PRINT | true | true |

FIG. 22

| FIRST ACTIVATED FUNCTION DATA STORAGE | | ~1740 |
|---|---|---|
| FUNCTION NAME | PREFERENTIAL FUNCTION FLAG | |
| COPY | true | |
| FAX | false | |
| SCAN | false | |
| SEND | false | |

F I G. 33B
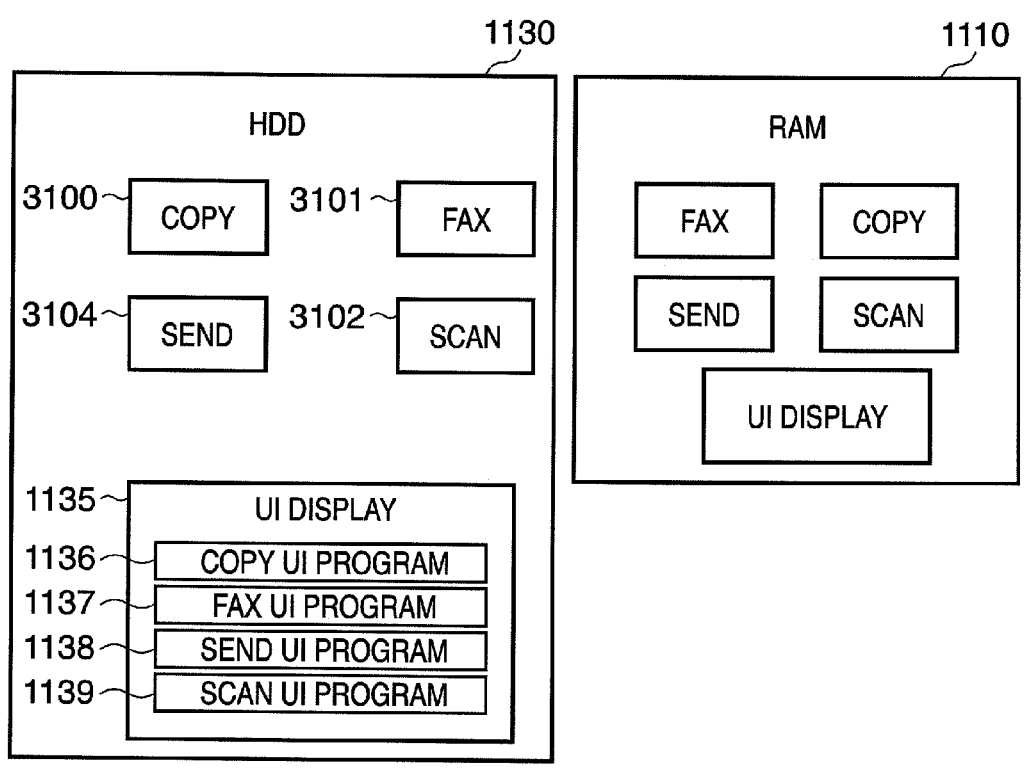

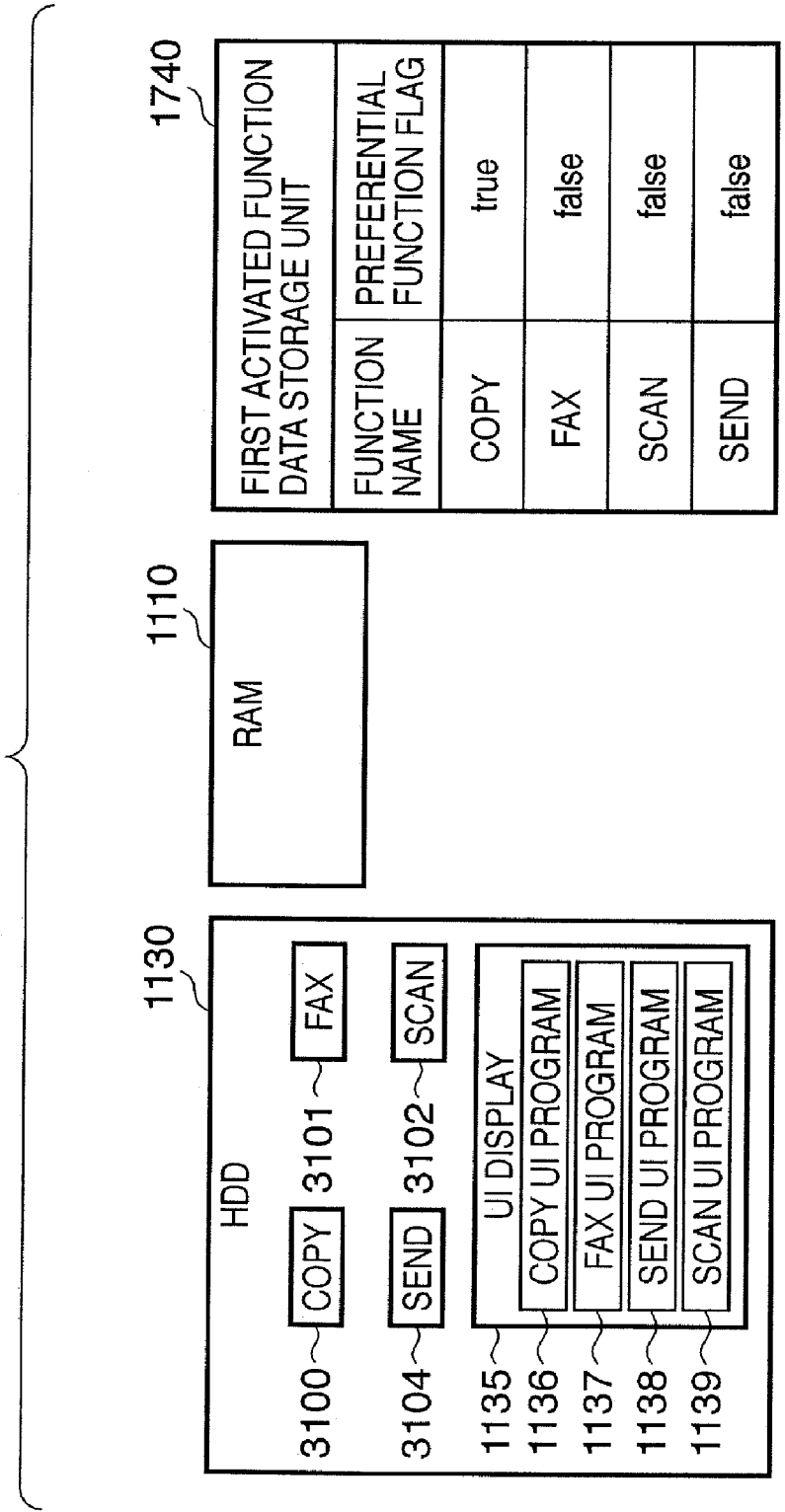

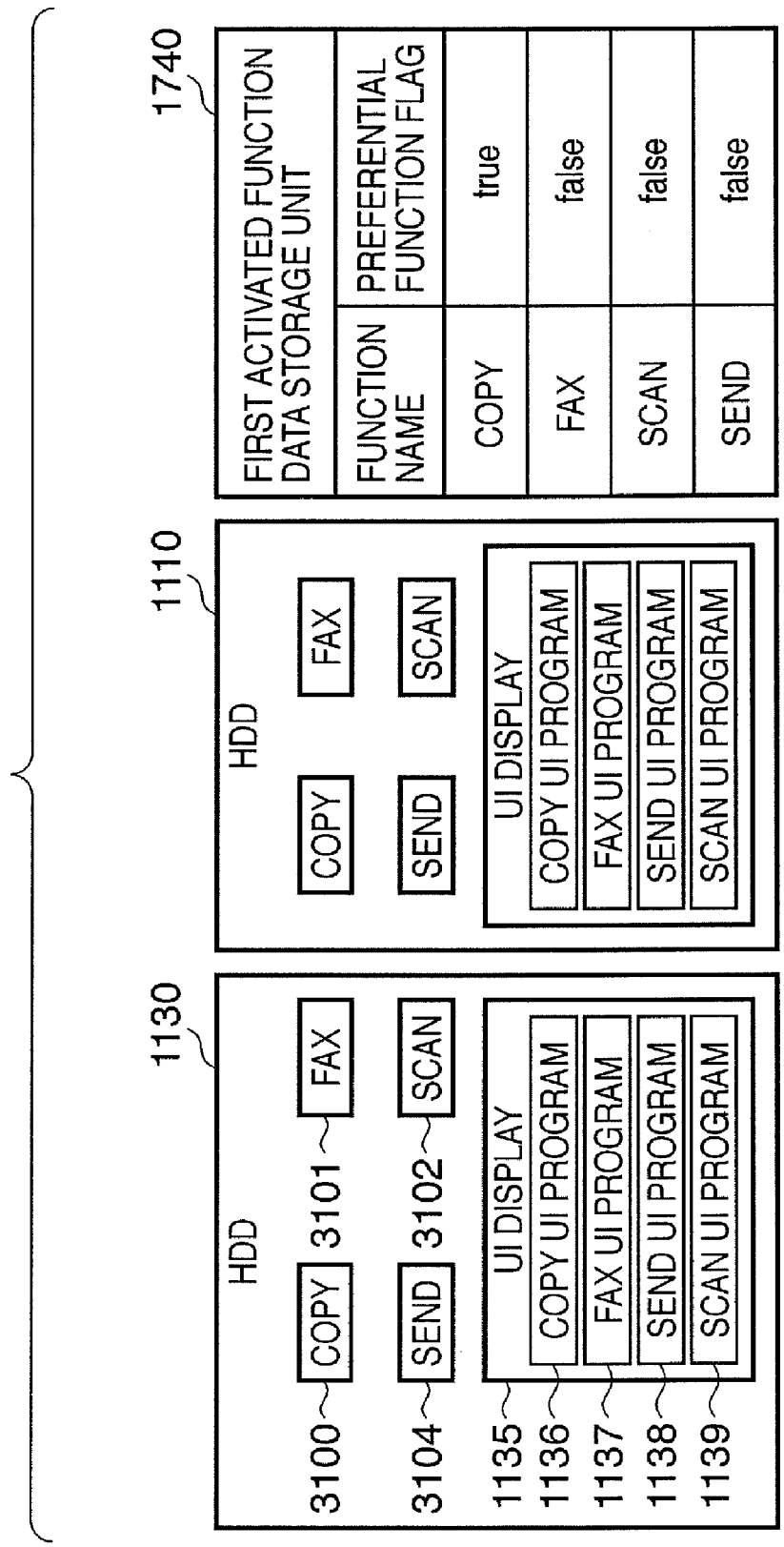

FIG. 38

| FIRST ACTIVATED FUNCTION LOG STORAGE UNIT | | 1720 |
|---|---|---|
| FUNCTION NAME | NUMBER OF TIMES USED | LOADED FLAG |
| COPY | 100 | false |
| FAX | 20 | false |
| SCAN | 50 | false |
| SEND | 80 | false |

MULTIFUNCTION PROCESSING APPARATUS AND CONTROL METHOD THEREOF

BACKGROUND OF THE INVENTION

1. Field of the Invention

The present invention relates to an apparatus which can execute a plurality of functions and a control method thereof.

2. Description of the Related Art

Programs of an apparatus, typified by an apparatus such as a digital multifunction peripheral, are stored on a hard disk apparatus in binary format, loaded into RAM when being executed, and executed under the control of the CPU. In particular, these programs comprise a plurality of functions, and the capacity of total program data tends to increase as the digital multifunction peripheral increases in performance and function. In a case that the size of program data increases in this manner, the time required to read out the program from the hard disk apparatus and store it in RAM becomes longer, leading to a longer wait until it is possible for the user to begin use. Even if a user wishes to use only a part of the digital multifunction peripheral, the user must wait until programs for all functions are loaded into RAM. In order to solve this type of problem, it is possible, for example, to prepare a program of small size for any particular function, as disclosed in Japanese Patent Laid-Open Publication No. 2004-213469. This document discloses a method in which a program is loaded exclusively for each function of the digital multifunction peripheral to be executed. By loading a program restricted to a specific function, the time required to start up the digital multifunction peripheral can be shortened.

However, since it is conventional for a digital multifunction peripheral to make it possible for all functions to be used, the art of exclusively loading a program each time a function is used is not a solution to the above problem. This is because programs that have been set not to be started up will not be started up even if the user requests the function executed by the program. In other words, if the user uses the above conventional art to make it possible to use only a particular function (for example, the copy function), functions other than copying cannot be used under that condition.

A means to solve the above problem involves the "division of program" and the "program storage medium" configurations. These configurations allow preferred functions to be made quickly usable by storing the corresponding programs in a flash memory, while the remaining programs are stored on the hard disk. When the digital multifunction peripheral is started up, programs corresponding to the preferred function is rapidly loaded into a memory from flash memory and made executable, and subsequently programs for executing the remaining functions are successively loaded into the memory from the hard disk, making each function effective. However, if the programs to be stored in a flash memory are fixed, the functions to be made preferentially usable after starting up the digital multifunction peripheral will always be the same, and there may be cases in which functions that differ from the functions that the user desires are preferentially started up.

SUMMARY OF THE INVENTION

The object of the present invention is to solve the above conventional problems.

The present invention provides an apparatus and a control method which make it possible to change the program to be preferentially loaded in a memory, and further increases the convenience to the user.

According to an aspect of the present invention, there is provided an apparatus capable of executing a plurality of functions, comprising;

a first storage unit configured to store a plurality of programs corresponding respectively to a plurality of functions;

a second storage unit configured to store a first program to be preferentially loaded into a memory for implementing the program, among the plurality of programs;

a first load control unit configured to load the first program stored in the second storage unit into the memory;

a second load control unit configured to load a second program stored in the first storage unit which differs from the first program stored in the second storage unit into the memory, after loading the first program stored in the second storage unit into the memory; and a change unit configured to change the first program stored in the second storage unit for another program being different from the first program and stored in the first storage unit.

According to an aspect of the present invention, there is provided A method for controlling an apparatus having a first storage unit for storing a plurality of programs which correspond respectively to a plurality of functions, comprising;

a first load step of preferentially loading into a memory a first program stored in a second storage unit storing a program to be preferentially started up out of the plurality of programs;

a second load step of loading, after the first program stored in the second storage unit has been loaded into the memory, a second program stored in the first storage unit that differs from the first program stored in the second storage unit into the memory; and a change step of changing the first program stored in the second storage unit for another program stored in the first storage unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing an example of entry of a function load table according to the first embodiment.

FIG. 13 is a diagram showing updating of a preference flag in a function load table of the digital multifunction peripheral according to the first embodiment.

FIG. 15 is a diagram showing an example of a time-related preferential function table according to the second embodiment.

FIG. 17 is a diagram showing an example of a usage configuration of a time and preferential function of the digital multifunction peripheral according to the second embodiment of the present invention.

FIG. 18 is a diagram showing a console unit which displays at the time of power off processing a preferential function to be loaded the next time.

FIG. 20 is a diagram showing an example of a function load table after power off processing according to the second embodiment.

FIG. 22 is a diagram showing an example of data stored in a first activated function data storage unit according to the third embodiment.

FIGS. 32A, 32B and FIGS. 33A, 33B are diagrams showing a state of a CPU loading from HDD to RAM split program configurations of the digital multifunction peripheral according to the fourth embodiment.

FIGS. 35A, 35B, and 35C are diagrams showing a state of the HDD, RAM, and first activated function data storage unit of the digital multifunction peripheral according to a fourth embodiment.

FIG. 38 is a diagram showing a data example of a first activated function log storage unit according to a fifth embodiment of the present invention.

DESCRIPTION OF THE EMBODIMENTS

Preferred embodiments of the present invention will be described in detail below with reference to the attached drawings. While the present invention has been described with reference to exemplary embodiments, it is to be understood that the invention is not limited to the disclosed exemplary embodiments. Moreover, it is not necessarily the case that all of the combinations of characteristics shown in the embodiments are means to solve the present invention. In addition, the embodiment will be explained using the example of a digital multifunction peripheral, but the present invention is not restricted to this apparatus only. For example, the present invention can be applied to an image formation apparatus or an image scanning apparatus with a coordinate input mechanism, or a display apparatus.

Figure 1:
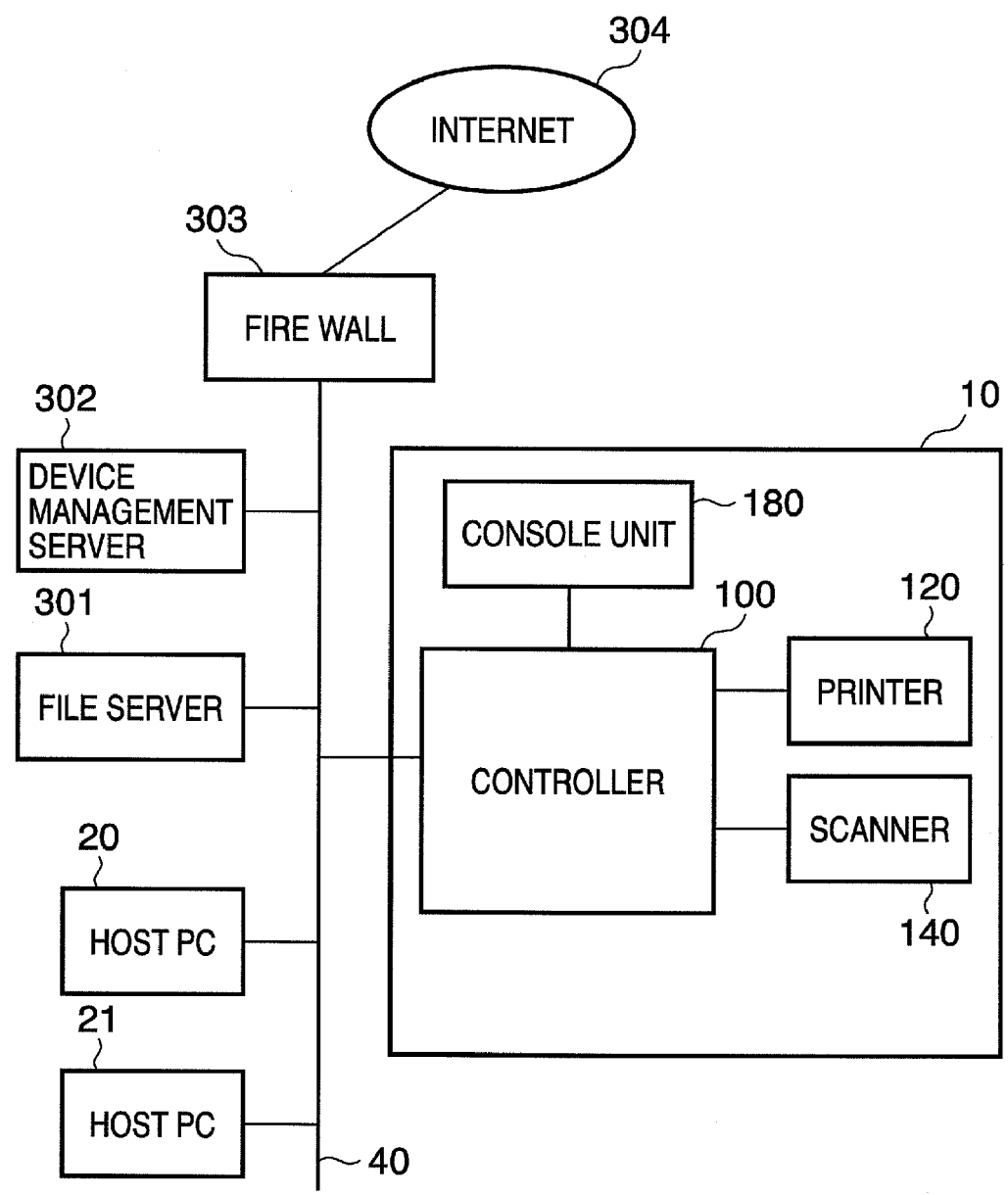
FIG. 1 is a diagram showing a system configuration based on a digital multifunction peripheral according to an embodiment of the present invention.

FIG. 1 is a diagram showing a system configuration based on a digital multifunction peripheral according to an embodiment of the present invention.

Reference numeral 304 in FIG. 1 is an Internet communication network. A firewall 303 connects the Internet 304 to a LAN 40, and executes such activities as security management. A device management server 302 manages a digital multifunction peripheral 10 and a host PCs 20 and 21 connected to the LAN 40. A file server 301 manages access to files so that a plurality of users connected via the LAN 40 may share file data.

A digital multifunction peripheral 10 has a function of copying documents (copy function), a function of sending and receiving facsimiles (FAX), a function as a printer (printer function), and a function as a scanner (scanning). The configuration of the digital multifunction peripheral 10 will be described below. A console unit 180 has keys and buttons of various types which are user-operated, and a display unit 2104 (FIG. 5) which displays items such as messages sent to users. A scanner 140 scans an original and converts it to image data according to instructions from the console unit 180 or the host PCs 20 and 21. A printer 120 receives data from the host PC 20 or 21 or a file server 301 and prints it on a recording sheet. A controller 100 controls the input and output of image data to the scanner 140 and the printer 120 based no instructions from parts such as the console unit 180 and the host PCs 20 or 21. For example, the controller 100 accumulates in memory (not shown) inside the controller 100 image data generated by the scanner 140. Alternatively, the image data generated by the scanner 140 may be output to the host PCs 20 or 21, or controls printing by the printer 120. At the time of recovering from a power-saving mode, or power-on, or recovering from a sleep mode, this digital multifunction peripheral 10 is capable of preferentially starting up specific functions out of a plurality of functions such as copy, facsimile, scan, and print of the digital multifunction peripheral 10. Here, the sleep mode refers to a power-saving mode entered into by the digital multifunction peripheral 10.

First Embodiment

Figure 2:
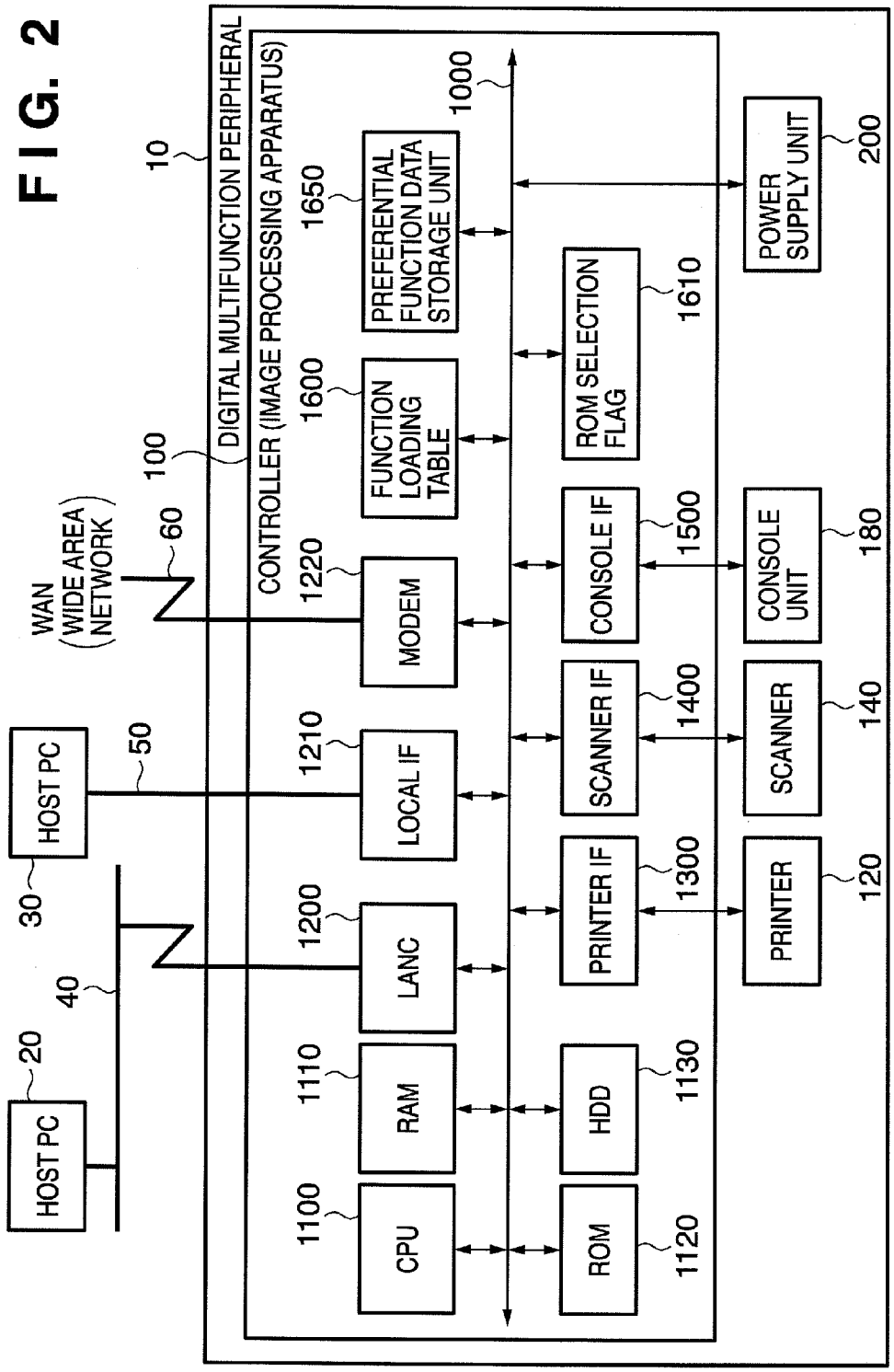
FIG. 2 is a block diagram showing configurations of a digital multifunction peripheral and controller according to a first embodiment.

FIG. 2 is a block diagram showing the configurations of the digital multifunction peripheral 10 and the controller 100 according to a first embodiment.

The controller 100 connects to the scanner 140, which is an image input device, and the printer 120, which is an image output device. Also, the controller 100 controls the input and output of image data and device information by connecting to the LAN 40 and the public communication line (WAN) 60. A CPU 1100 is a control unit which controls all of the digital multifunction peripheral 10. A RAM 1110 provides a work memory to temporarily store various data during operation of the CPU 1100, and provides an image memory to temporarily store image data. A ROM 1120 is boot ROM which stores a boot program of this digital multifunction peripheral 10. Further, the ROM 1120 stores system software that implements an effective function, that is, a program containing an operating system and functions. The RON 1120 is made of, e.g., flash memory, and writing data in the ROM 1120 is possible. The HDD 1130 is a hard disk drive which stores system software, image data, and software counter values. This system software is for implementing functions such as copying, faxing, scanning, and printing, and is loaded onto and operates on the RAM 1110. In addition, each function program has, in addition to a program to implement the function, data that is necessary for the implementation of the function. The software counter has a counter region for counting the number of pages to be printed sorted by paper size, and a counter region sorted by data processing volume. Thus, pre-set arbitrary reference values are counted up at each processing or printing, based on the number of images printed or data volume processed by the CPU 1100. The storage region for this counter value need not be confined to the HDD 1130 only, but any non-volatile memory can be used, e.g., EEPROM.

A LANC 1200 is connected to the LAN 40, and performs the input and output of image data for printing and information related to device control. The multifunction peripheral 10 receives image data via the LANC 1200, corresponding to the input operation by the console unit 180 from the host PC 20 or a printing image data management apparatus (not shown in drawings) connected to the LAN 40, and prints an image based on the image data. A local I/F 1210 is a USB or local I/F such as a USB or centero, and performs input and output of data by connecting to a host PC 30 or printer (not shown in drawings) via a cable 50. A modem 1220 is connected to a public communication line 60 and carries out input and output of data. A printer I/F 1300 connects to the printer 120 and carries out communication with the printer 120. A scanner I/F 1400 connects to the scanner 140, and carries out communication with the scanner 140. The printer I/F 1300 and the scanner I/F 1400 transfers image data synchronously with the operation of the scanner 140 or the printer 120 that is under control, or transfers image data asynchronously with respect to the operation of the scanner 140 or the printer 120. A console unit I/F 1500 is an interface unit with the console unit 180 and outputs to the console unit 180 image data displayed on the console unit 180. Moreover, the console unit I/F 1500 sends to the CPU 1100 data input by a user via the console unit 180.

A function load table 1600 stores in table format data indicating which of the copying, faxing, scanning, and printing functions of the digital multifunction peripheral 10 to preferentially start-up at the time of powering on or recovering from sleep mode the digital multifunction peripheral 10. The configuration of this table is described below. A ROM selection flag 1610 is a flag to sort the read destination of a function program. In a case that the RON selection flag 1610 is "true", the function program is loaded from the ROM 1120 and in a case that "false", the function program is loaded from the HDD 1130. A preferential function data storage unit 1650 is a characteristic part of the present embodiment, and stores data instructing which function to preferentially start-up when the power is turned on the next time. Specifically, the preferential function data storage unit 1650 stores the function names. The console unit 180 is equipped with an input unit such as a numerical keypad or a copy start button and a display unit with a liquid crystal display. Details of this console unit 180, including external appearance details, will be explained below. A power supply unit 200 supplies electric power to each part of the digital multifunction peripheral 10. A system bus 1000 is a bus which connects each of the above parts together and includes an address bus, data bus, and control signal bus.

Figure 3:
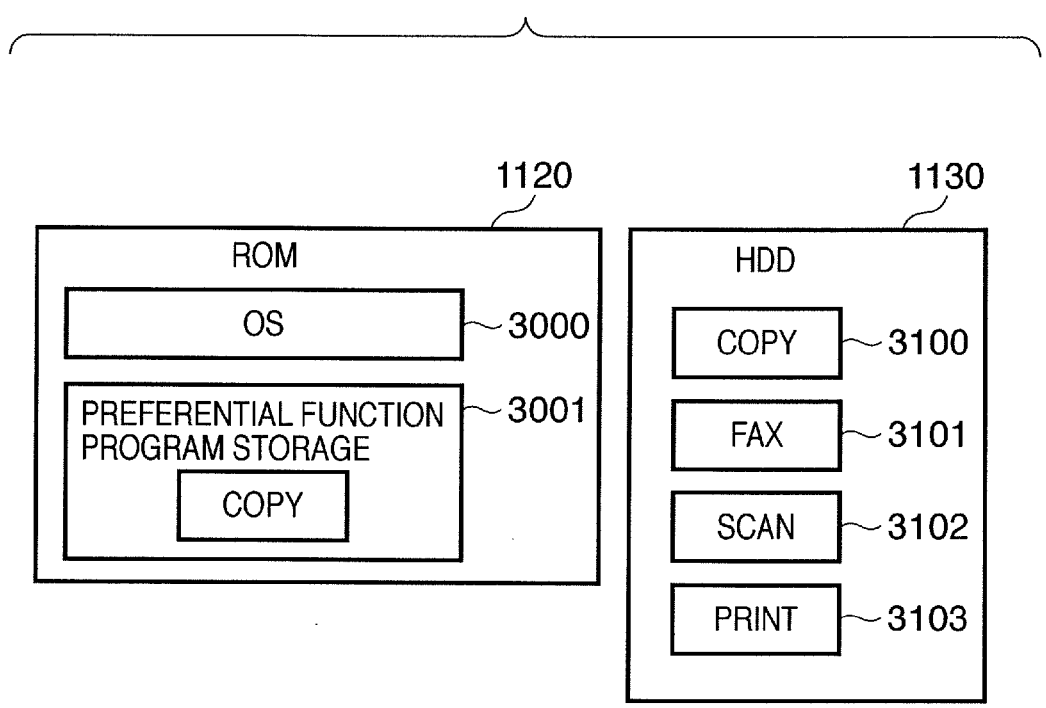
FIG. 3 is a diagram showing an example of storing a program for using a split program for fast start up of functions of the digital multifunction peripheral according to the first embodiment.

FIG. 3 is a diagram showing a storage example of a split program for rapidly starting up functions that are part of the digital multifunction peripheral according to the first embodiment. Here, programs for all functions are stored in the HDD 1130. The ROM 1120 stores programs that are preferentially started up. Here, an example of storing a program in the case where a digital multifunction peripheral 10 has copy, facsimile, scan and print functions will be described.

A brief description of a split program will now be provided. This is a technology in which a large program is divided into small modules, the divided binary modules are loaded successively onto the RAM 1110, and, whenever that load is finished, the functions corresponding to the modules are successively started up. In the present embodiment, this kind of split program configuration is included in the digital multifunction peripheral 10. By using this configuration, specific functions, e.g., copy function, can be preferentially started up after the power has been turned on, and, after that, successively starting up each of a plurality of functions according to a program load order, e.g., print, scan, and facsimile functions.

The ROM 1120 is equipped with an OS 3000 and a preferential function program storage 3001. A preferential function program storage 3001 stores in advance one of a plurality of programs stored in the HDD 1130. FIG. 3 shows a program for a copy function out of a plurality of functions in the HDD 1130 being stored in the preferential function program storage 3001. Moreover, depending on the volume of the preferential function program storage 3001 and the volume of the HDD 1130, more than one program can be stored in the preferential function program storage 3001. Also, the function name of the program(s) stored in the preferential function program storage 3001 is recorded in the preferential function data storage unit 1650.

To shorten the start up time in this manner, the medium storing the preferential program is made to be the ROM 1120, which is memory of fast operation typified by flash memory, etc., instead of the HDD 1130. In the case of a digital multifunction peripheral with many functions, in which programs are large in size, the HDD 1130 is used for temporarily storing processing data. Therefore, from the perspective of volume size necessary for a memory storage, it is disadvantageous from the viewpoint of cost to replace the HDD 1130 with non-volatile memory such as flash memory. For this reason, the digital multifunction peripheral 10 of the present embodiment is equipped with the ROM 1120 (flash memory) of comparatively smaller size and the HDD 1130.

The OS (Operating System) 3000 is a base program for controlling all of the digital multifunction peripheral 10. Reference numerals 3100 through 3103 are data and programs to execute, respectively, copy, facsimile, scan, and print functions. (In the present embodiment, a program and data for executing a copy function is called a copy program. A similar naming format will be used for other functions. For example, a program and data for executing a facsimile function is called a FAX program.)

When the digital multifunction peripheral 10 is turned on and started up, an OS including a boot program is loaded from the ROM 1120 into the RAM 1110. Next, programs stored in the preferential function program storage 3001 are loaded onto the RAM 1110. In addition, programs other than programs loaded from the preferential function program storage 3001 are loaded into the RAM 1110 from the HDD 1130. In this way, the CPU 1100 can make it possible to execute functions corresponding to these programs. Moreover, it becomes possible to use each program as each of a plurality of programs is loaded into the RAM 1110.

FIG. 4 depicts a view illustrating an example showing entry into the function load table 1600 according to the present embodiment.

The function load table 1600 comprises four items: an identification number, a function name, a preferential function flag, and a loaded flag. The function name is the name of the function; here, copy, FAX, scan, and print are included. The function names are names for identifying programs for implementing functions. The preferential function flag is a flag for indicating whether to make it possible to use as a preferential function, where if the flag is "true", the function is used as a preferential function. The loaded flag, if "true", indicates that the program for that function has already been loaded into the RAM 1110. Here, program load order is determined according to the identification number. Therefore, it is possible to alter the loading order of programs by changing the identification number in the table.

Figure 5:
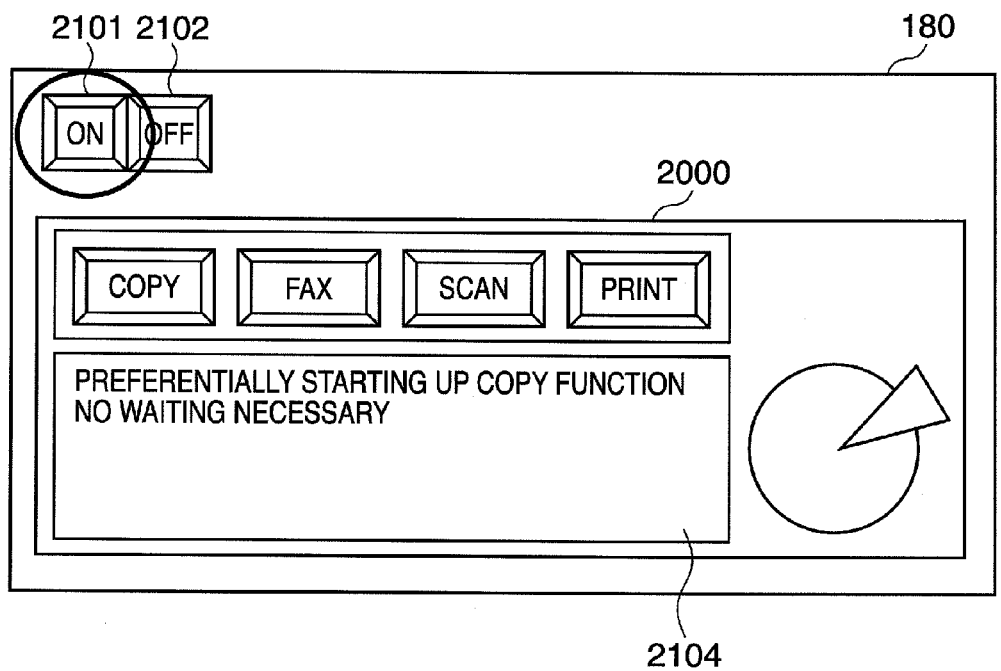
FIG. 5 depicts an external view of a console unit of the digital multifunction peripheral according to the first embodiment.

FIG. 5 depicts an external view of the console unit 180 of the digital multifunction peripheral 10 in the present embodiment.

The console unit 180 has an instruction section 2000, a power-on switch 2101, and a power-off switch 2102. The instruction section 2000 is equipped with a such parts as a numeral keypad and a copy start button as indicated above, and a display unit 2104 such as a liquid crystal display. Operating these switches and buttons leads to switching of functions that are used, start-up instructions being given, and display of status. Power-on of hardware is accomplished by pressing the power-on switch 2101. Power-off of hardware is accomplished by pressing the power-off switch 2102. FIG. 5 shows the situation in which the display unit 2104 displays a message ("in the process of preferentially starting up the copy function") preferentially making effective the copy function, when the user presses the power-on switch 2101. This is because, as indicated in FIGS. 3 and 4, the preferential flag corresponding to the copy function is set to "true", and the copy program is stored on the preferential function program storage 3001 of the RON 1120.

Figure 6:
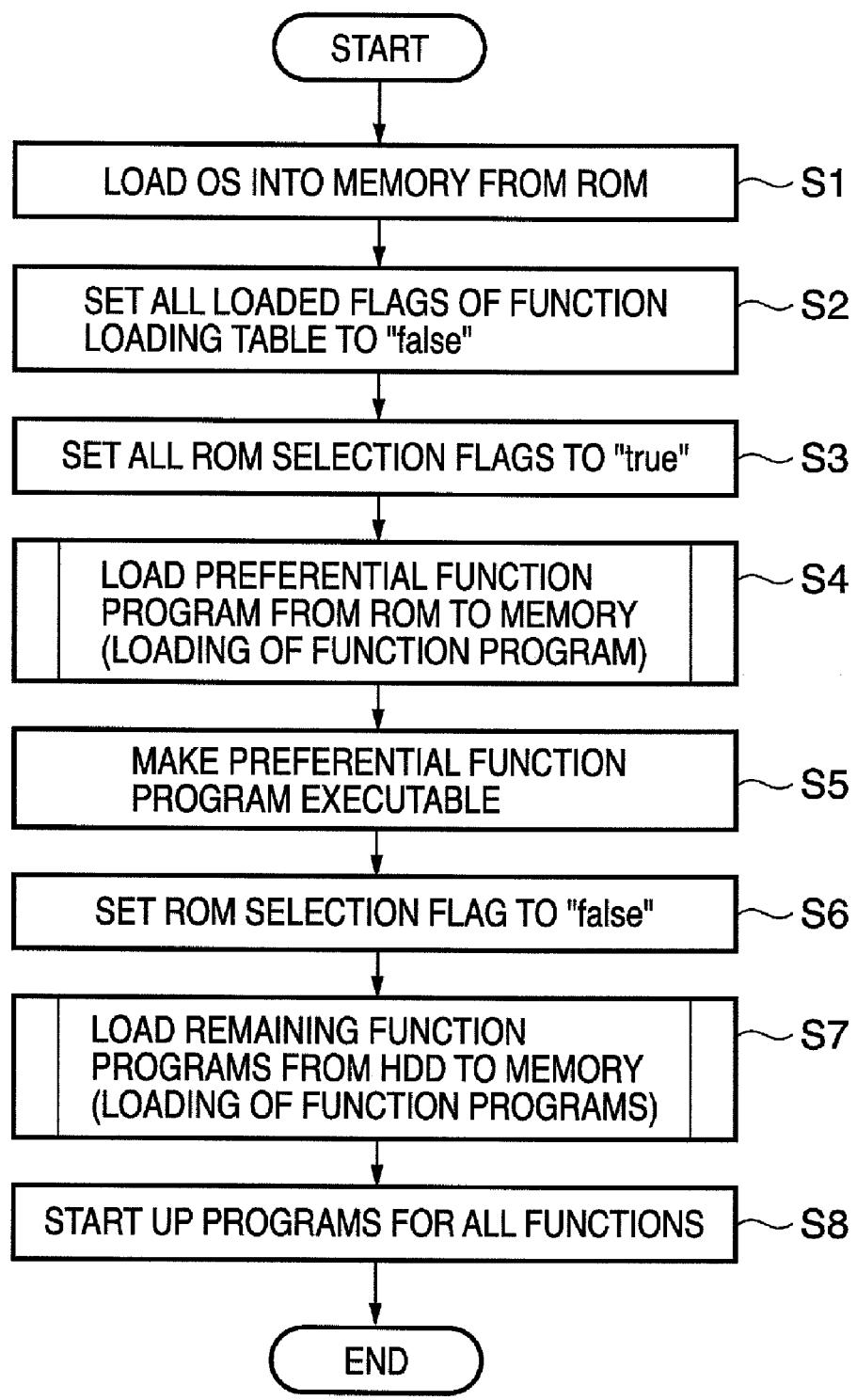
FIG. 6 is a flowchart showing a process for enabling the preferential use of specific functions of the digital multifunction peripheral according to the first embodiment.

FIG. 6 is a flowchart showing the process in which a specific function is preferentially made usable according to the digital multifunction peripheral 10 of the first embodiment. A program to execute this process is stored in the RON 1120, and is executed under the control of the CPU 1100. This process flowchart involves loading into the RAN 1110 a program of a specific function from the ROM 1120, according to the state of the function load table 1600, when a user powers on the digital multifunction peripheral 10, and makes that function effective. Next, programs for the remaining functions are loaded onto the RAM 1110 from the HDD 1130 and made successively effective, and the process is repeated until all functions of the digital multifunction peripheral 10 are enabled.

This process is started when a user powers on the digital multifunction peripheral 10. First, at Step S1, the OS 3000 stored in the ROM 1120 is loaded onto the RAM 1110. Next, at Step S2, loaded flags of the function load table 1600 are all set to "false". Then, at Step S3, the ROM selection flag 1610 is set to "true" and the process proceeds to Step S4. Step S4 is a subroutine which loads a preferential function program stored in the RON 1120 in the RAM 1110. This subroutine will be explained later.

The process then proceeds to Step S5, in which a program already loaded on the RAM 1110 is made executable. By executing Step S5, only the specific function (a copy function in the example of FIG. 4) designated by the function loading table 1600 is enabled for use. Next, at Step S6, the ROM selection flag 1610 is cleared by being set to "false". Then, at Step S7, programs stored in the HDD 1130 but has not been loaded into the RAM 1110 are successively loaded into the RAM 1110. This Step S7 is a subroutine whose process will be discussed later. Next, at Step S8, programs for all functions loaded into the RAM 1110 are started up and processed.

Figure 7:
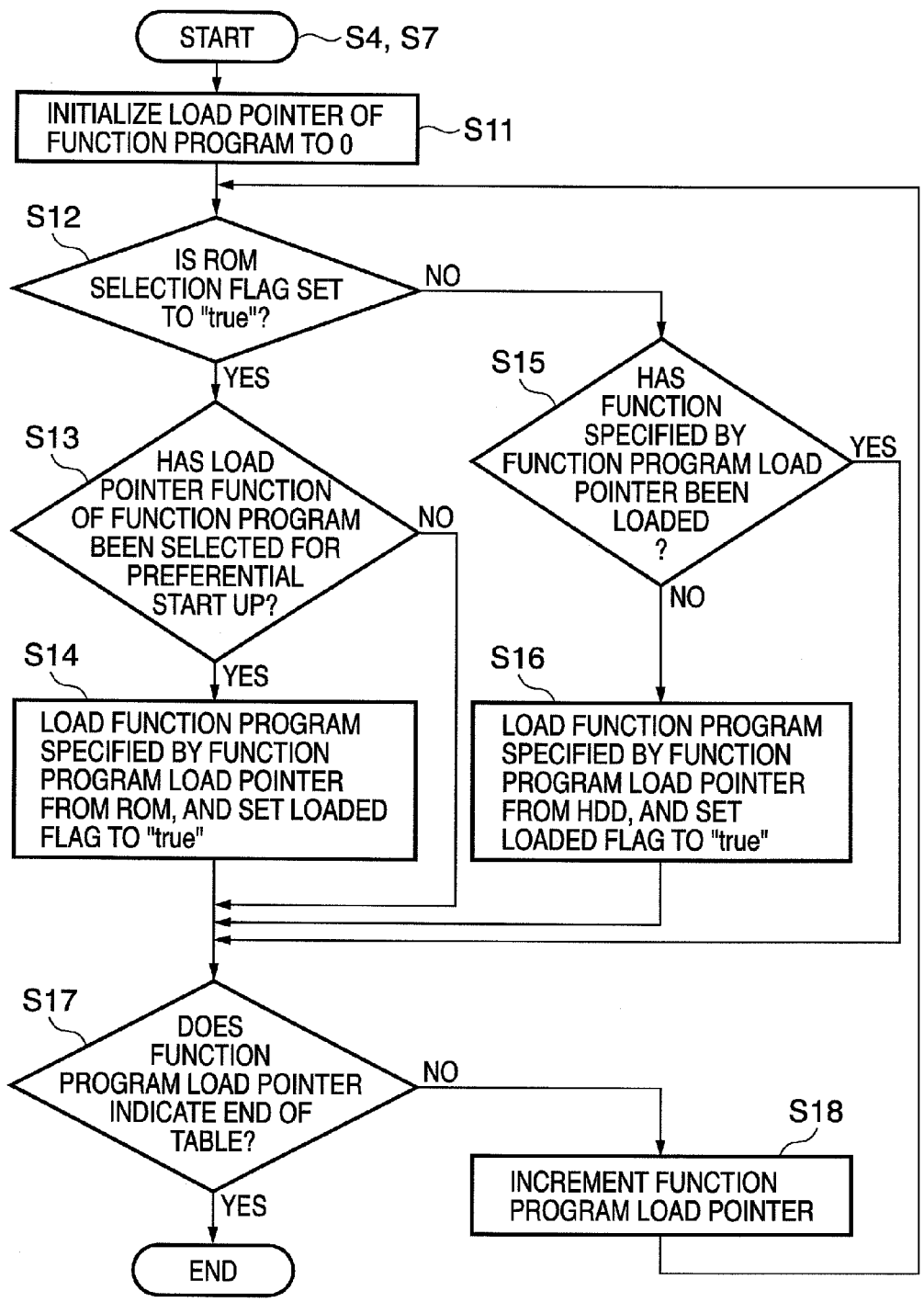
FIG. 7 is a flowchart showing a process for loading a program of a function of the digital multifunction peripheral into a RAM according to the first embodiment.

FIG. 7 is a flowchart showing the process (Steps S4 and S7 of FIG. 6) by which the digital multifunction peripheral 10 of the first embodiment loads a function program into the RAM 1110. A program to execute this process is stored in the ROM 1120, and is executed under the control of the CPU 1100.

The process shown in this flowchart involves loading a function program from the ROM 1120 or the HDD 1130 to the RAM 1110 and updating the condition of a loaded flag of the function loading table 1600, depending on the condition of the function loading table 1600 and the ROM selection flag 1610. Here, each program instructed to be loaded by a program load pointer is loaded if preferential startup is selected for that program. Moreover, when the ROM selection flag 1610 is not "true", a program that has not been loaded yet is loaded even if it has not been selected for preferential startup.

At Step S11, the program load pointer is reset to a value of 0. This program load pointer is an internal variable to be used for specifying the corresponding function name in the function loading table 1600. Here, for example, the above-mentioned identification number serves as a pointer to specify the function. Next, at Step S12, if the ROM selection flag 1610 is set to "true", the process proceeds to Step S13 because it is instructed that a program is loaded from the ROM 1120 into the RAM 1110. On the other hand, if the ROM selection flag 1610 is not "true", the process proceeds to Step S15 in order to load a program from the HDD 1130. At Step S13, it is determined whether the preferential function flag of the function specified by the program load pointer is set to "true". If "true", the process proceeds to Step S14 because preferential startup is selected (in the case of Step S4 of FIG. 6); otherwise (in the case of Step S7 of FIG. 6), the process proceeds to Step S17 from Step S13. At Step S14, the function program specified by the program load pointer is read out from the ROM 1120 and loaded into RAM 1110. Also, the loaded flag of that function is set to "true" and the process proceeds to Step S17.

On the other hand, at Step S15, it is determined whether the loaded flag of the function specified by the program load pointer is set to "true". If set to "true", the process proceeds to Step S17 since the program for that function is already loaded into RAM 1110, but if not, the process proceeds to Step S16, and the program for the function specified by the program load pointer is read out from the HDD 1130 and loaded into the RAM 1110. Moreover, the loaded flag of that function is set to "true" and the process proceeds to Step S17. At Step S17, the process is ended if the value of the program load pointer specifies the last identification number ("3" in the example of FIG. 4), of the function loading table. If not, the process proceeds to Step S18, and the process returns to the Step S12 after incrementing (+1) the program load pointer.

Figure 8A:
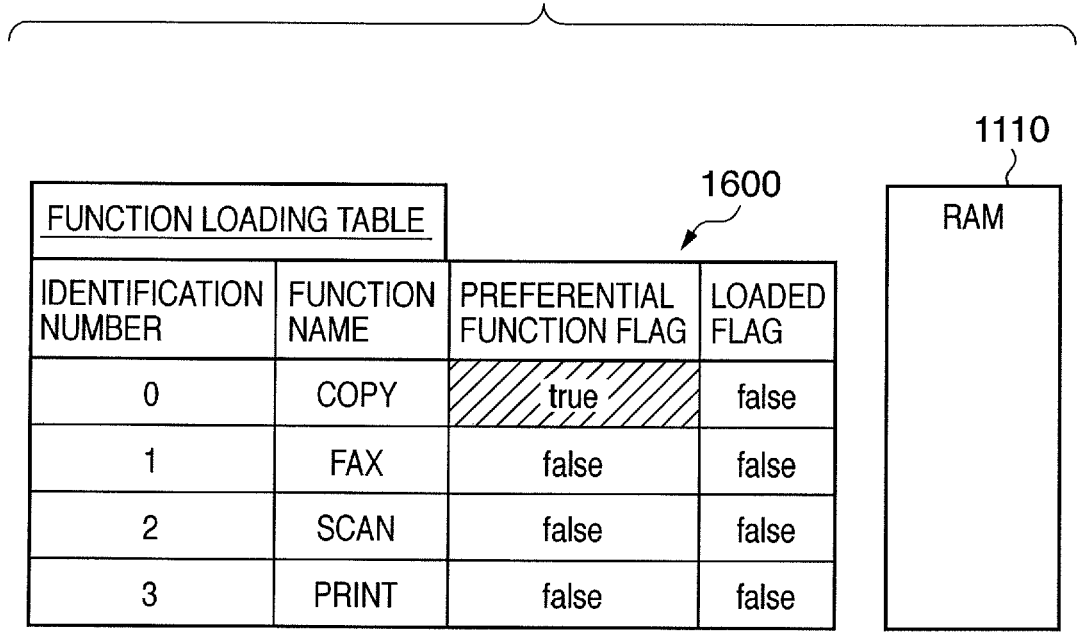
FIGS. 8A, 8B, and 8C are diagrams showing a situation in which a program for a function is loaded into a work memory region of RAM by a CPU in the digital multifunction peripheral according to the first embodiment.
Figure 8B:
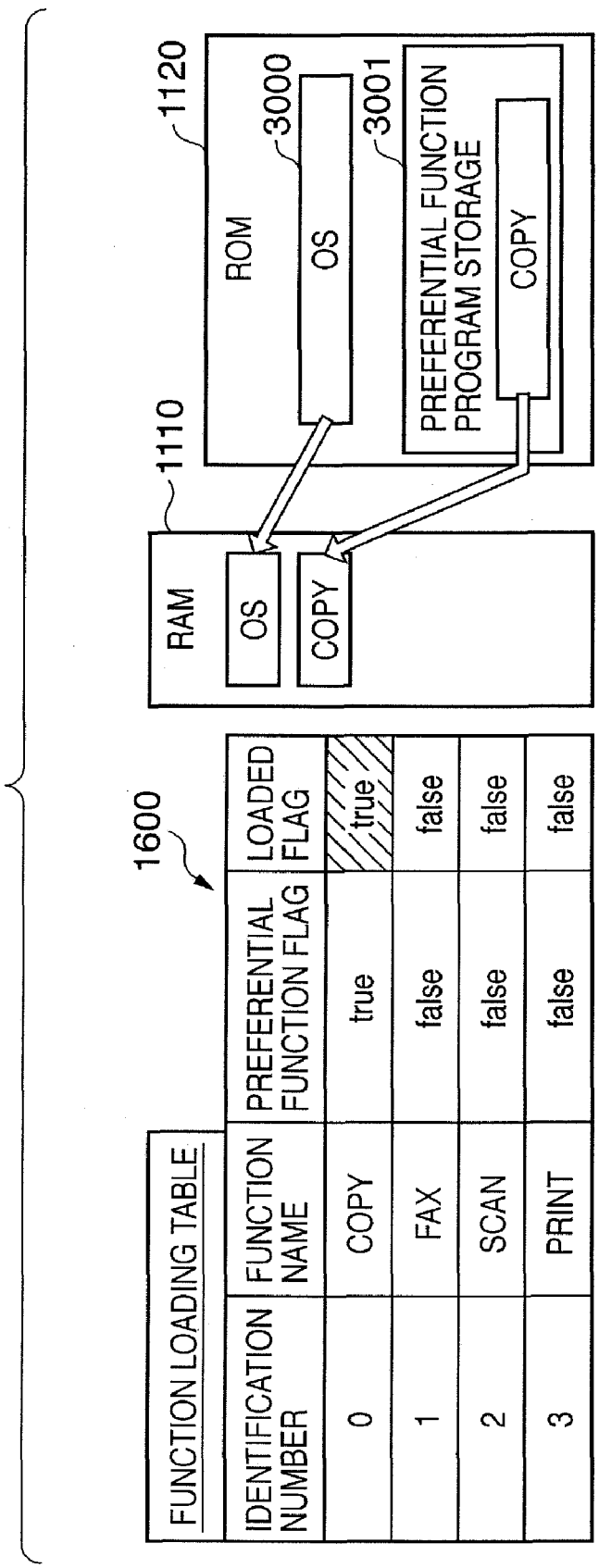
Figure 8C:
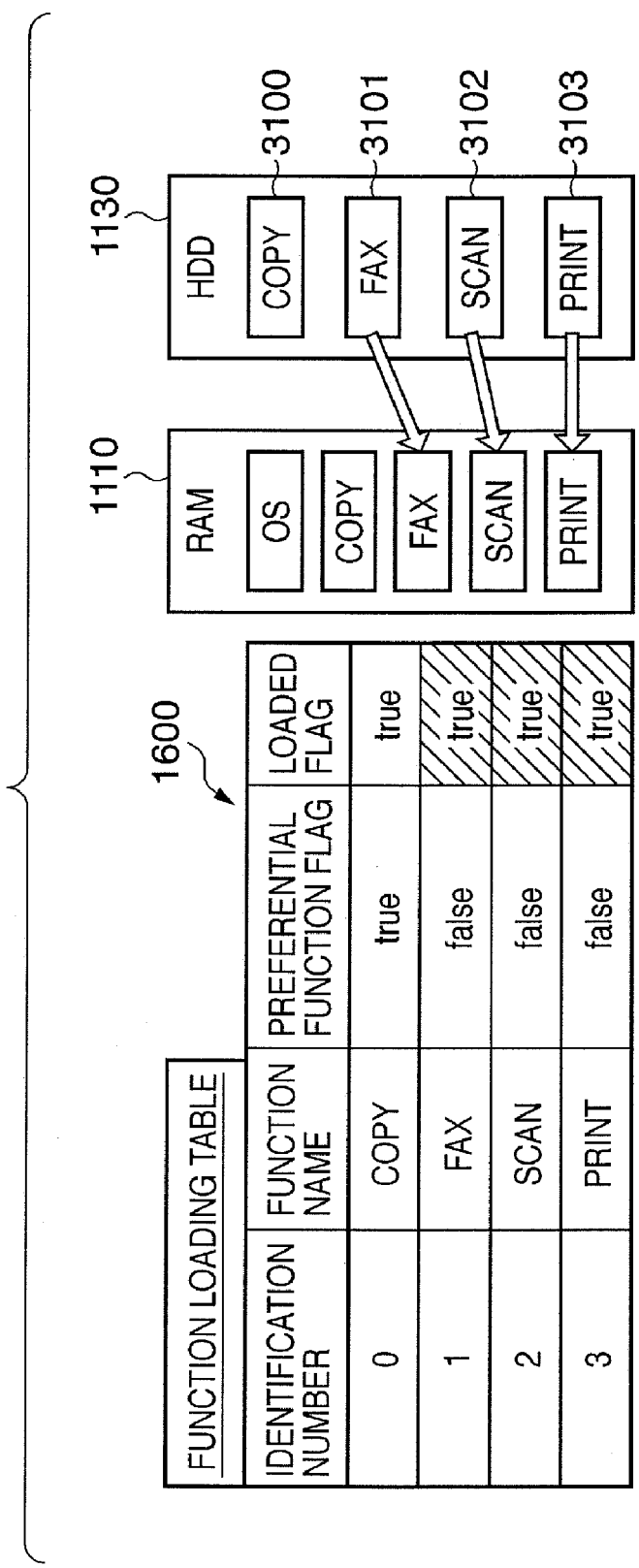

FIGS. 8A-8C depict views illustrating the situation in which the CPU 1100 loads programs into the work memory area of the RAM 1110, in the digital multifunction peripheral 10 according to the first embodiment.

FIG. 8A shows the condition before the power of the digital multifunction peripheral 10 is turned on, and every function program is loaded into the RAM 1110 from the ROM 1120 and the HDD 1130. Therefore, this indicates the state of having processed up to Step S2 of the flowchart of FIG. 6. The state of the function loading table 1600 is set to "true" so that the copy function with an identification number of "0" becomes the preferential function. In this condition, there are no functions that has been loaded into the RAM 1110.

FIG. 8B is a diagram showing the condition in which the power on switch 2101 is pressed, the OS and copy function program are copied from the ROM 1120 to the RAM 1110, and the preferential function (copy) has been executed. This corresponds to the situation in which the process up to Step S5 of the flowchart has been completed. In this condition, because the copy function program has been developed to the RAM 1110, which is the main memory, the copy function can be only executed even if other programs are not loaded. Moreover, in this FIG. 8B, as the copy function program for executing the copy function has been loaded, only the loaded flag of the copy function of the function loading table 1600 has been set to "true".

FIG. 8C is a diagram showing the condition in which all function programs of the digital multifunction peripheral 10 have been loaded into the RAM 1110 from the HDD 1130. This corresponds to the situation in which the process up to Step S8 of the flowchart in FIG. 6 has been completed. In this condition, executing all functions of the digital multifunction peripheral 10 is possible. Moreover, since all function programs are loaded in this FIG. 8C., all of the loaded flags of the function loading table 1600 are set to "true".

Figure 9:
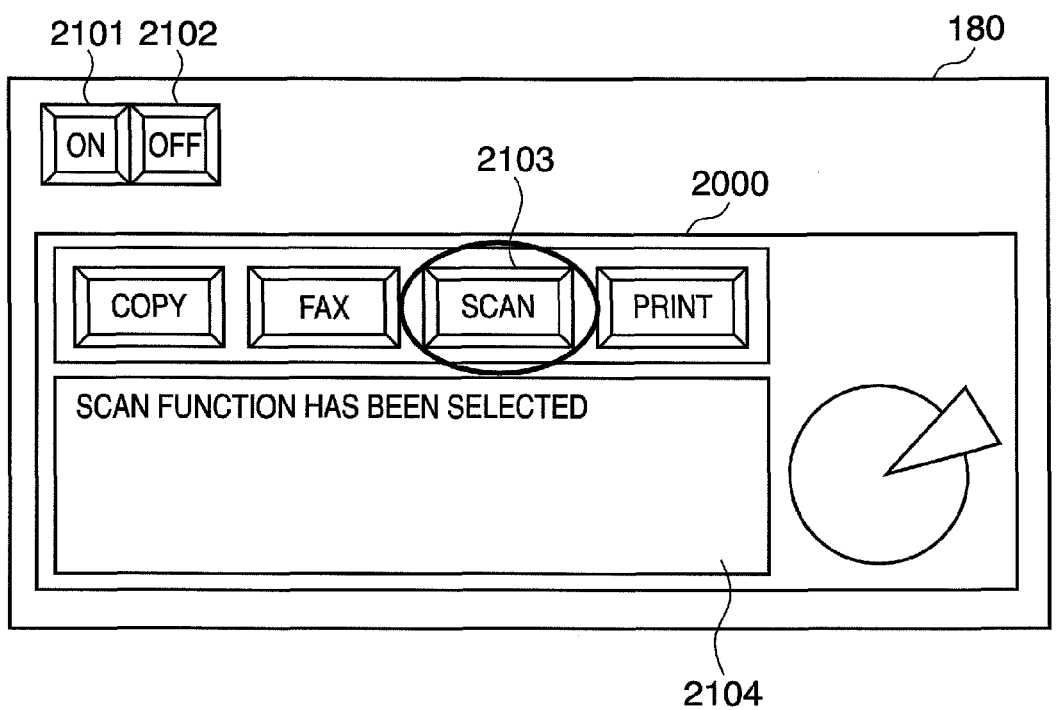
FIG. 9 is a diagram showing a console unit upon selecting a scan function in the digital multifunction peripheral according to the first embodiment.

FIG. 9 is a diagram showing the state of the console unit 180, in a case that the scan function has been selected in the digital multifunction peripheral 10 of the first embodiment.

Here, the operation of the console unit 180 is shown in a case that a user uses the scan function. If the user presses a "scan" function selection button 2103 of the instruction section 2000 of the console unit 180, the display unit 2104 displays "The Scan function has been selected." In this way, it is identified that the scan function has been enabled for use. Moreover, in the first embodiment, when the user uses the instruction section 2000 and selects the function for use, the function name stored in the preferential function data storage unit 1650 is updated to "scan". Moreover, like the print function, in a case of a passive function such as a print function that the digital multifunction peripheral 10 receives a print job via LAN or local I/F and prints, the data stored in the preferential function data storage 1650 is updated to "print" after the print job ends.

FIGS. 10 through 13 will be referenced to explain the process by which the function to be started up preferentially at the next start up is written into the ROM 1120 at the time of turning off the power. This is the most distinguishing feature of the first embodiment.

Figure 10:
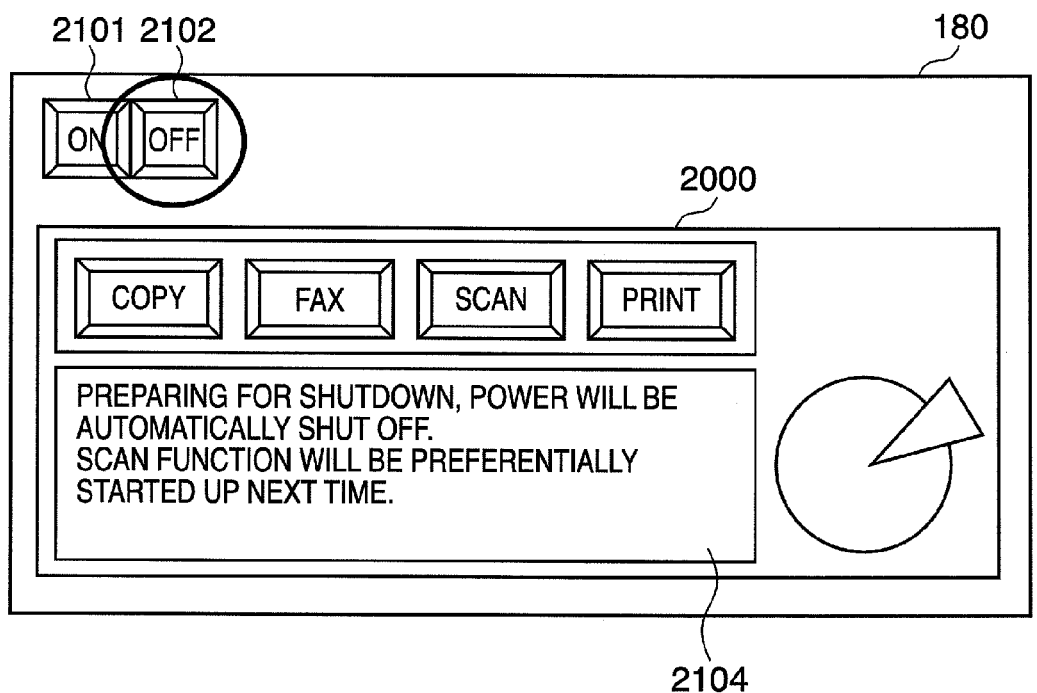
FIG. 10 is a diagram showing a console unit at the time of power off processing, displaying a preferential function to be loaded next in the digital multifunction peripheral according to the first embodiment.

FIG. 10 is a diagram showing the state of the console unit 180 of the digital multifunction peripheral 10 of the first embodiment at the time of turning the power off which displays the preferential function to execute the next time power is turned on. Here, a user, after using a function such as the copy function, promptly turns off the power of the digital multifunction peripheral 10. By turning the power off often in this manner, the amount of electrical power used can be remarkably lowered.

A user can turn the power supply of the digital multifunction peripheral off by pressing the power supply off switch 2102. When the power supply off switch 2102 is pressed, interruption of the CPU 1100 occurs, and shutdown processing is executed. Next, electrical power to the power supply unit 200 is blocked and the power is turned off. When this occurs, as shown in the diagram, the display unit 2104 displays a message to the user that shutdown is in progress as well as a notice of the function to be preferentially started up at the next start up.

Figure 11:
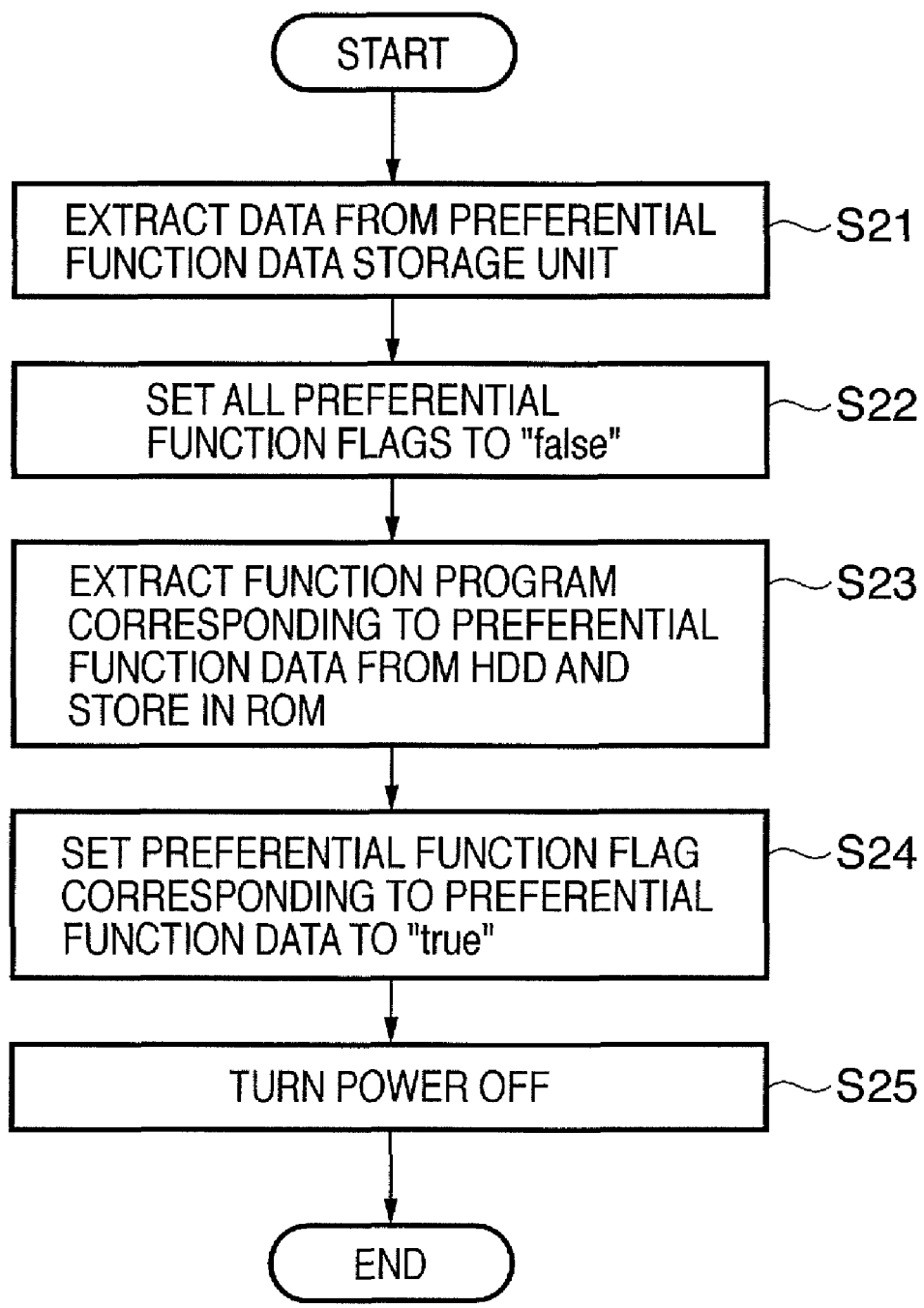
FIG. 11 is a flowchart showing a process of storing in ROM a program of a preferential function at the time of power off processing of the digital multifunction peripheral according to the first embodiment.

FIG. 11 is a flowchart showing the process of storing in the ROM 1120 the preferential function programs at the time of powering off of the digital multifunction peripheral 10 according to the first embodiment. The process shown in the flowchart is executed by the CPU 1100 according to the program stored in the ROM 1120. This process is started up by interruption handling generated by pressing the power off switch 2102 of the console unit 180. Here, the function program corresponding to the function name stored in the preferential function data storage unit 1650 is extracted, and stored in the preferential function program storage 3001 of the ROM 1120. Moreover, the flowchart shows the process of setting the preferential function flag of the function of the function loading table 1600 to "true" and to turn off the power of the power supply 200.

First, at Step S21, the function name stored in the preferential function data storage unit 1650 is extracted, and the process then proceeds to Step S22. If, for example, as in the one example indicated for FIG. 9, the scan function has already been selected, the function name "scan" is extracted. Next, at Step S22, all preferential function flags of the function loading table 1600 are cleared to "false". Through this process, the instruction for preferential start up is reset, and a new function can be set for preferential start up according to the process executed by a step below. Next, at Step S23, the function program corresponding to the function name extracted from the preferential function data storage unit 1650 at Step S21 is extracted from the HDD 1130, and stored in the preferential function program storage 3001 of the ROM 1120. By this process, updating of the programs stored in the preferential function program storage 3001 of the RON 1120 and which is to be preferentially started up, is carried out. Next, at Step S24, the preferential function flag of the function loading table 1600 corresponding to the function name stored in the preferential function data storage unit 1650 is set to "true". Then, at Step S25, instructions to interrupt electrical power to the power supply 200 is given and the digital multifunction peripheral 10 is turned off.

Figure 12:
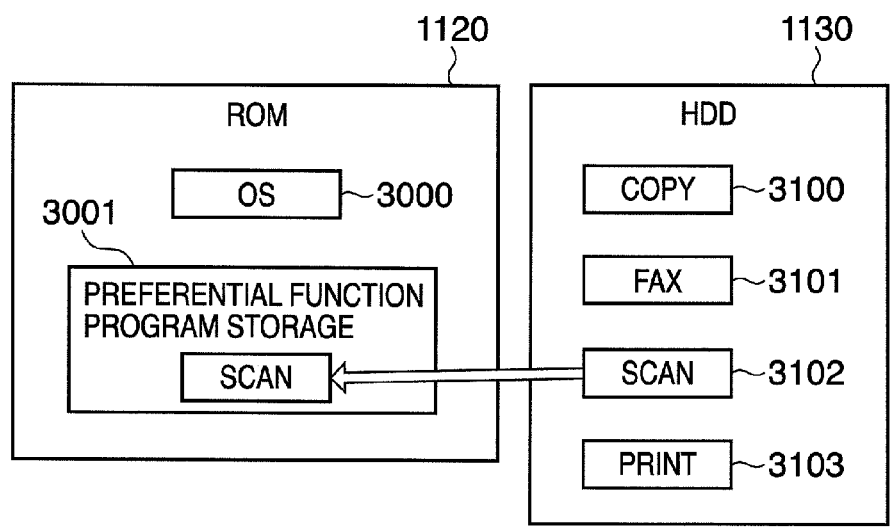
FIG. 12 is a diagram showing updating of a function program of the digital multifunction peripheral according to the first embodiment.

FIG. 12 is a diagram showing the updating of a program of the digital multifunction peripheral 10 according to the first embodiment. In this diagram, "scan" is extracted from the preferential function data storage unit 1650 and stored in the preferential function program storage 3001 of the ROM 1120.

Accompanying the process of storing a scan function program is the process shown in Step S24 of FIG. 11, in which, of the preferential function flags of the function loading table 1600, the preferential function flag corresponding to the function name of the preferential function data storage unit 1650 extracted at Step S21, is set to "true". Through this process, the scan function is newly updated to be preferentially started up (See FIG. 13).

FIG. 13 is a diagram showing the updating of the preferential function flag of the function loading table 1600 of the digital multifunction peripheral 10 according to the first embodiment.

FIG. 13 shows the condition in which the scan function program has been stored in the preferential function program storage 3001, and has been registered in the function loading table 1600 as preferential function data. Here, the preferential function flag corresponding to the scan function with an identification number of "2" is set to "true".

As explained above, according to the first embodiment, the function to be preferentially executed is selected by a user, and the corresponding program is stored in high speed ROM. When power is turned on, the function program is preferentially loaded from ROM into RAM and can then be executed.

Second Embodiment

In the first embodiment described above, as shown in FIG. 9, the function name of the function selected by the user is stored in the preferential function data storage unit 1650, and, when the peripheral is next powered on, the corresponding function program is preferentially loaded into the RAM 1110. A description of the manner in which data is stored in the preferential function data storage unit 1650 based on data of the preferential start up function corresponding to the time will be given. This method enables the automatic updating of functions that are preferentially started up at the time of turning on the power according to the time.

A second embodiment of the present invention will be described in detail below.

Figure 14:
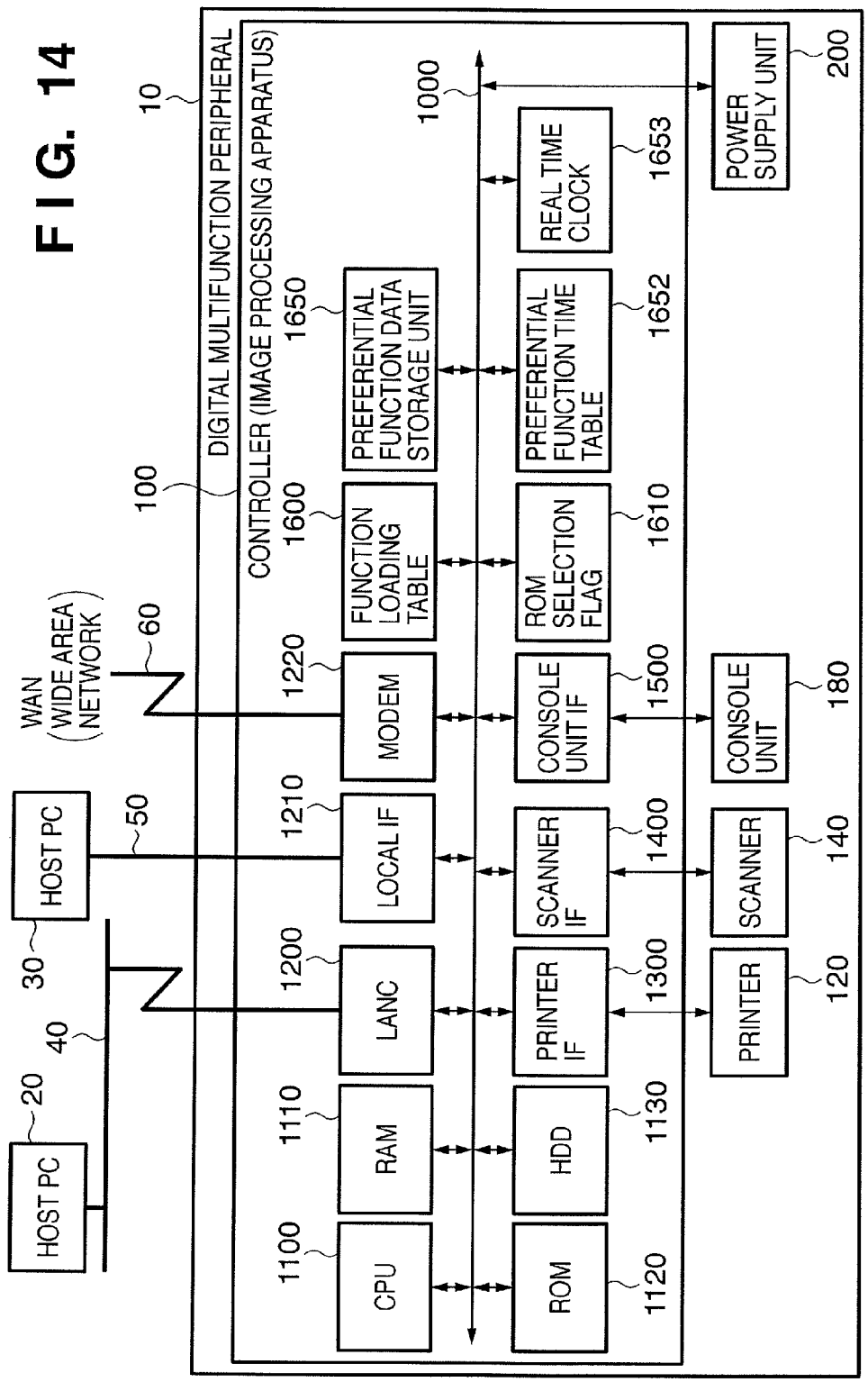
FIG. 14 is a block diagram showing configurations of a digital multifunction peripheral and controller according to a second embodiment.

FIG. 14 is a block diagram showing the configuration of the digital multifunction peripheral 10 and the controller according to the second embodiment of the present invention. Parts that are common between this second embodiment and the above first embodiment will be indicated with the same reference numerals, and their explanation will be abbreviated. New elements in this diagram are a preferential function time table 1652 and a real time clock 1653.

FIG. 15 is a diagram showing an example of the preferential function time table 1652 according to the second embodiment.

This table stores the time and the corresponding function to be preferentially started up (the preferential function name). For example, during the period between 5 and 9 A.M., the copy function is registered to be preferentially started up.

The real time clock 1653 keeps time and supplies time information, and also has an alarm function that is activated so that a CPU 1100 is interrupted at a specific time. In the second embodiment, the real time clock 1653 is set so that interruption occurs at the top of each hour.

Figure 16:
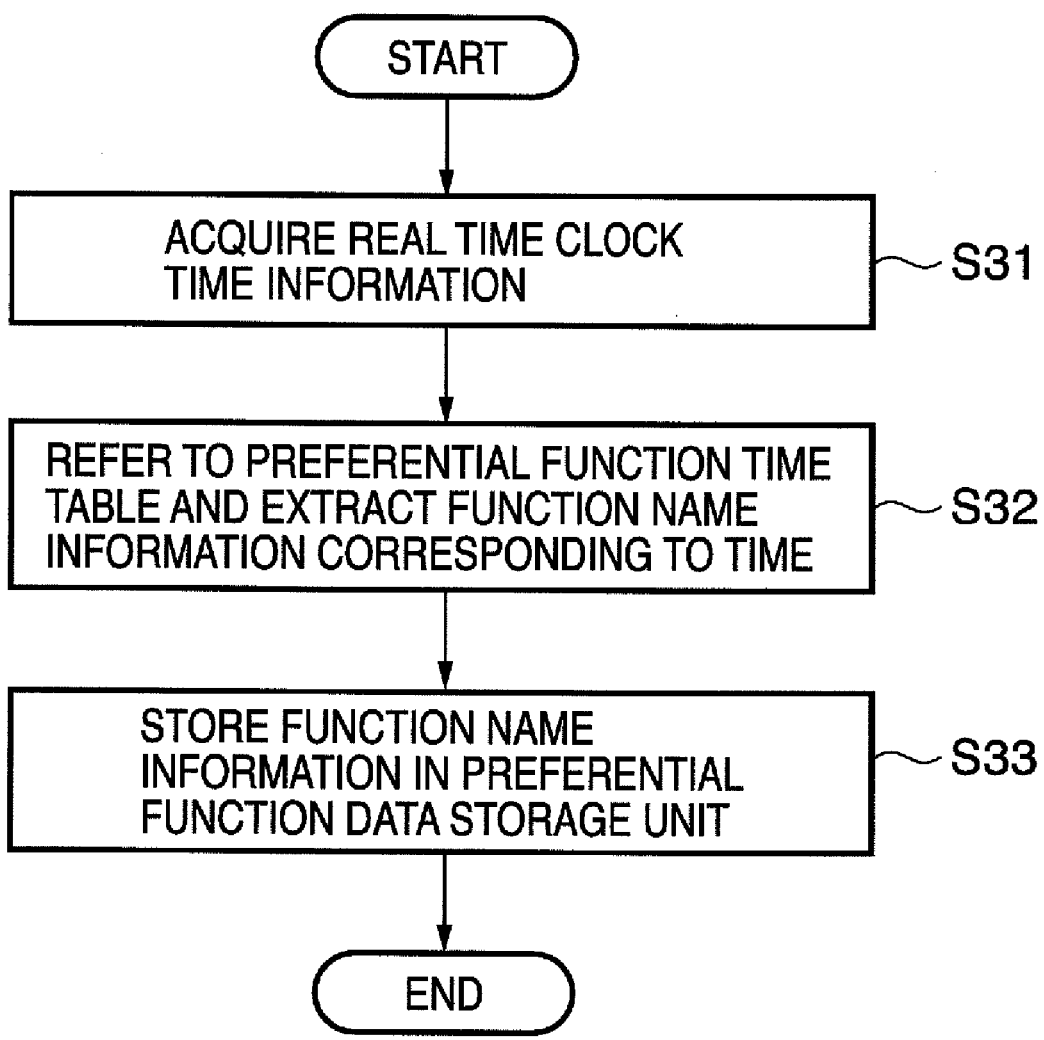
FIG. 16 is a flowchart showing an update process of a preferential function information storage unit of the digital multifunction peripheral according to the second embodiment.

FIG. 16 is a flowchart showing update processing for a preferential function data storage unit 1650 of the digital multifunction peripheral 10 according to the second embodiment of the present invention. This processing is started at the time of interruption due to the alarm activated at the top each hour by the real time clock 1653, and is processed by the CPU 1100. The process by which the function name to be preferentially started up is recorded in the preferential function data storage unit 1650 based on the time information supplied by the real time clock 1653 and the function name in the preferential function time table unit 1652 corresponding to that time, will be described below.

First, at Step S31, the time information kept by the real time clock 1653 is extracted. Next, at Step S32, the preferential function name corresponding to the time information extracted at Step S31 is extracted with reference to the preferential function time table 1652. Next, at Step S33, the preferential function name extracted at Step S31 is stored in the preferential function data storage unit 1650, and the process is ended. Thus, when the function name is recorded in the preferential function data storage unit 1650, the program for that function is stored in the ROM 1120 at power off of the digital multifunction peripheral 10. This process is the same as in the above first embodiment and so its explanation will be omitted. Moreover, if, for example, the digital multifunction peripheral 10 is presently not executing any process, and if the time supplied by the real time clock 1653 matches the predetermined time (e.g., at the top of the hour), the function program of the preferential function time table 1652 corresponding to the time may be stored in the RON 1120.

FIG. 17 is a diagram showing the manner in which the time and preferential function are utilized in the digital multifunction peripheral 10 according to the present invention.

FIG. 17 shows an example of a time schedule for using the digital multifunction peripheral 10 in the office. For example, after the copy function is used at 8:50 AM, the power is turned off at 9:05 AM, and the next preferential start up function is updated to the printer function, which is the function set for 9 and 11 AM by preferential function time table 1652 of FIG. 15. In this case, when the digital multifunction peripheral 10 is powered on at 10 AM in order to print an e-mail, the print function to be preferentially started up, set at 9:05 AM when the digital multifunction peripheral 10 was turned off, is started up. Thus, the wait time until printing is started is shortened.

Hence, by turning the power of the digital multifunction peripheral 10 on and off frequently, the next program to be preferentially started up upon turning the power on can be set by updating to the corresponding function program during power off.

FIG. 18 is a diagram showing the console unit 180 which displays the next preferential function at the time of powering off of the digital multifunction peripheral 10 of the second embodiment of the present invention.

As indicated in the diagram, a user can turn the power of the digital multifunction peripheral 10 off by pressing a power off switch 2102. By pressing the power off switch 2102, an interruption to the CPU 1100 occurs, and, after executing shutdown processing, electrical power is blocked from power supply unit 200 and the power is turned off. At this time, the display unit 2104 of the console unit 180 displays to the user the message that shutdown is in progress as well as the function to be preferentially started up (in this particular diagram, it is the print function) when the digital multifunction peripheral 10 is started up next time.

FIG. 18 shows an example of turning the power off at 9:05 AM, in which case the process of updating the preferential function program and setting to "true" the preferential function flag corresponding to the preferential function of a function loading table 1600, is the same as the process shown in the flowchart of FIG. 11 according to the first embodiment.

Figure 19:
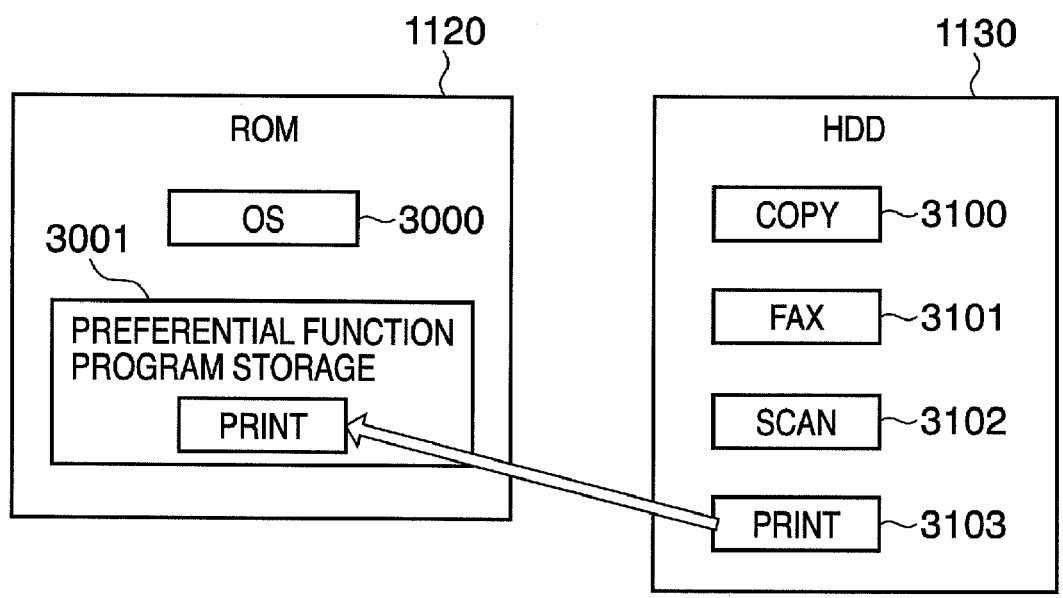
FIG. 19 is a diagram which shows storing of a program in a preferential function program storage unit of the digital multifunction peripheral according to the second embodiment of the present invention.

FIG. 19 is a diagram showing the manner in which the print function program is stored in a preferential function program storage 3001 of the digital multifunction peripheral 10 of the second embodiment of the present invention.

FIG. 19 shows an example of extracting "print" from the preferential function data storage 1650 when the power is turned off at 9:05 AM.

FIG. 20 is a diagram showing an example of the function loading table 1600 after power off processing according to the second embodiment.

When power is turned off at 9:05 AM, the preferential function flag corresponding to the print function of the function loading table 1600 is set to "true" based on the content of the preferential function time table 1652 of FIG. 15.

As explained above, according to the second embodiment, it is possible to automatically update the function to be preferentially started up the next time power is turned on, based on the time at which power of the digital multifunction peripheral is turned off and the content of the preferential function time table. Thus, by frequently turning the power on and off, the function that has the highest probability of being used during a particular time period is started up.

Third Embodiment

Next, the third embodiment of the present invention will be described. In this third embodiment, further improvement on user-friendliness and convenience is achieved by automatically updating the function to be preferentially started up based on the use conditions of a user. As the system configuration according to the third embodiment is the same as that of the above first embodiment, an explanation will be omitted.

Figure 21:
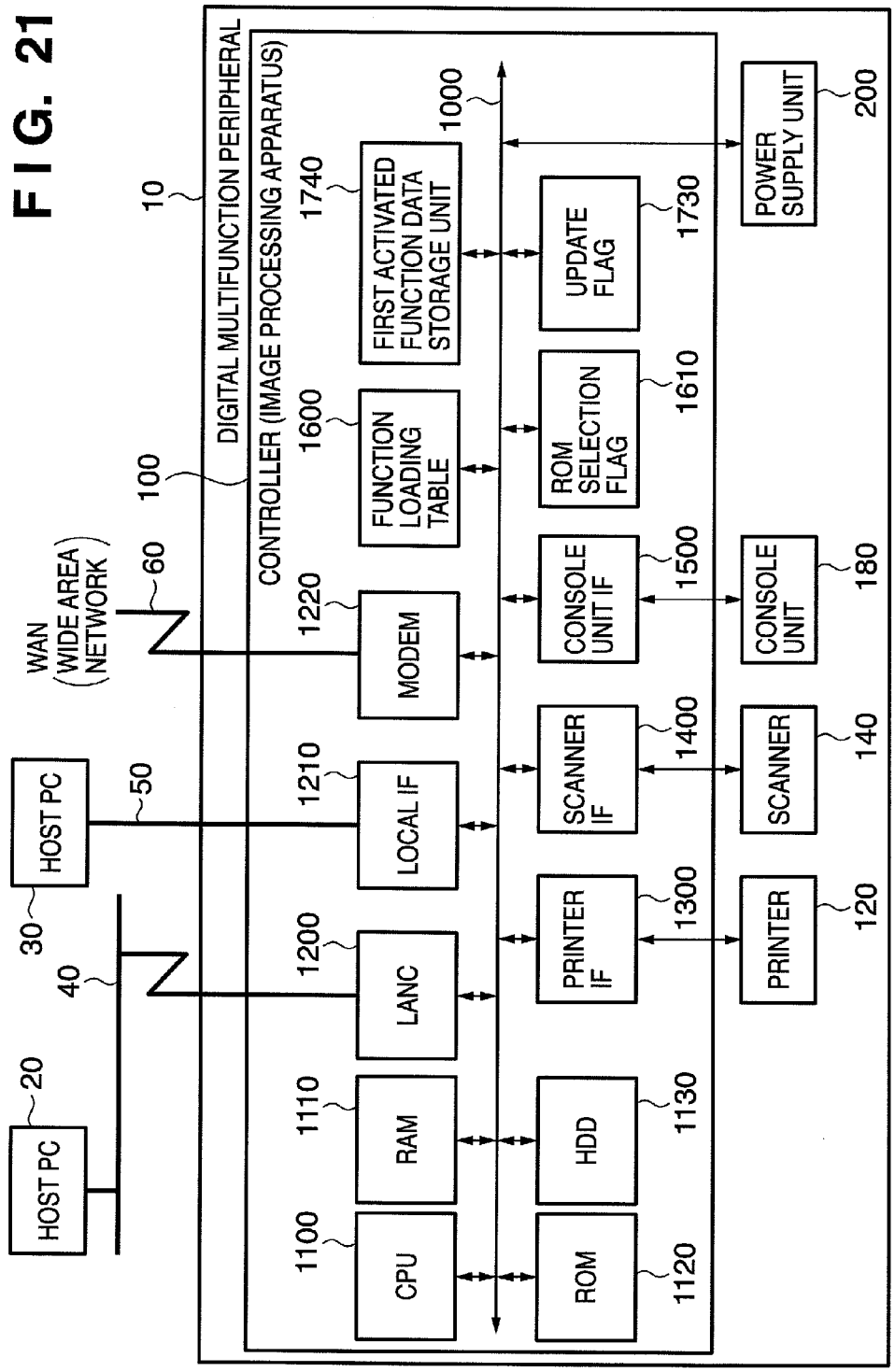
FIG. 21 is a block diagram showing configurations of a digital multifunction peripheral and controller according to a third embodiment of the present invention.

FIG. 21 is a block diagram showing the configuration of the digital multifunction peripheral 10 and the controller 1000 according to the third embodiment. Moreover, parts that are common with FIG. 2, which relates to the above first embodiment, will have the same reference numerals, and their description will be omitted.

In FIG. 21, a first activated function data storage unit 1740 stores data concerning the function that was used first when the digital multifunction peripheral 10 is turned on or recovers from the sleep mode requiring recovery steps which are the same as those implemented when power is turned on. An update flag 1730 is a flag indicating that updating has taken place after updating the first activated function data storage unit 1740 upon powering on the digital multifunction peripheral 10 or recovering from the sleep mode requiring recovery steps which are the same as those implemented when an electric power is turned on.

FIG. 22 is a diagram showing the data stored in the first activated function data storage unit 1740 according to the third embodiment.

This first activated function data storage unit 1740 stores first activated data comprising function names and preferential function flags. Function names denote each function, and are data used to specify the program of a given function. The diagram shows copy, fax, scan, and send (data transmission function) as functions. The preferential function flag is a flag indicating whether a function is preferentially used or not. If the preferential function flag is set to "true" for a particular function, that the function is handled as the preferential function. In FIG. 22, the copy function is set as the preferential function.

Figure 23A:
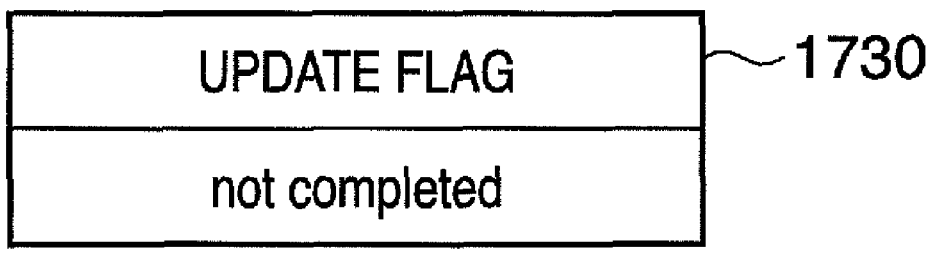
FIGS. 23A and 23B are diagrams showing an example of an update flag according to the third embodiment.
Figure 23B:
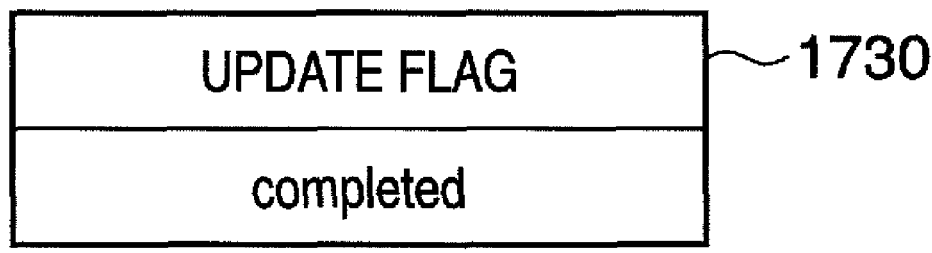

FIGS. 23A and 23B are diagrams showing examples of the update flag 1730 according to the third embodiment.

As described above, the update flag 1730 is a flag indicating that updating has taken place after updating the contents of the first activated function data storage unit 1740 upon powering on the digital multifunction peripheral 10 or recovering from the sleep mode requiring recovery steps which are the same as those implemented when power is turned on. After being changed to "completed", the first activated function data storage unit 1740 cannot be rewritten, until the digital multifunction peripheral 10 is turned from off to on, or until going into the sleep mode requiring recovery steps which are the same as those implemented when the power is turned on.

FIG. 23A shows the value of the update flag 1730 at a point when a function has not been used upon turning the power on or upon recovery from the sleep mode requiring recovery steps which are the same as those implemented when power is turned on. Here, the flag value is "not completed".

FIG. 23B shows the value of the update flag 1730 at a point when a function has been used upon turning the power on or upon recovery from the sleep mode requiring recovery steps which are the same as those implemented when power is turned on. Here, the flag value is "completed".

Figure 24:
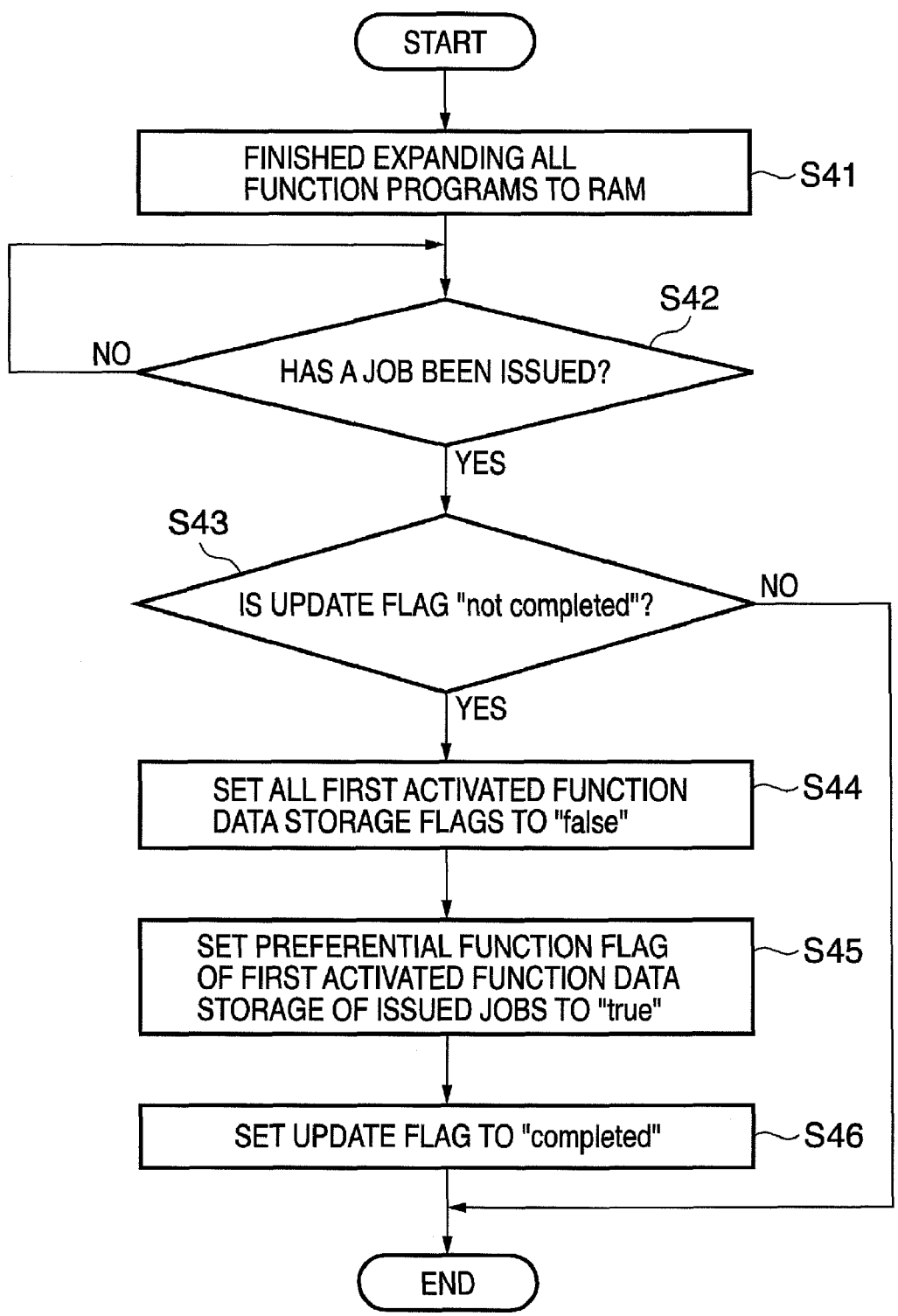
FIG. 24 is a flowchart showing an example of a process of updating first activated function data of the digital multifunction peripheral according to the third embodiment of the present invention.

FIG. 24 is a flowchart showing the process of updating the first activated function data storage unit 1740 of the digital multifunction peripheral 10 according to the third embodiment of the present invention. The program to execute this process is stored in the ROM 1120, and is executed under the control of the CPU 1100.

This process is started by turning the digital multifunction peripheral 10 on or by recovering from the sleep mode requiring recovery steps which are the same as those implemented when the power is turned on. At Step S41, all function programs are loaded into the RAM 1110 from the HDD 1130. The state at Step S41 corresponds to the end of processing state at Step S8 of FIG. 6, and is the same as the state of FIG. 8C. Next, it is determined at Step S42 whether or not a job has been issued by a user. If a job has been issued, the process proceeds to Step S43, where the CPU 1100 reads out the update flag 1730. If the value of the update flag 1730 that has been read out is "completed", updating of the first activated function data storage unit 1740 cannot be carried out, and the process is ended.

On the other hand, if the value of the update flag 1730 at Step S43 is "not completed", the process proceeds to Step S44, where all of the preferential function flags of the first activated function data of the first activated function data storage unit 1740 are set to "false". Next, at Step S45, the preferential function flag of the first activated function data storage unit 1740 corresponding to the function used by the job issued at Step S42 is set to "true". Then, at Step S46, the update flag 1730 value is set to "completed".

Moreover, the job issued at Step S42 is executable if the function program used by the job has been loaded into the RAM 1110, even if at Step S41, all of the function programs have not been loaded into the RAM 1110 from the HDD 1130. Thus, when a job is issued, the processes from Step S43 to Step S46 are executed.

Figure 25:
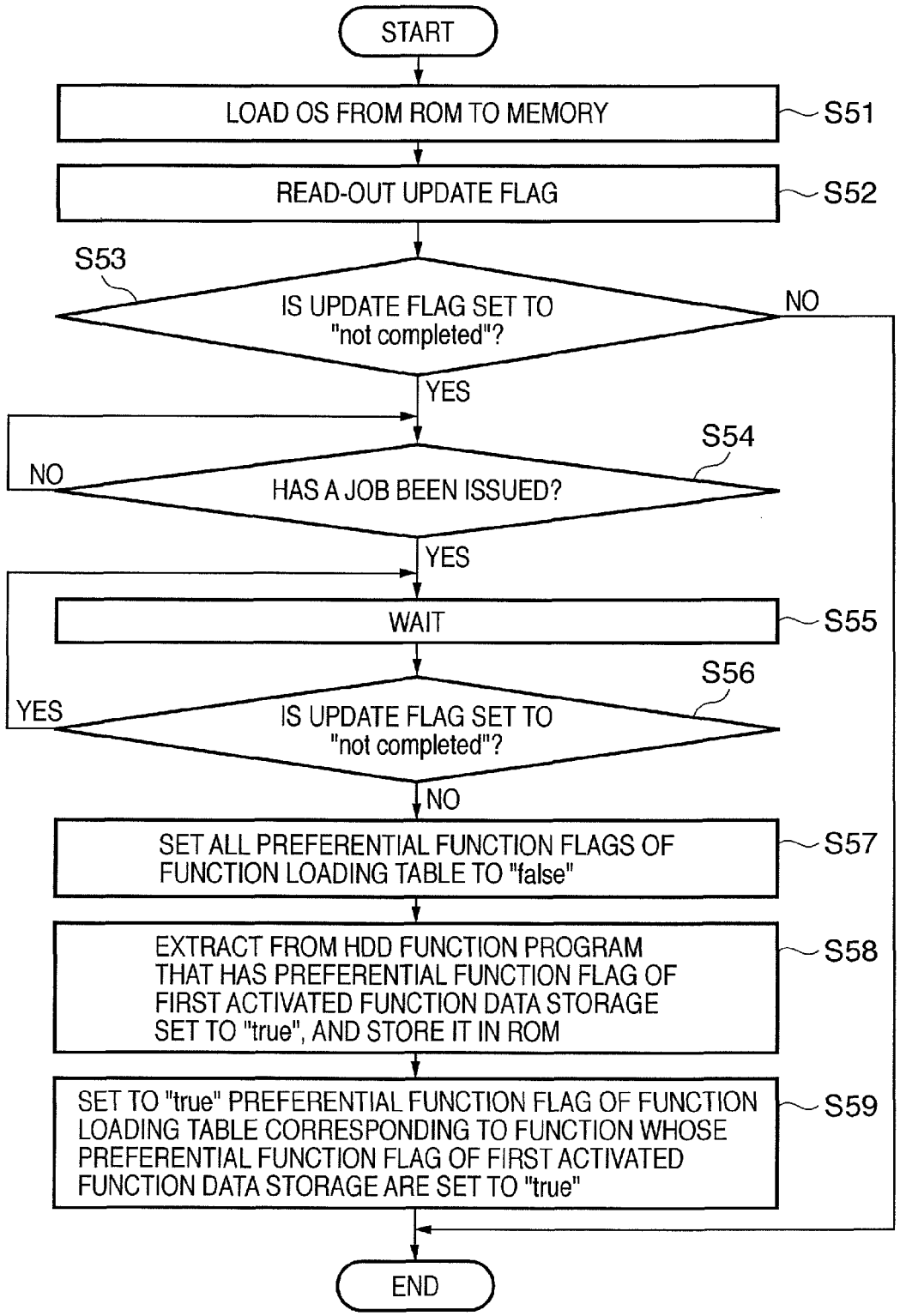
FIG. 25 is a flowchart showing an example of processing for updating first activated function data of the digital multifunction peripheral according to the third embodiment of the present invention.

FIG. 25 is a flowchart showing the process by which the first activated function data storage unit 1740 is updated in the digital multifunction peripheral 10 according to the third embodiment of the present invention. The program which executes this process is stored in the ROM 1120, and is executed under the control of the CPU 1100.

This process is started upon powering on the digital multifunction peripheral 10 or recovering from the sleep mode requiring recovery steps which are the same as those implemented when the power is turned on. First, at Step S51, the OS 3000 stored in the ROM 1120 is loaded into the RAM 1110. Next, at Step S52, the CPU 1100 read outs the update flag 1730. Then, at Step S53, it is determined whether the value of the update flag 1730 is "not completed". If the value of the update flag 1730 is "completed", the process is ended because updating of the first activated function data storage unit 1740 is not possible.

On the other hand, if the value of the update flag 1730 at Step S53 is "not completed", the process proceeds to the Step S54. Here, the process waits for a user to issue a job. When the user issues a job, the process advances to Step S55, and the digital multifunction peripheral 10 is placed in wait mode for a predetermined period of time. Next, at Step S56, the CPU 1100 again reads out the value of the update flag 1730, and determines whether the read out value is "not completed". If the value of the update flag 1730 is "not completed", the process returns to Step S55, where further waiting occurs. In this way, when the value of the update flag 1730 becomes "completed" at Step S56, the process advances to Step S57.

The wait sequence of Step S55 is a sequence for waiting for the process of Steps S44 through S46 of the flowchart indicating update processing of the first activated function data storage unit 1740 of FIG. 24.

Next, at Step S57, all of the preferential function flags of the function loading table 1600 are set to "false". This process enables the temporary resetting of preferential start up settings, and updating so that a new function is preferentially started up at a step described below. Next, at Step S58, the program for a function whose preferential function flag of the first activated function data contained in the first activated function data storage unit 1740 is set to "true" is extracted from the HDD 1130, and is stored in the preferential function program storage 3001 of the ROM 1120. In this way, in Step S58, the preferentially started program stored in the ROM 1120 is updated. Next, in Step S59, the preferential function flag of the function loading table 1600 corresponding to the function whose preferential function flag of the first activated function data of the first activated function data storage unit 1740 is set to "true", is itself set to "true". In Step S59, the preferential function flag is updated to start up a new preferential function.

FIG. 26 through 29 are diagrams that describe an example of processing occurring in the digital multifunction peripheral 10 according to the third embodiment. These diagrams show the state of the ROM 1120, the HDD 1130, the function loading table 1600, the first activated function data storage unit 1740, and the update flag 1730, upon a user using for the first time the scan function on the digital multifunction peripheral 10 that has the copy function set as the preferential function.

Figure 26:
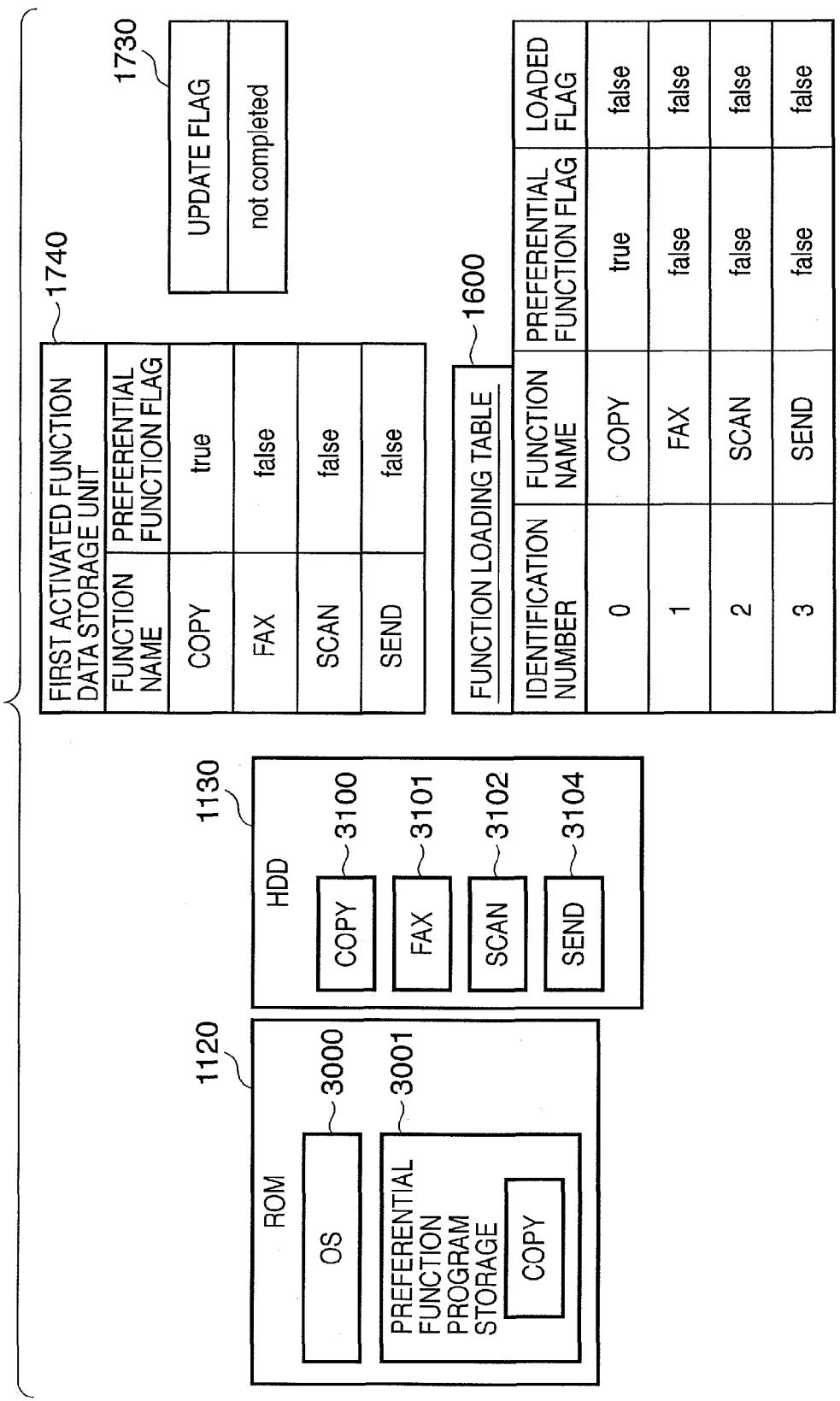
FIG. 26 is a diagram showing the status of each flag and table, etc., when the power of the digital multifunction peripheral is on or recovering from sleep mode according to the third embodiment.

FIG. 26 shows the state of each flag and table when powering on the digital multifunction peripheral 10 or upon recovering from the sleep mode requiring boot steps identical to those implemented when powering on.

In this example, the preferential function program stored in the ROM 1120 is the copy function program. In the first activated function data storage unit 1740, the preferential function flag of only the copy function is set to "true", and the preferential function flags of all other functions are "false". In addition, the preferential function flag of only the copy function is set to "true" in the function loading table 1600. At this point, as the program of the function has not been loaded into the RAM 1110 at this point, all of the loaded flags are "false". Moreover, the update flag 1730 is also set to "not completed", indicating that updating has not yet taken place.

Figure 27:
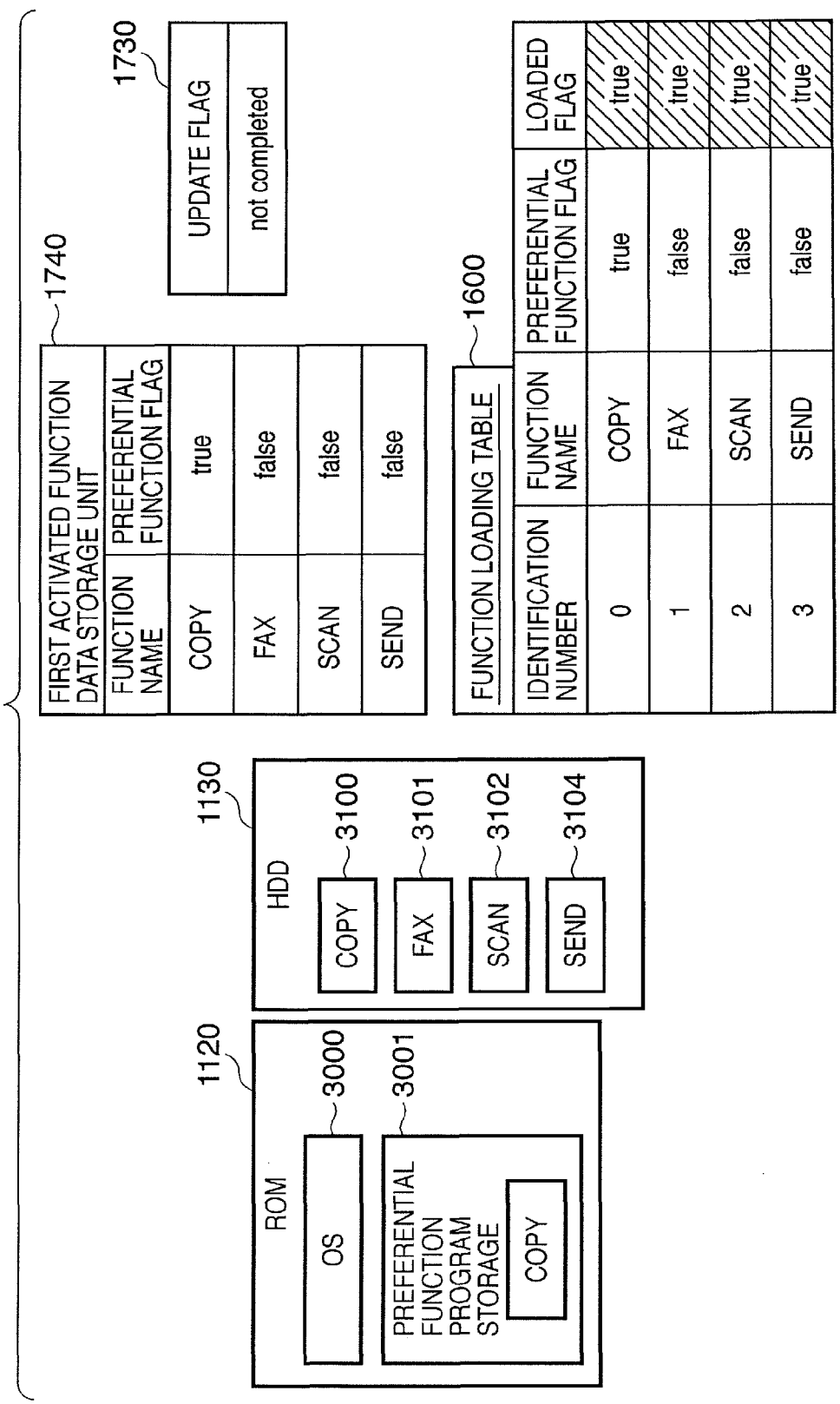
FIG. 27 is a diagram showing each state after all function programs that are installed in an HDD are loaded into RAM and all functions are usable.

FIG. 27 is a diagram showing the situation in which all of the function programs installed in the HDD 1130 have been loaded into the RAM 1110 and all functions are enabled for use.

Comparison with FIG. 26 reveals that all of the loaded flags of the function loading table 1600 have been changed to "true", indicating that loading into the RAM 1110 has been taken place.

Figure 28:
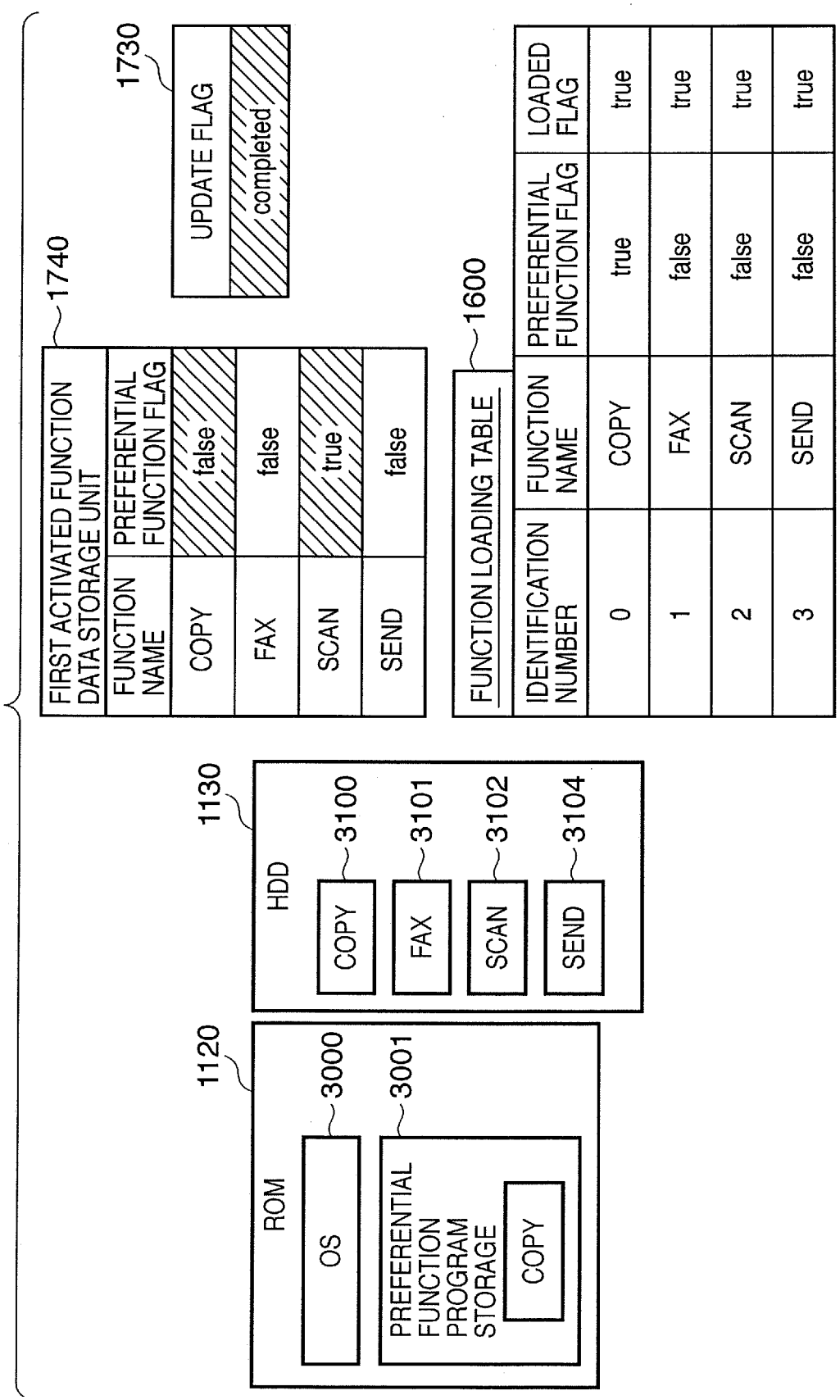
FIG. 28 is a diagram showing a state in which a user uses a scanning function from the state of FIG. 27 and in which the first activated function data storage unit and the update flag have been updated.

FIG. 28 is a diagram showing the state in which the user has used the scan function (has issued a scan job) from the state of FIG. 27, and the contents of the first activated function data storage unit 1740 and the update flag 1730 have been updated.

FIG. 28 is a diagram showing each state when processing up to Step S46 has been executed in the flowchart indicating the updating of the first activated function data storage unit 1740 of FIG. 24. Therefore, here the preferential function flag corresponding to the scan function of the first activated function data storage unit 1740 is set to "true" and the update flag 1730 is changed to "completed".

Figure 29:
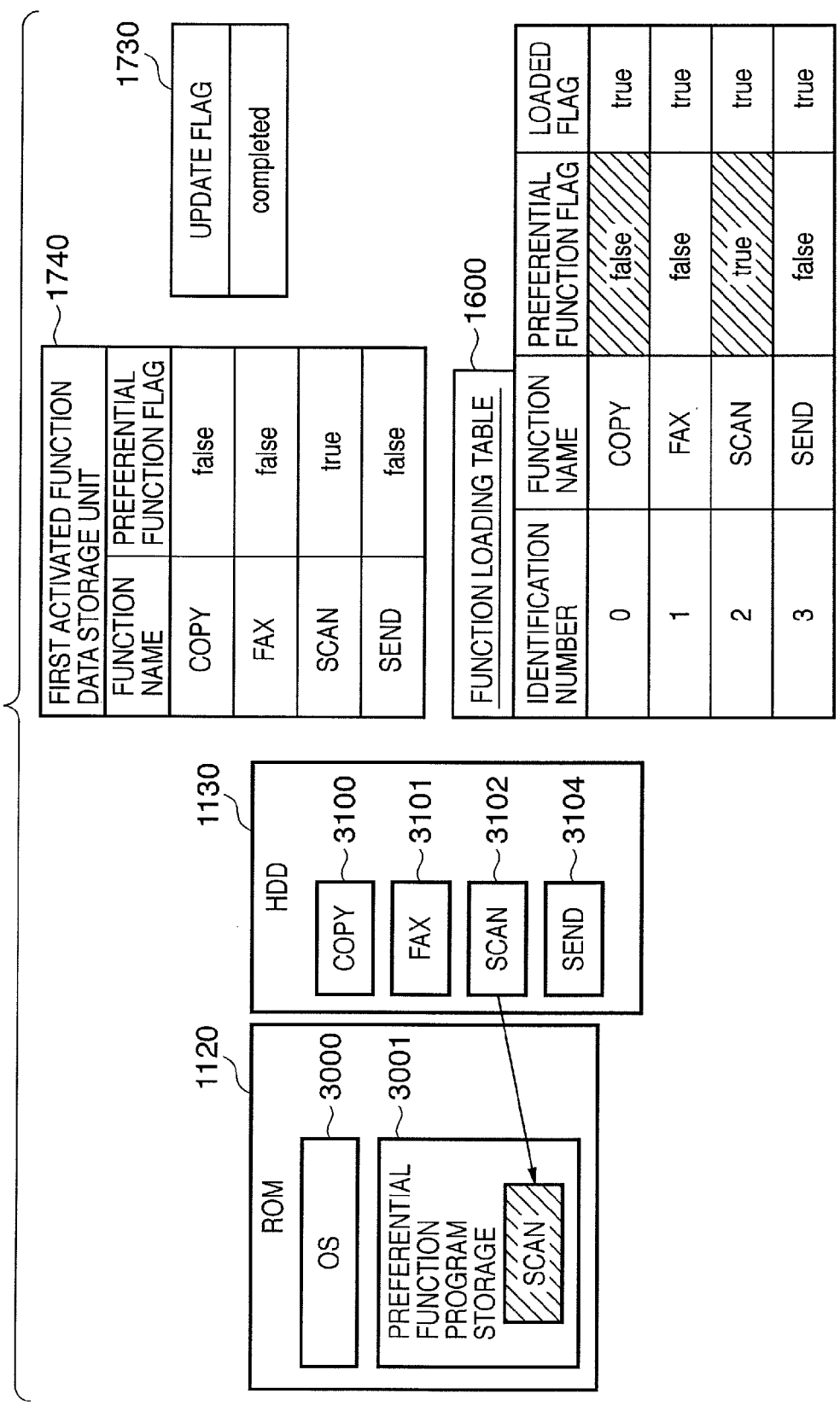
FIG. 29 is a diagram showing a state in which a start is further advanced from FIG. 28, a program of a scan function has been stored in a preferential function program storage of ROM, and a function loading table has been updated.

FIG. 29 is a diagram showing the state further advanced from FIG. 28, and in which the scan function program has been stored in the preferential function program storage 3001 of the ROM 1120 and the function loading table 1600 has been updated.

FIG. 29 is a diagram showing the state when processing up to Step S59 has been executed in the flowchart indicating the storage of the preferential function program of FIG. 25 to the ROM 1120. Here, the scan function program has been stored in the preferential function program storage 3001 of the ROM 1120, and only the preferential function flag corresponding to the scan function of the function loading table 1600 has been set to "true".

As explained above, according to the third embodiment, greater convenience and user-friendliness are achieved by shortening the time required for a specific function of the digital multifunction peripheral to become usable, and, ultimately, enabling the use of all functions.

In addition, since the function to be preferentially started up can be automatically changed depending on the use situation of the user, user friendliness can be further increased.

These advantages also contribute to power conservation by increasing the opportunity to turn the power off.

Fourth Embodiment

Next, the fourth embodiment of the present invention will be described, wherein, of the plurality of function programs (split programs) stored in the HDD 1130, the programs set to be preferentially loaded into the RAM 1110 are successively loaded in the RAM 1110, and each function is made executable. Moreover, as the network configuration including the digital multifunction peripheral 10 according to the fourth embodiment is essentially identical to the configuration of the previous embodiment, an explanation will be omitted.

Figure 30:
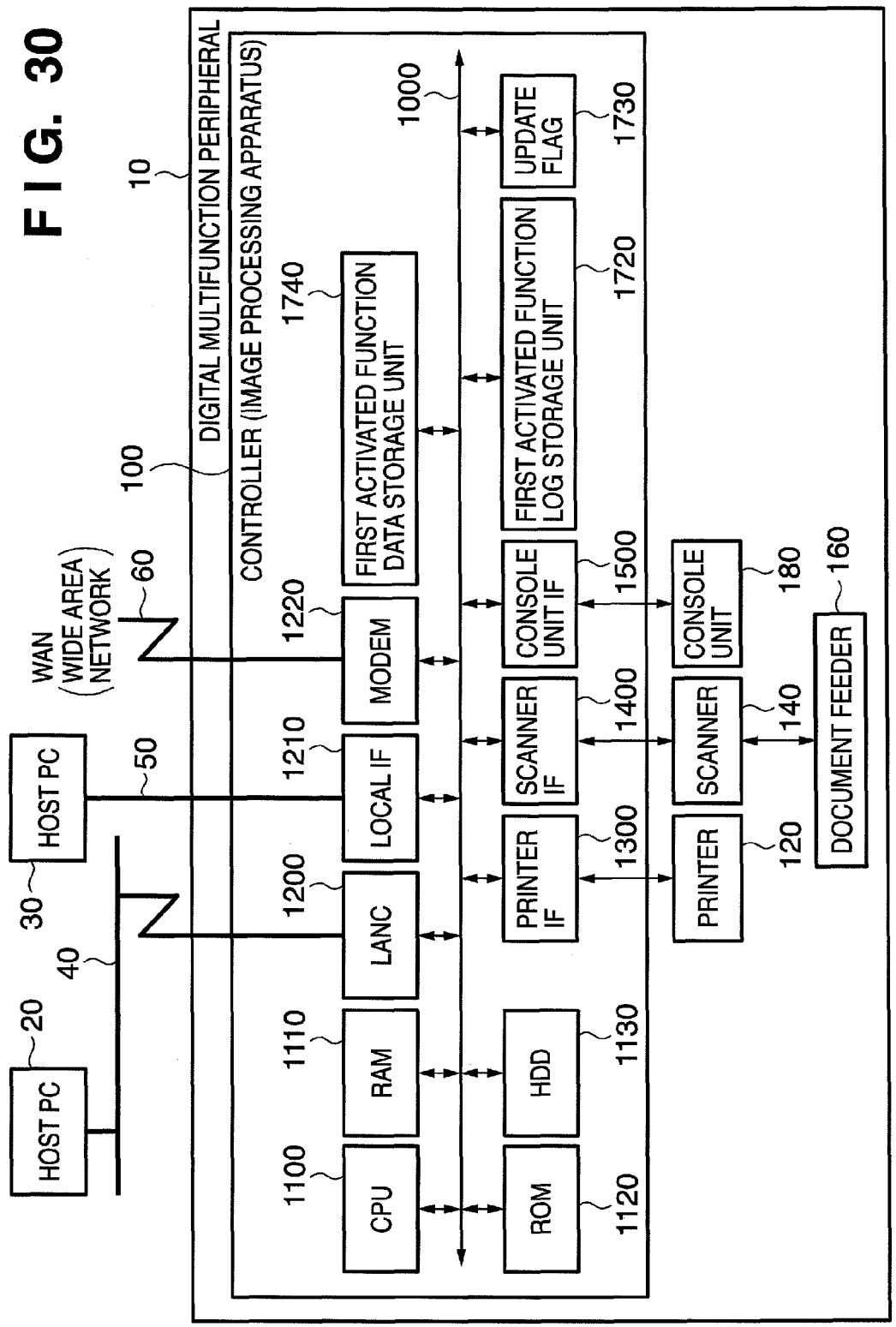
FIG. 30 is a diagram showing a configuration of a digital multifunction peripheral and a controller unit according to a fourth embodiment.

FIG. 30 is a diagram showing the configuration of the digital multifunction peripheral 10 and the controller unit according to the fourth embodiment. As FIG. 30 includes parts that are common with the configurations of FIG. 2 and FIG. 21, these parts will be indicated using the same reference numerals and their descriptions will be omitted.

A first activated function log storage unit 1720 stores, as part of a log, the first function to be used when the digital multifunction peripheral 10 is turned on or when it has recovered from the sleep mode requiring recovery steps identical to those implemented when powering on. The update flag 1730 records whether either the first activated function data storage unit 1740 or the first activated function log storage unit 1720 has been updated. That is, if the first activated function data storage unit 1740 or the first activated function log storage unit 1720 has been updated when the digital multifunction peripheral 10 has been turned on or has recovered from the sleep mode requiring recovery steps identical to those implemented when powering on, the fact that updating had been taken place is recorded.

Figure 31:
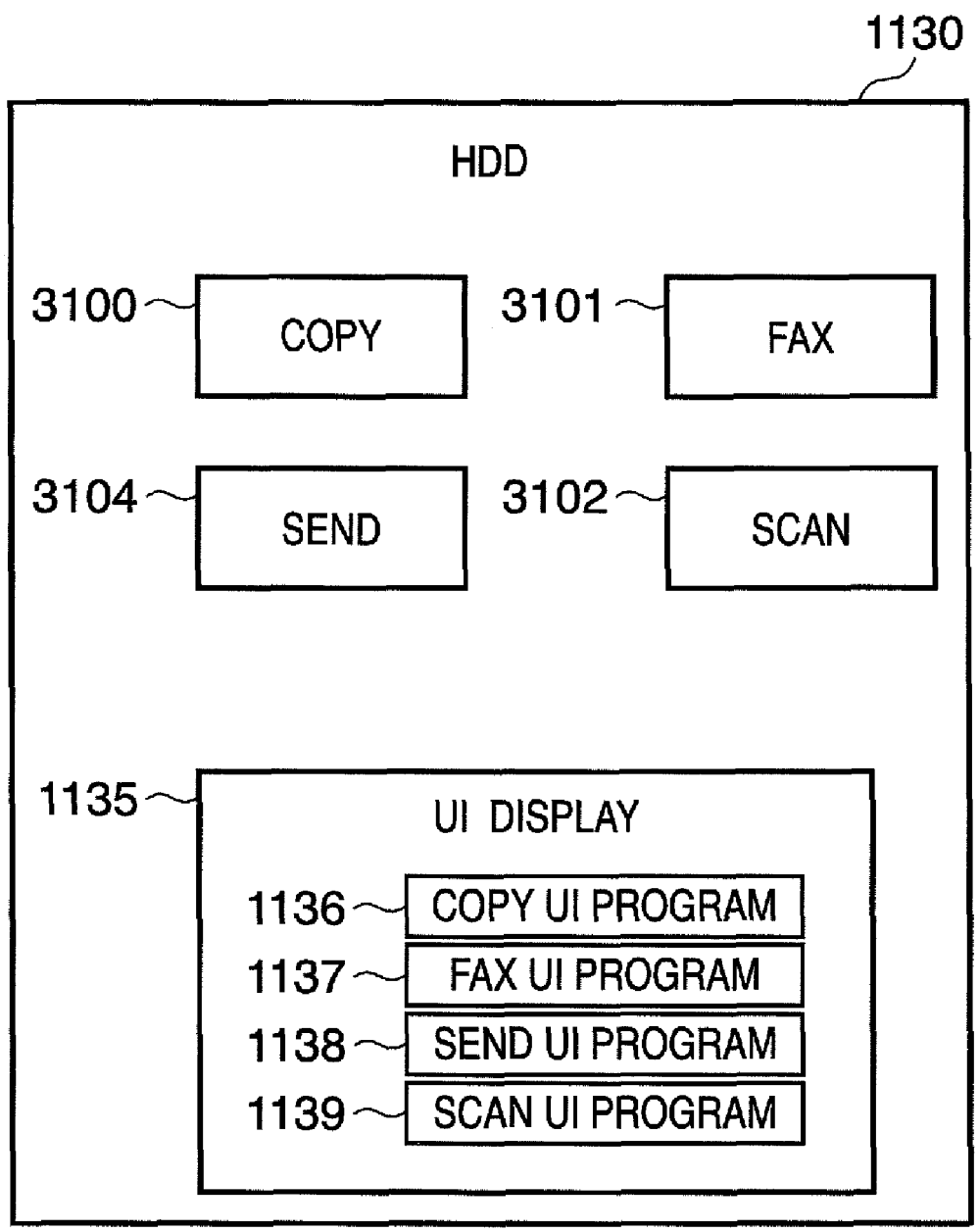
FIG. 31 is a diagram showing a configuration of a program in the case of using a split program enabling rapid start-up of the digital multifunction peripheral according to the fourth embodiment.

FIG. 31 is a diagram showing the configuration of a program in the case where a split program enabling high speed launch is used in the digital multifunction peripheral 10 according to the fourth embodiment. Here, the digital multifunction peripheral 10 has copy, fax, send, and scan functions, and programs that execute those functions are stored in the HDD 1130.

Reference numerals 3100, 3101, 3102, 3104 and 1135 are, respectively, programs and data that execute copy function, fax function, send function, scan function, and UI display function. According to the fourth embodiment, a program and data that execute the copy function are called a copy function program. Programs for other functions will be referred in the same manner. For example, a program that executes the fax function is called a fax function program. A UI display program 1135 includes a copy UI program 1136, a fax UI program 1137, a send UI program 1138, and a scan UI program 1139, which are UI programs for copy, fax, send, and scan functions, respectively. When the digital multifunction peripheral 10 is turned on and is starting up, a boot program is read out from the RON 1120, then respective function programs are loaded into the RAM 1110 from the HDD 1130, and the CPU 1100 makes each function executable.

Figure 32A:
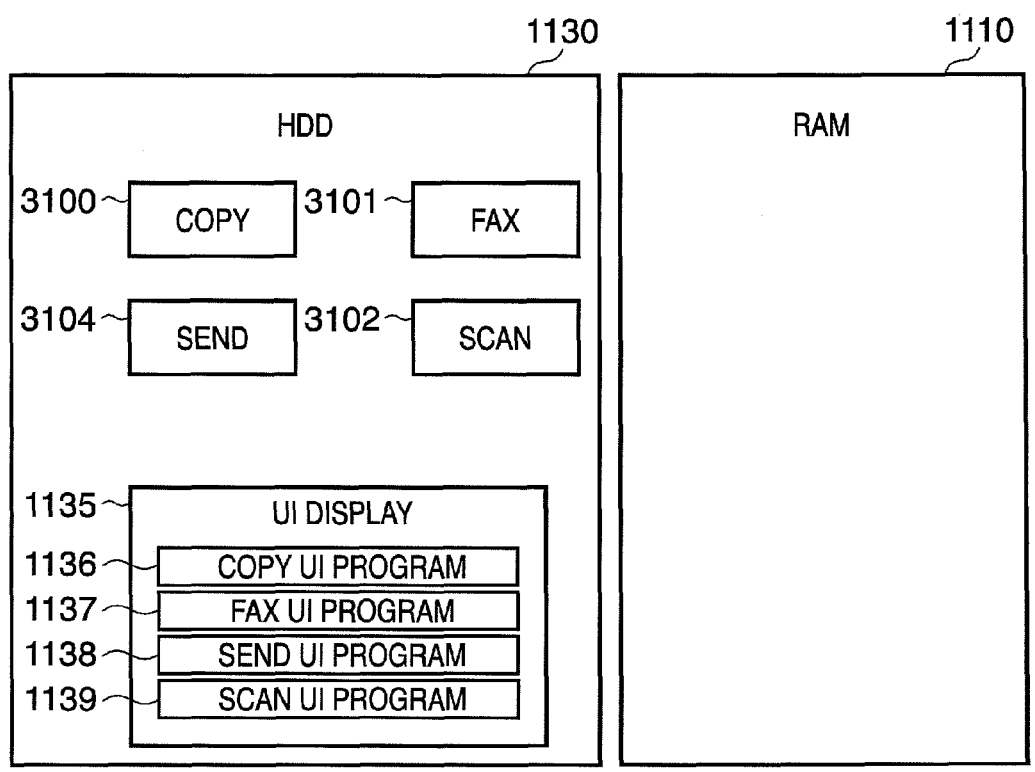
Figure 32B:
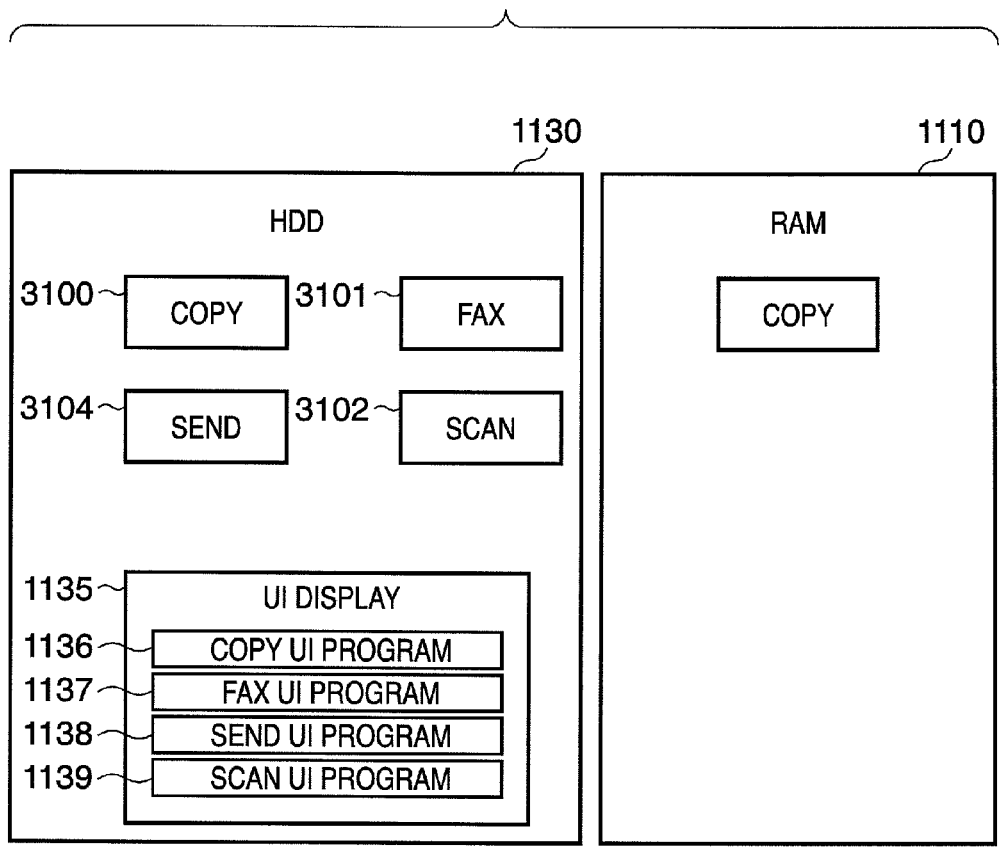
Figure 33A:
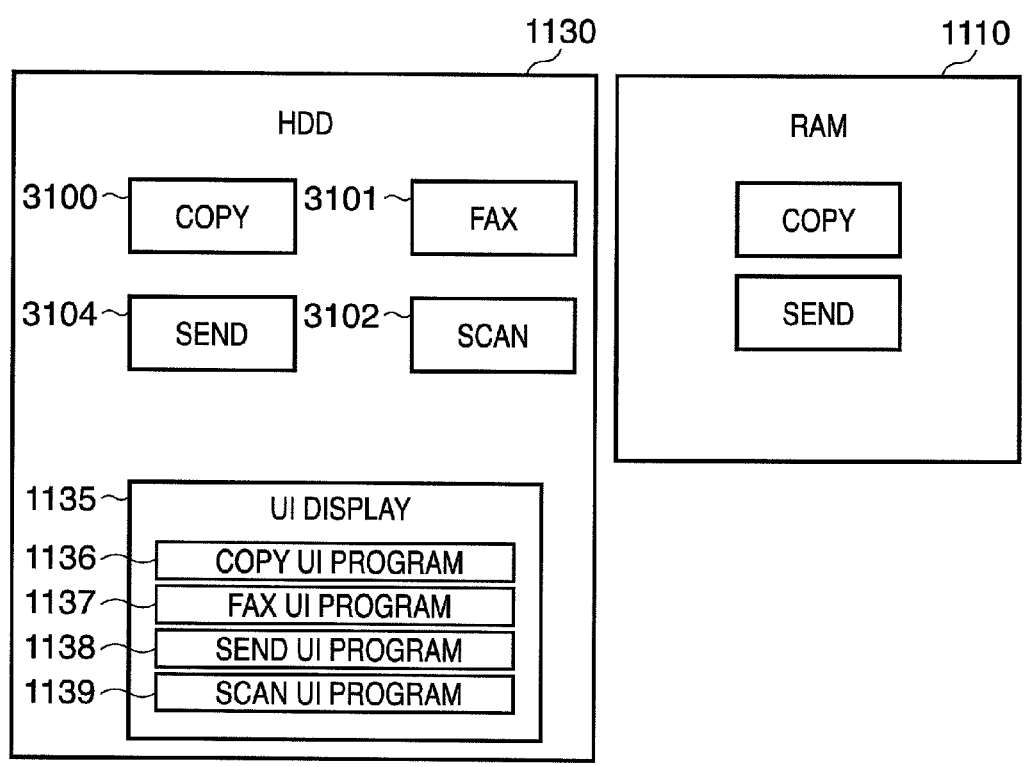

FIGS. 32A and 32B, together with FIGS. 33A and 33B, are diagrams that show the condition in which the programs of split program configuration are loaded from the HDD 1130 to the RAM 1110 by the CPU 1100. Here, an example of starting up the copy function preferentially is described.

FIG. 32A shows a state prior to loading respective function programs from the HDD 1130 to the RAM 1110 after powering on the digital multifunction peripheral 10. In this state, the RAM 1110 stores no program.

FIG. 32B is a diagram showing the state in which the copy program which has been set as the preferential function is loaded from the HDD 1130 to the RAM 1110. In this state, as the copy function program has already been developed into the RAM 1110, which is the main memory, only the copy function is executable.

FIG. 33A is a diagram showing the state in which the send function is started up and the send function program is loaded into the RAM 1110 from the HDD 1130, after the copy function program has been loaded into the RAM 1110. In this state, the copy function program and the send function program are already loaded into the RAM 1110, so the copy function and send function become executable.

FIG. 33B is a diagram showing the state in which all function programs in the digital multifunction peripheral 10 have been loaded into the RAM 1110 from the HDD 1130. In this state, all of the functions of the digital multifunction peripheral 10 are executable.

Figure 34:
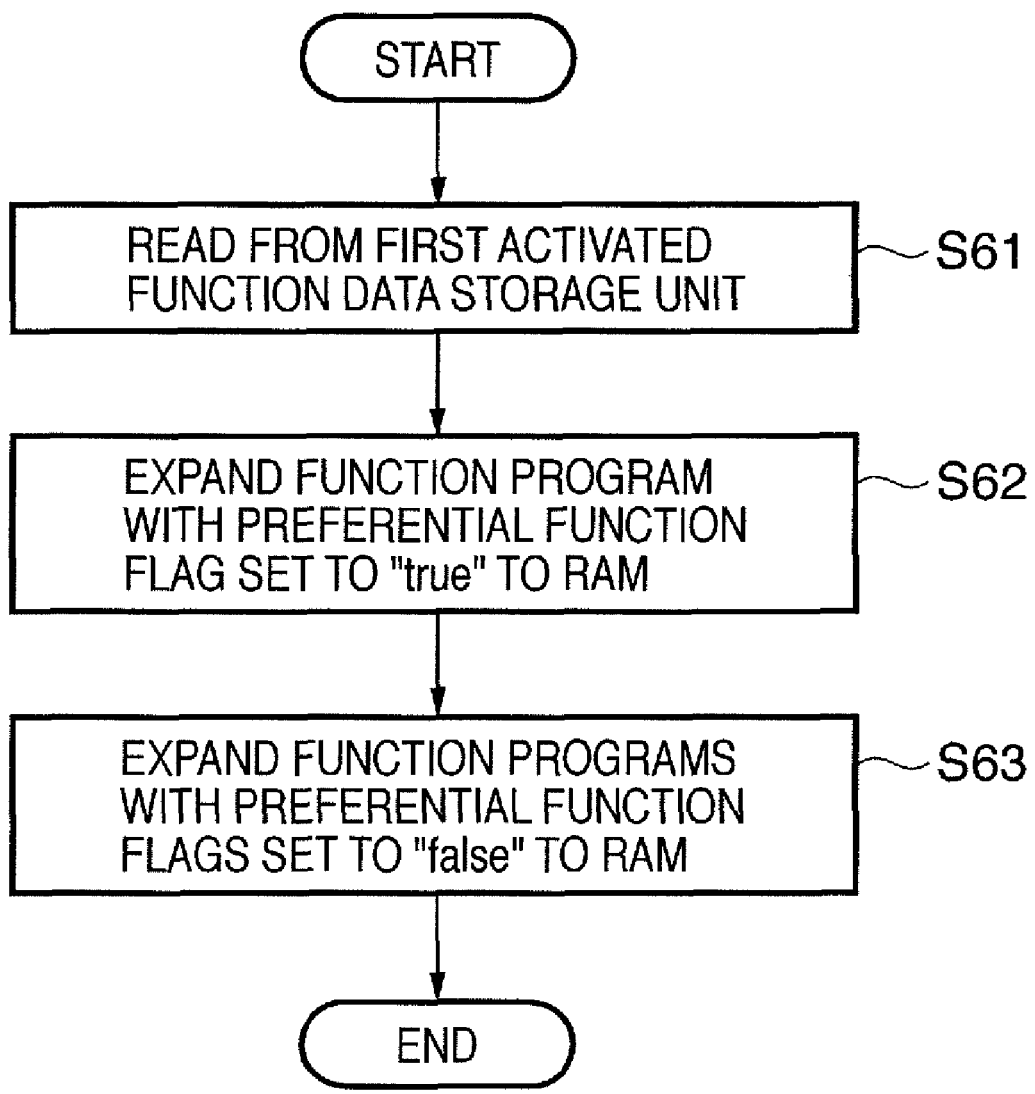
FIG. 34 is a flowchart showing start-up processing of the digital multifunction peripheral according to the fourth embodiment.

FIG. 34 is a flowchart showing the start up process of the digital multifunction peripheral 10 according to the fourth embodiment of the present invention. The program that executes this process is stored in the ROM 1120, and is executed under the control of the CPU 1100. This process is started when the digital multifunction peripheral 10 is powered on or upon recovering from the sleep mode requiring boot steps also implemented when powering on.

First, at Step S61, first activated function data is read out from the first activated function data storage unit 1740. Next, at Step S62, a function program with a function name having the preferential function flag of that first activated function data set to "true" is loaded into the RAM 1110 from the HDD 1130. This corresponds to the copy function program in the example of FIG. 22. Next, at Step S63, function programs with function names having preferential function flags of first activated function data set to "false" are loaded into the RAM 1110 from the HDD 1130.

Figure 35B:
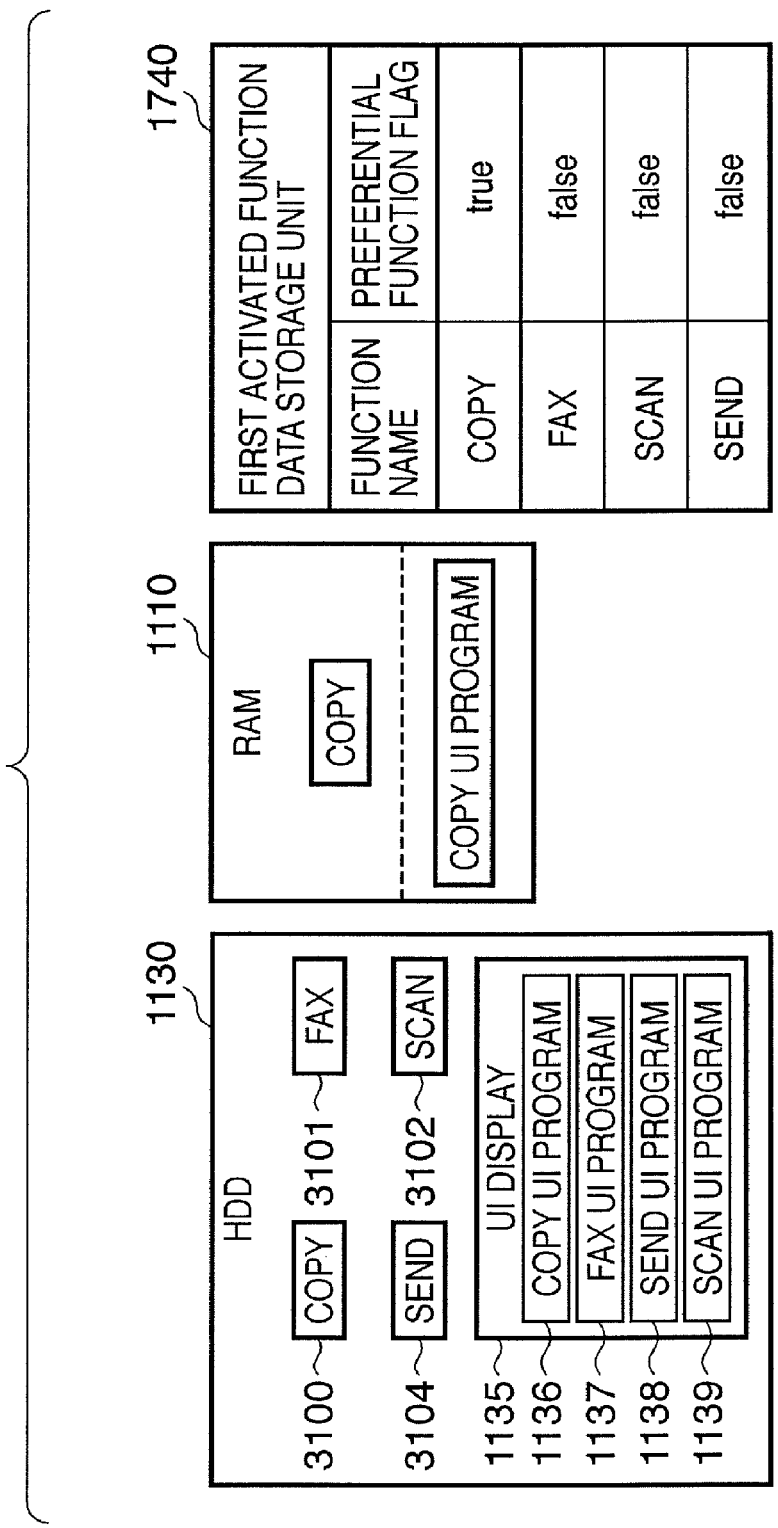

FIG. 35A through 35C are diagrams showing the state of the HDD 1130, the RAM 1110, and the first activated function data storage unit 1740 at the time of start up of the digital multifunction peripheral 10 according to the fourth embodiment. An example in which the first activated function data storage unit 1740 is in the state of FIG. 22 will be described.

FIG. 35A is a diagram showing the HDD 1130, the RAM 1110, and the first activated function data storage unit 1740 immediately after powering on.

FIG. 35B shows the state in which the CPU 1100 has determined that the preferential function flag of the "copy" function name in the first activated function data storage unit 1740 has been set to "true", and the copy function program 3100 has been loaded into the RAM 1110 from the HDD 1130. Also, the copy UI program 1136, which has a corresponding relationship to the copy program 3100, is loaded into the RAM 1110. This indicates the state in which processing of Step S62 of the flowchart of FIG. 34 has been completed.

FIG. 35C is a diagram showing the state in which, after loading the copy function program 3100 into the RAM 1100, all programs that have function names with preferential function flags set to "false" are loaded into the RAM 1110 from the HDD 1130. This indicates the state in which the processing of Step S63 of the flowchart of FIG. 34 has been completed.

Figure 36A:
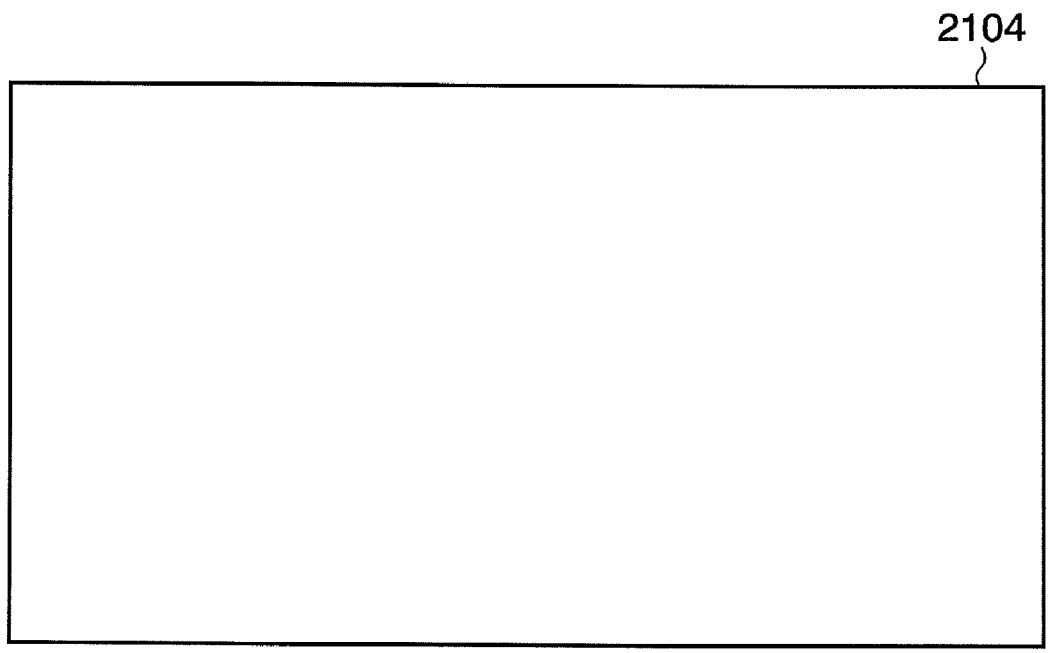
FIGS. 36A, 36B, and 36C are diagrams showing a display state of a display unit for each state shown in FIGS. 35A, 35B, and 35C.
Figure 36B:
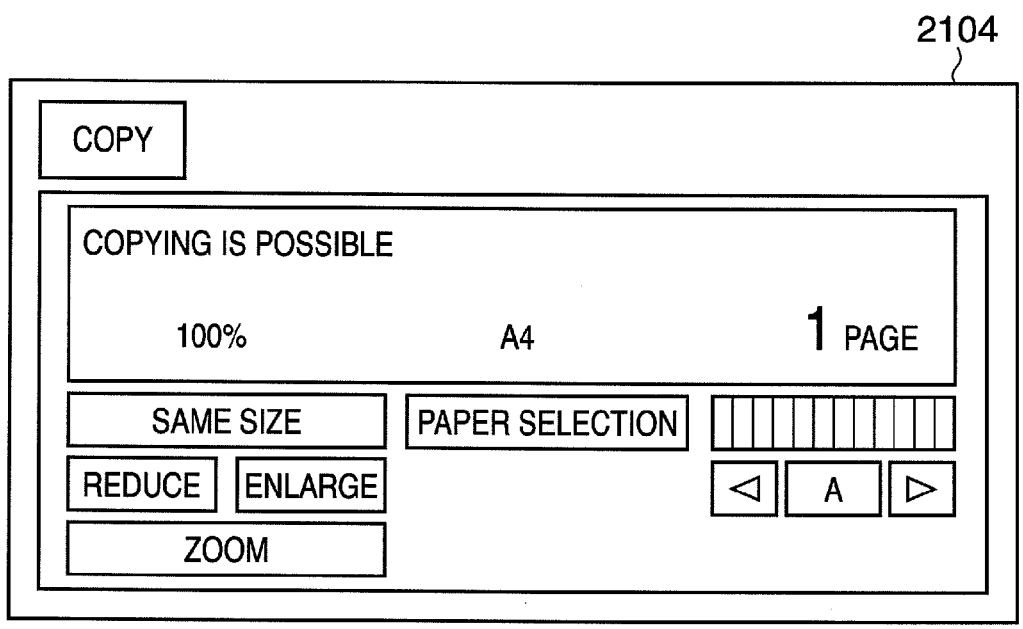
Figure 36C:
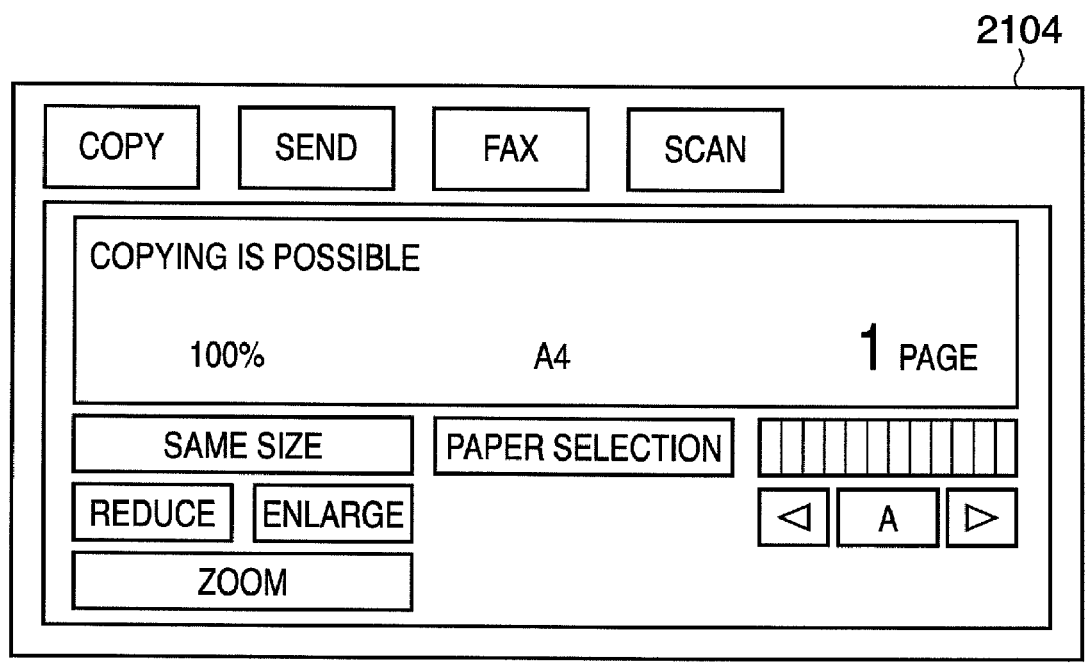

FIGS. 36A through 36C are diagrams that describe the contents of the display unit 2104 under each state indicated in FIGS. 35A through 35C.

FIG. 36A shows the contents of the display unit 2104 under the state of FIG. 35A. In this state, the display unit 2104 does not display anything, thus revealing that no function can currently be used.

FIG. 36B shows the display content in the state of FIG. 35B. Here, only the copy function is shown in the display unit 2104, and it is possible to recognize that the copy function is usable.

FIG. 36C shows the display content in the state of FIG. 35C. All of the functions that the digital multifunction peripheral 10 has are displayed in the display unit 2104, and all of the functions can be used in this state.

Figure 37A:
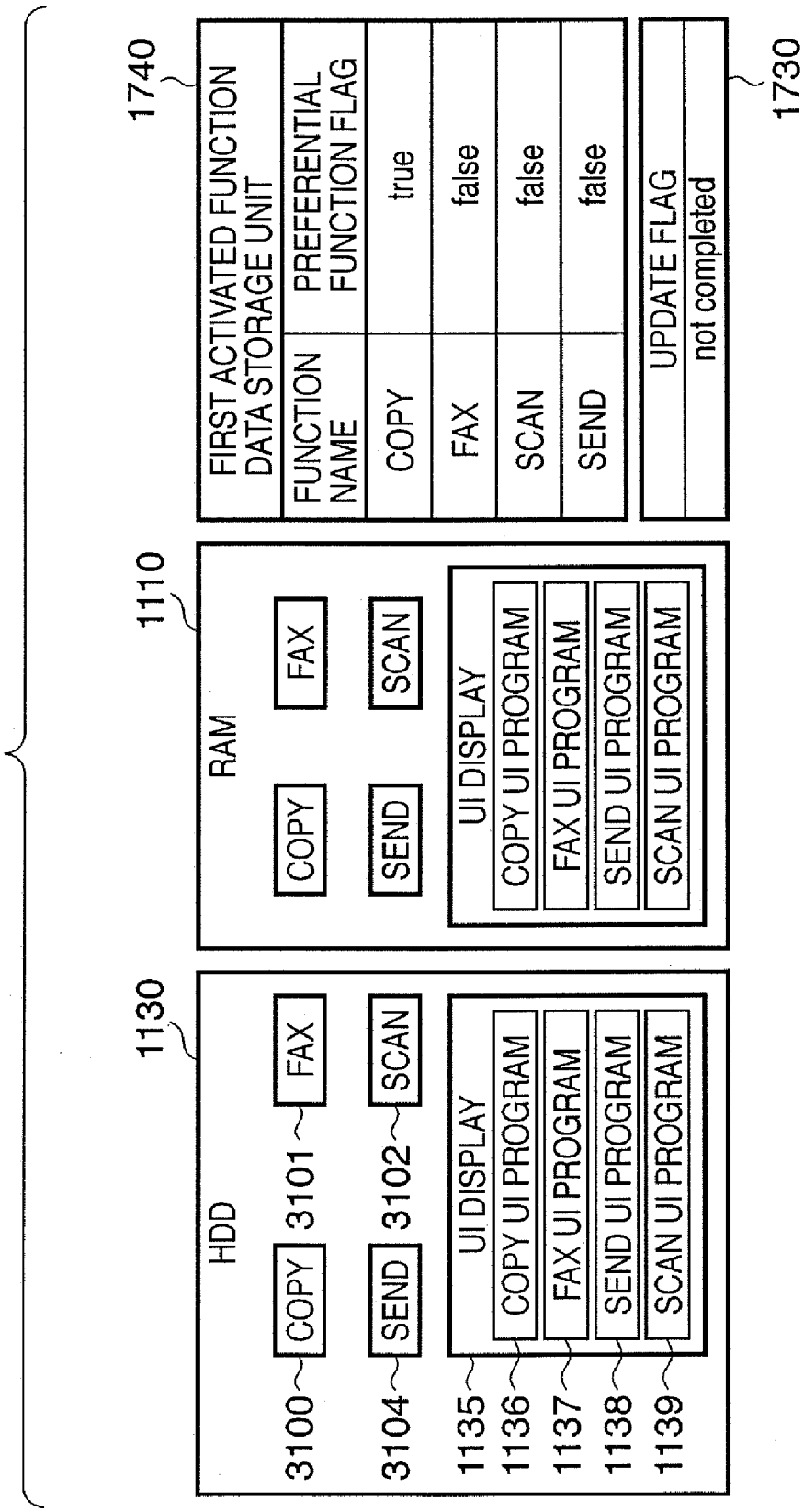
FIGS. 37A and 37B are diagrams showing states of the HDD, RAM, first activated function data storage unit, and update flag when the first activated function data is updated in the digital multifunction peripheral according to the fourth embodiment.
Figure 37B:
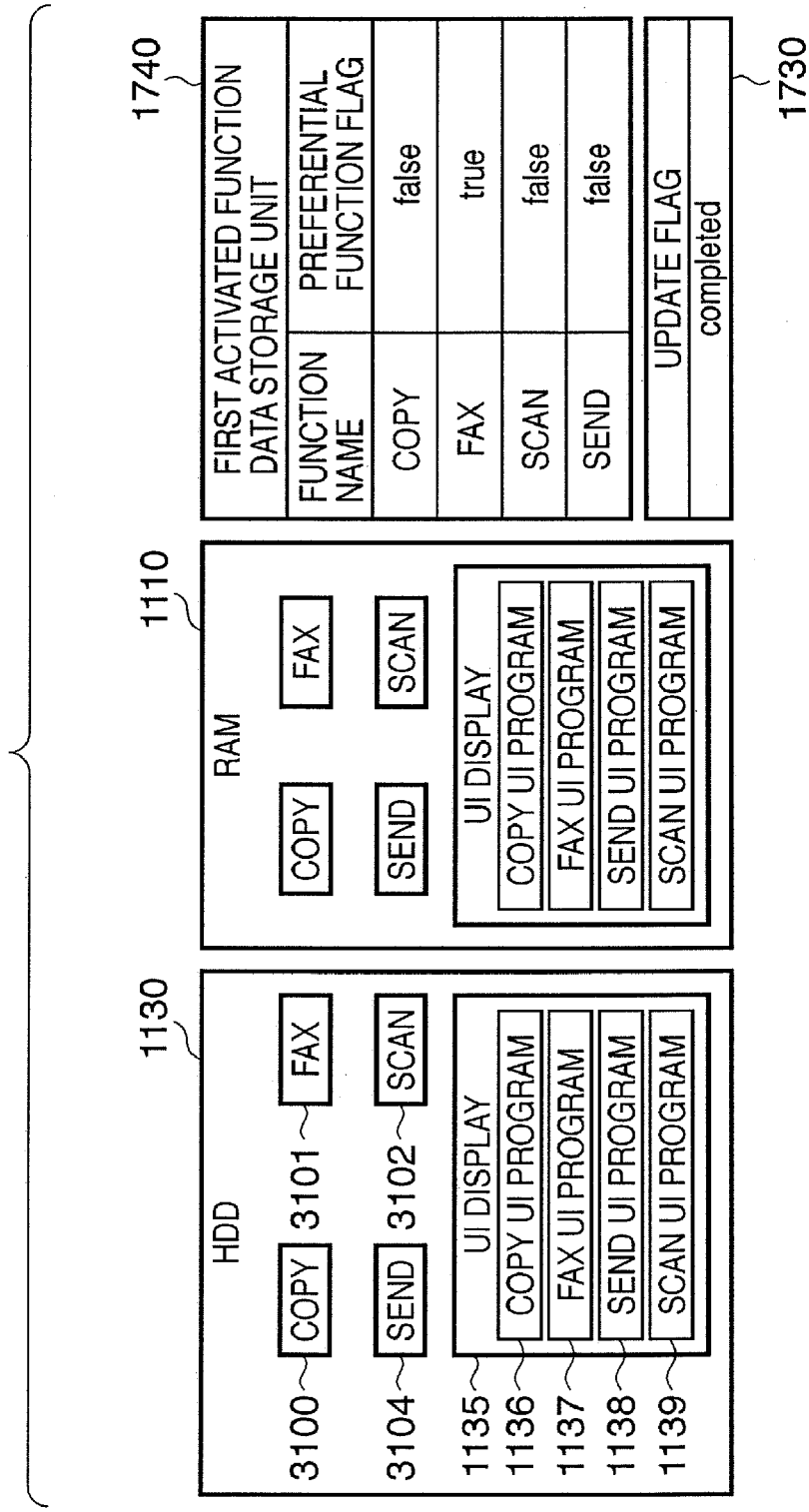

FIG. 37A and 37B are diagrams describing the state of the HDD 1130, the RAM 1110, the first activated function data storage unit 1740, and the update flag 1730 when the first activated function data is updated in the digital multifunction peripheral 10 according to the fourth embodiment. Here, an example of when a job using the fax function has been issued first is described.

FIG. 37A is a diagram describing the state of the HDD 1130, the RAM 1110, the first activated function data storage unit 1740, and the update flag 1730 when the power has been turned on and all of the function programs have been loaded into the RAM 1110. Here, because the preferential function flag of the copy function of the first activated function data storage unit 1740 has been set to "true", the copy function program is preferentially loaded into the RAM 1110.

FIG. 37B is a diagram describing the state of the HDD 1130, the RAM 1110, the first activated function data storage unit 1740, and the update flag 1730 when a job using the fax function has been issued first. Here, the preferential function flag of the fax function of the first activated function data storage unit 1740 is set to "true", and the preferential function flag of the copy function is set to "false". Moreover, the update flag 1730 is set to "completed".

As explained above, according to the fourth embodiment, upon turning the power on or after recovering from the sleep mode, the function that is executed first after power on is set the function that is preferentially started up the next time the power is turned on. Thus, at the time of powering on, the function program for executing the function can be preferentially loaded into RAM and executed. Also, because executable functions are displayed according to the load state of that function program, a user-friendly digital multifunction peripheral is afforded to the user.

Fifth Embodiment

FIG. 38 is a diagram showing an example of data contained in a first activated function log storage unit 1720 according to the fifth embodiment of the present invention.

This first activated function log storage unit 1720 is composed of 3 items, i.e., function name, number of times used, and loaded flag, and stores a log in which functions that were used as first activated functions are recorded. Function names denote their respective functions, and are data that are used to specify programs for implementing functions. The number of times a function has been used first upon turning the digital multifunction peripheral on or recovering from the sleep mode requiring boot steps also required during power on is recorded as the number of times used. Under the loaded flag column, a value of "true" indicates that the corresponding function program has been loaded into the RAM 1110.

Figure 39:
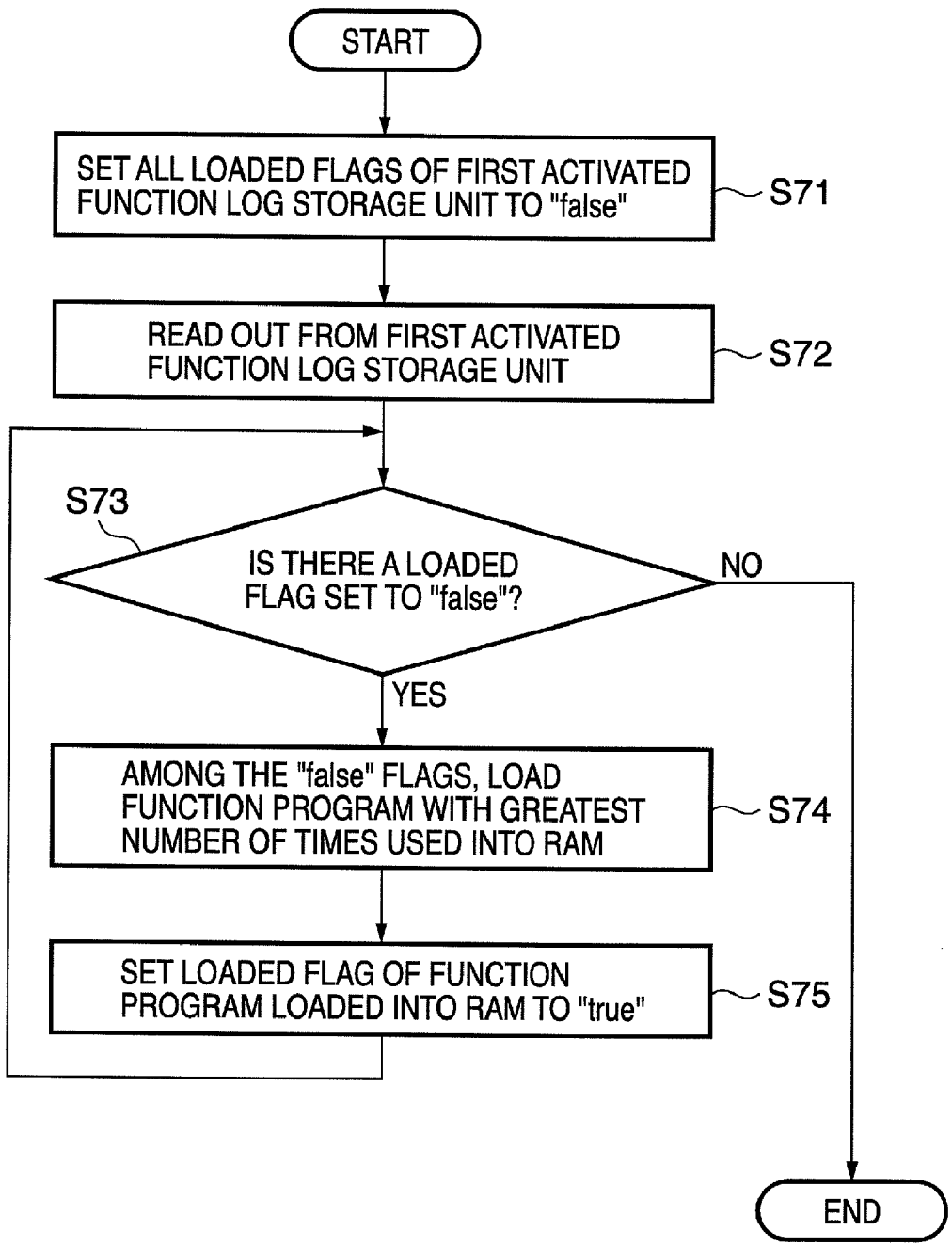
FIG. 39 is a flowchart showing start up processing of the digital multifunction peripheral according to the fifth embodiment of the present invention.

FIG. 39 is a flowchart showing the start up process of the digital multifunction peripheral 10 according to the fifth embodiment of the present invention. A program for executing this process is stored in the ROM 1120 and is executed under the control of the CPU 1100. This process is started when the digital multifunction peripheral 10 is turned on or upon recovering from the sleep mode requiring boot steps also implemented when powering on.

First, at Step S71, all of the loaded flags of the first activated function log storage unit 1720 are set to "false". Next, at Step S72, the first activated function log is read out from the first activated function load storage unit 1720. Next, at Step S73, it is determined whether there is "false" among the loaded flags of the first activated function log, that is, whether or not there is a program that has not yet been loaded. If the "false" exists, the process advances to Step S74, and the program corresponding to the function having the most number of times (number of times used) out of the functions whose loaded flags are "false", is loaded into the RAM 1110 from the HDD 1130, as the function that is started up as the first activated function. In this way, after the loading of the program is completed, the loaded flag of that program that has just been loaded is set to "true" at Step S75. Next, the process returns to Step S73, and it is determined whether there is a loaded flag of the first activated function log storage unit 1720 that has the value "false". The absence of a "false" value indicates that all function programs have been loaded into the RAM 1110 from the HDD 1130, and therefore the loading process into the RAM 1110 is ended.

FIGS. 40A and 40B, and 41A and 41B are diagrams that describe the state of the HDD 1130, the RAM 1110, and the first activated function log storage unit 1720 at the time of start up of the digital multifunction peripheral 10 according to the fifth embodiment. Here, the first activated function data storage unit 1740 is in the state indicated in FIG. 38, and an example of starting up the digital multifunction peripheral 10 according to the flowchart of FIG. 39 will be described.

Figure 40A:
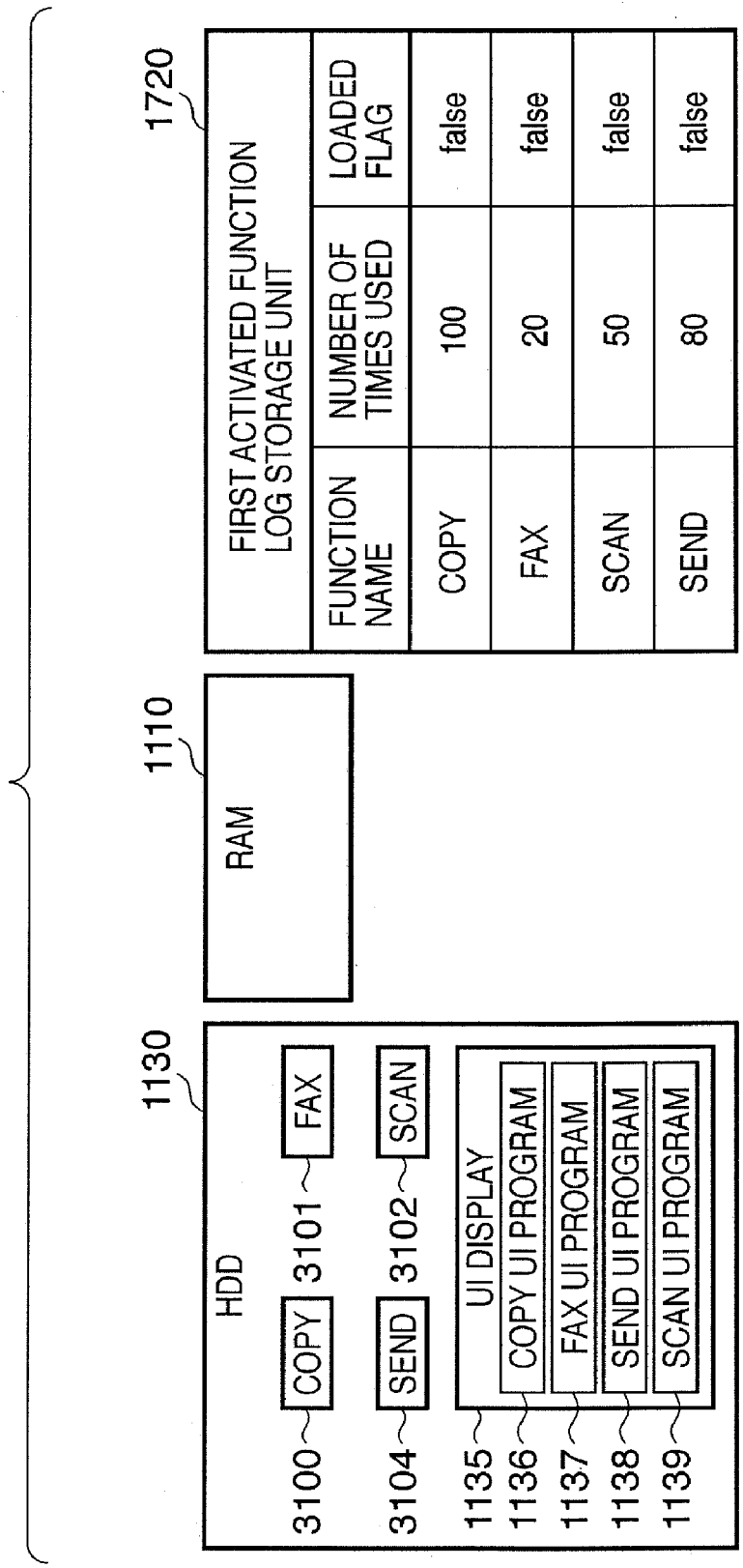
FIGS. 40A, 40B and FIGS. 41A, 41B are diagrams showing states of the HDD, RAM, and first activated function log storage unit at the time of start up of the digital multifunction peripheral according to the fifth embodiment of the present invention.

FIG. 40A is a diagram showing the HDD 1130, the RAM 1110, and the first activated function log storage unit 1720 immediately after the power of the digital multifunction peripheral 10 is turned on. Here, no program has been loaded into the RAM 1110.

Figure 40B:
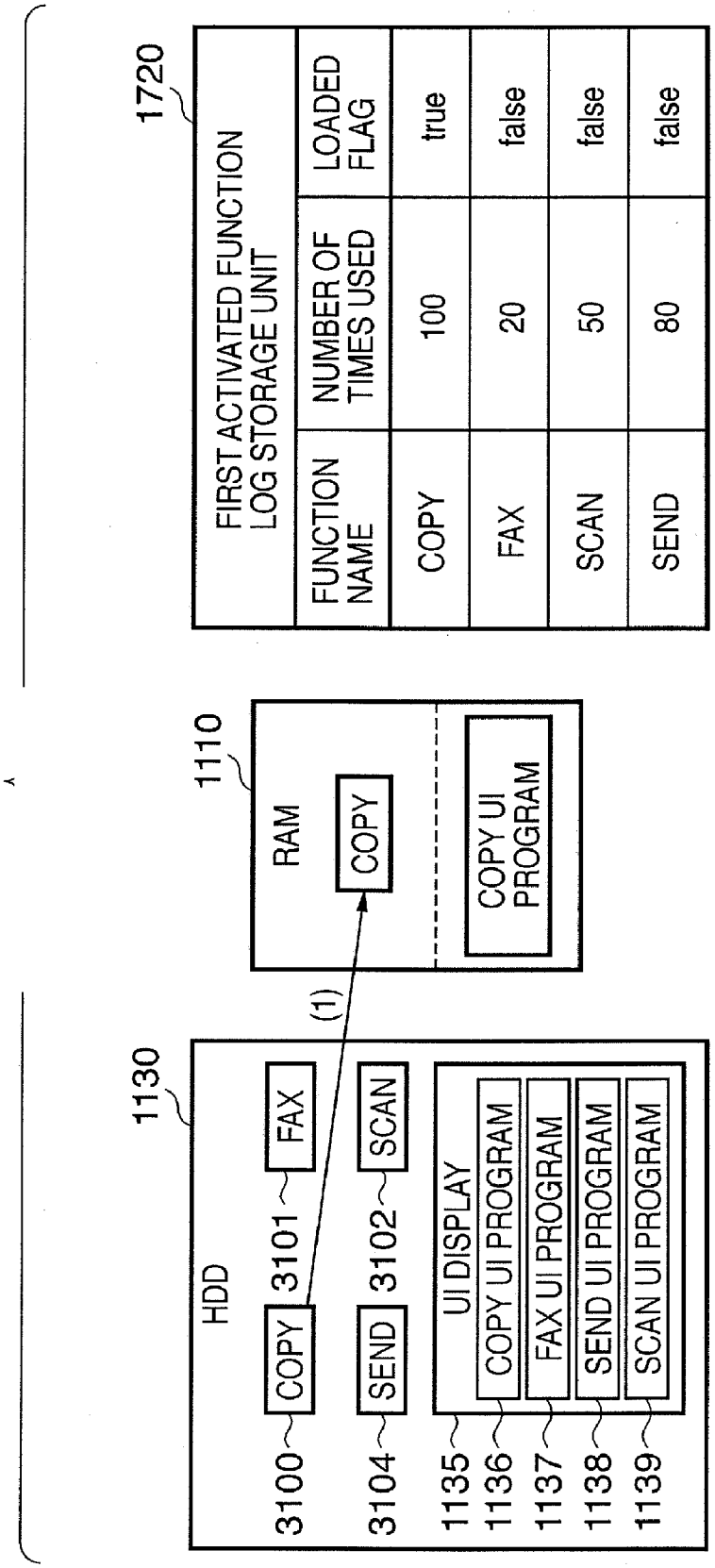

FIG. 40B is a diagram showing the state in which only the copy function program 3100 has been loaded into the RAM 1110. Here, the copy function program, which has the greatest number of times (100) used, is first loaded into the RAM 1110 based on the number of times used stored in the first activated function log storage unit 1720. In this state, the loaded flag of only the copy function of the first activated function log storage unit 1720 is set to "true".

Figure 41A:
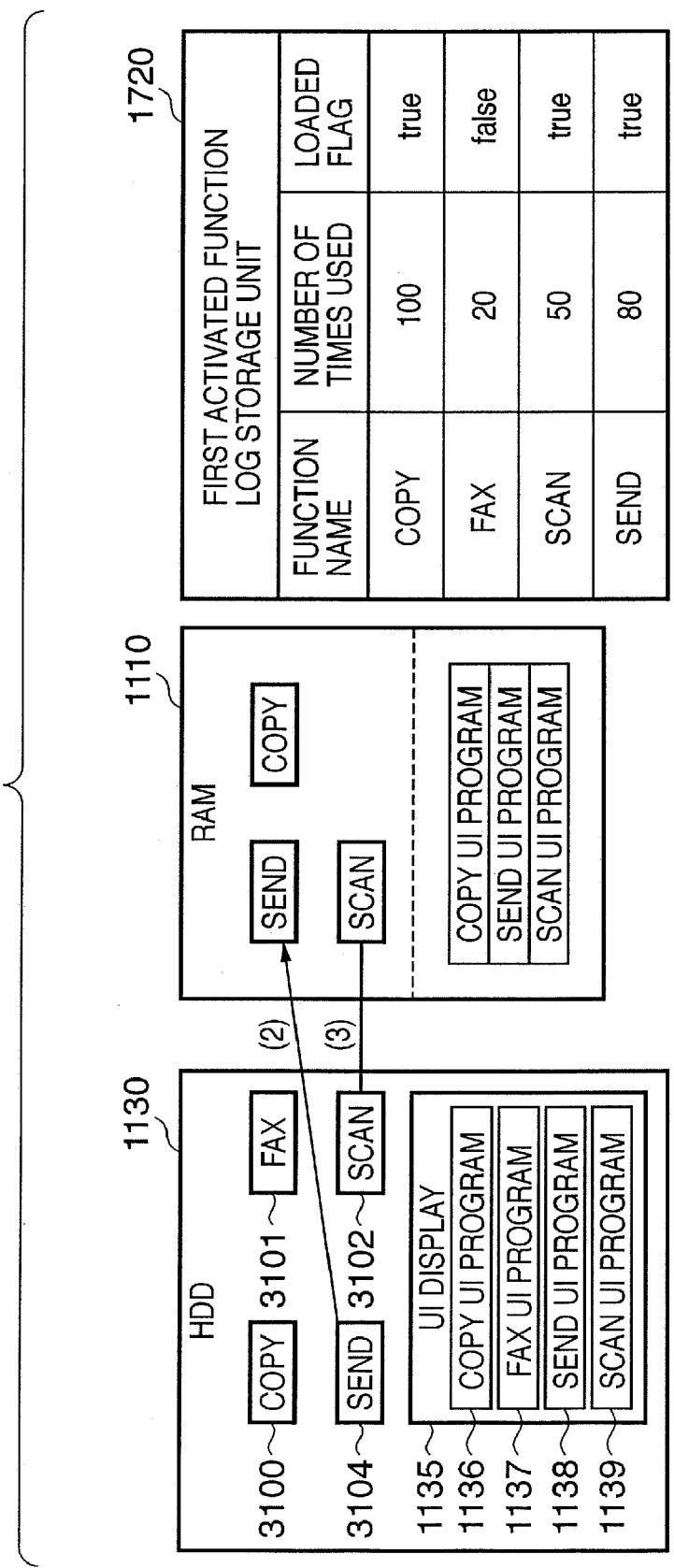

FIG. 41A shows the situation in which, after the copy function program has been loaded into the RAM 1110, the send function program 3104 (with the next highest number of times used) is then loaded, followed by the scan function program 3101 (with the next highest number of times used). In this situation, the loaded flags of the copy function program, the second function program, and the scan function program of the first activated function log storage unit 1720 has been set to "true".

Figure 41B:
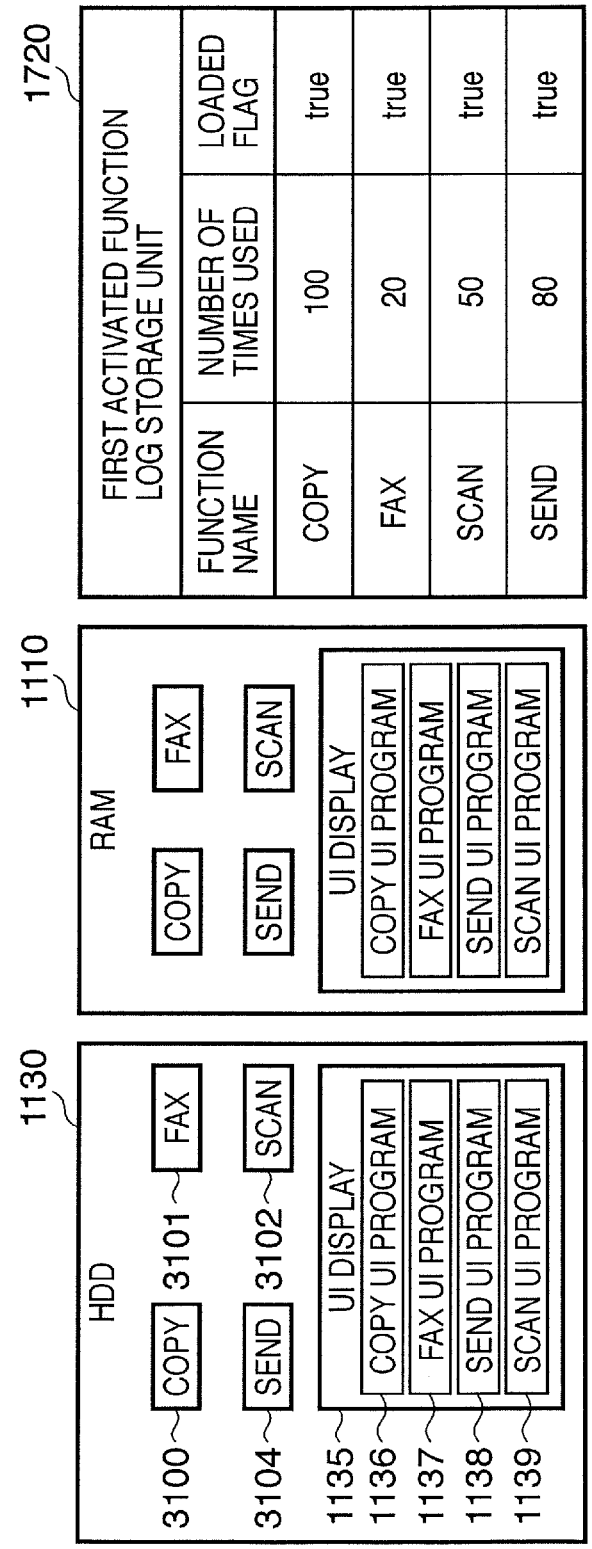

Further, FIG. 41B shows the state in which all of the function programs have been loaded into the RAM 1110. In this state, the loaded flags of the programs corresponding to all of the functions in the first activated function log storage unit 1720 are set to "true".

Figure 42:
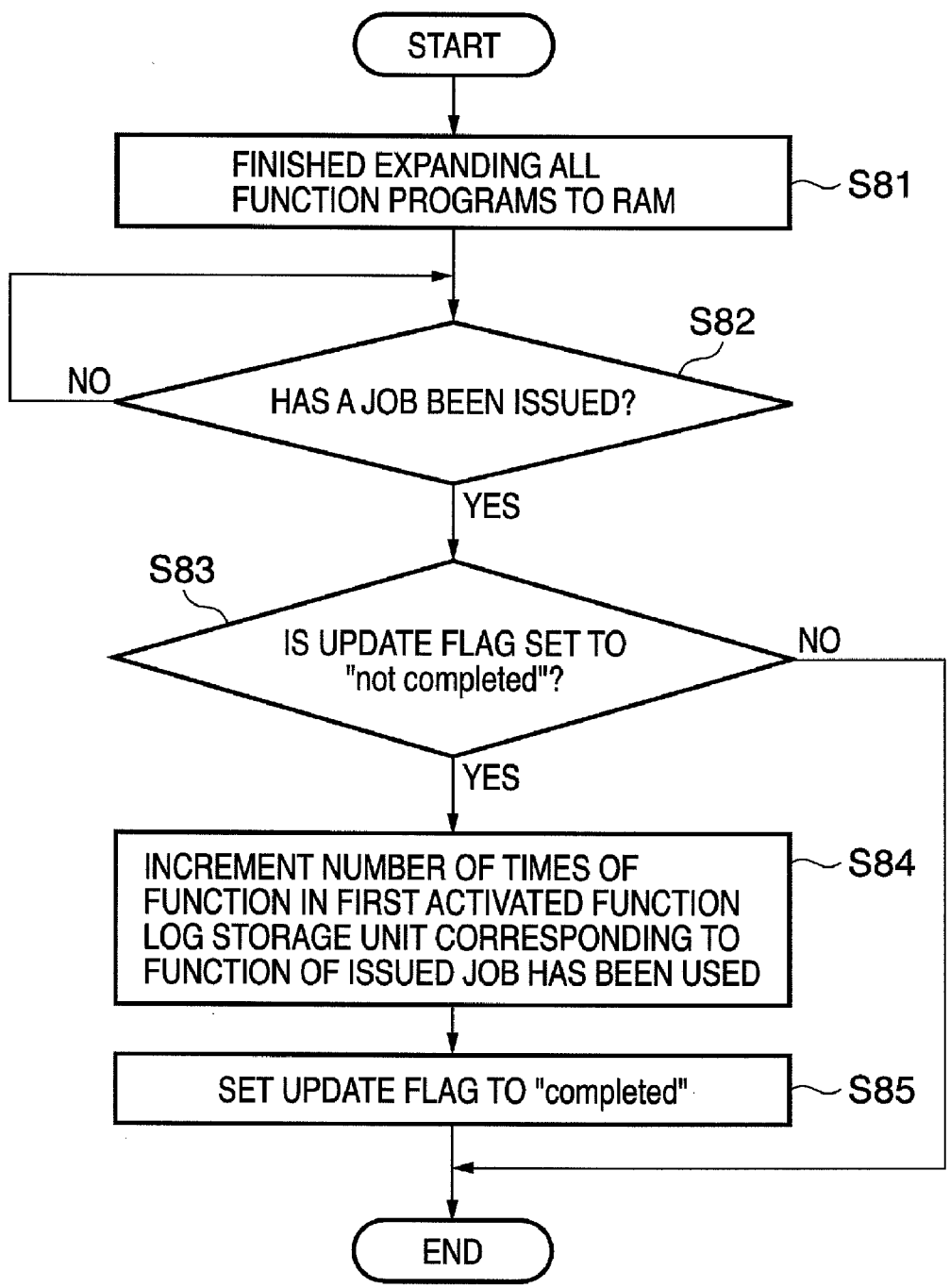
FIG. 42 is a flowchart showing an update process of a first activated function log of a digital multifunction peripheral according to the fifth embodiment.

FIG. 42 is a flowchart showing update processing of the first activated function log storage unit 1720 of the digital multifunction peripheral 10 according to the fifth embodiment. The program that executes this function is stored in the ROM 1120, and is executed under the control of the CPU 1100. This process is started when the digital multifunction peripheral 10 is turned on, or upon recovering from the sleep mode requiring boot steps also implemented when turning the power on.

First, at Step S81, loading of all of function programs from the HDD 1130 to the RAM 1110 has been completed. The state at Step S81 is the state shown in FIG. 41B. Next, Step S82 involves waiting for a user to issue a job, and, when the job has been issued, reading out the update flag 1730 at Step S83. If the value of the read out flag is "completed", the process is ended. On the other hand, if the value of the read out flag is "not completed", the process advances to Step S84, and the number of times of usage of the function of the first activated function log storage unit 1720 corresponding to the function used by the issued job is incremented by 1. Next, at Step S85, the value of the update flag 1730 is set to "completed".

The job executed at Step S82 can be executed even if all function programs have not been loaded into the RAM 1110 from the HDD 1130 at Step S81, as long as the program for the function to be used by the issued job has been loaded into the RAM 1110. Thus, Steps S83 through S85 are preferentially executed when the issued job is executed.

Figure 43A:
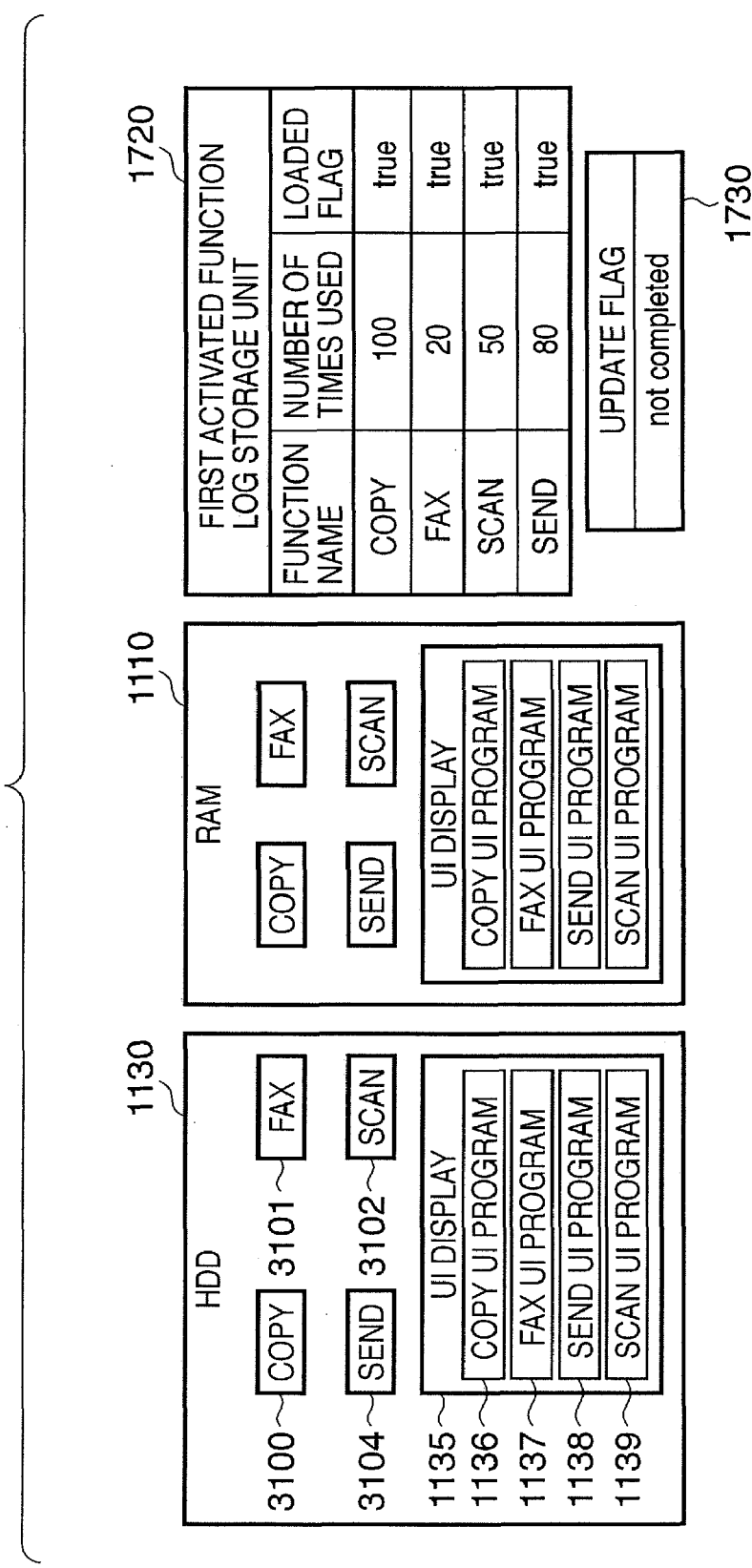
FIGS. 43A, 43B and FIG. 44 are diagrams showing states of an HDD, RAM, first activated function log storage unit, and update flag, in a case that the first activated function log of the digital multifunction peripheral is updated according to the fifth embodiment.
Figure 43B:
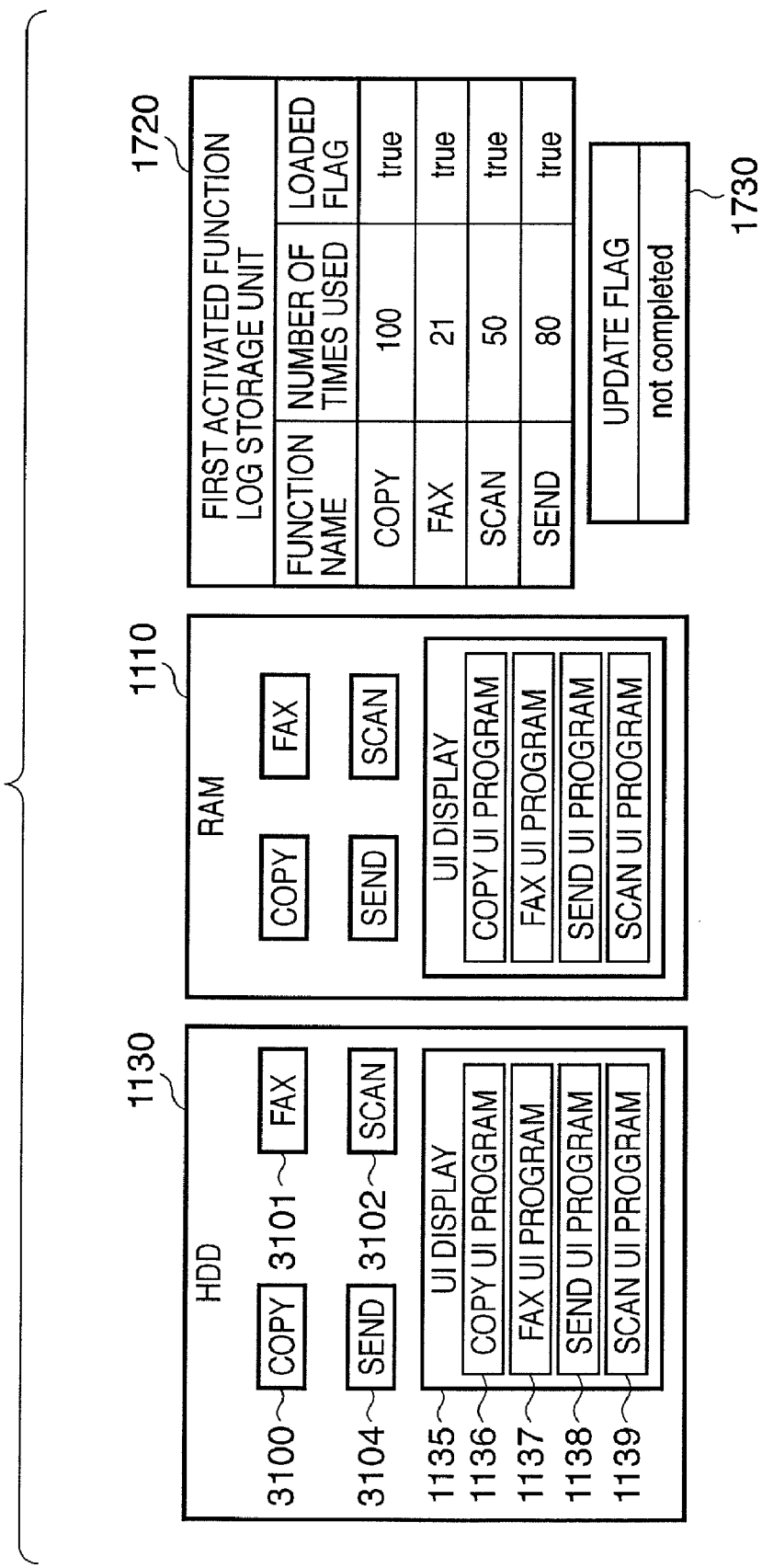
Figure 44:
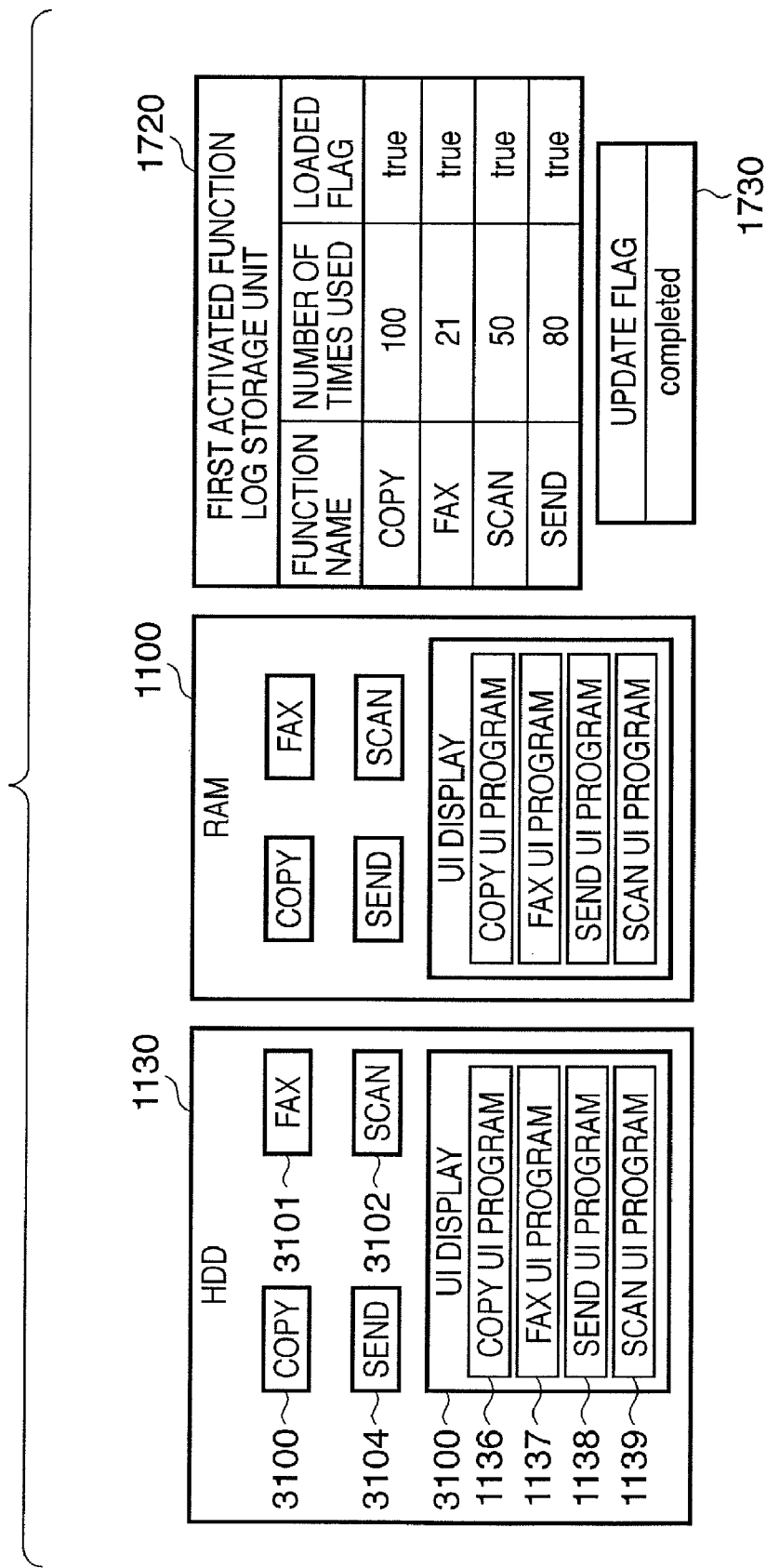

FIGS. 43A and 43B, as well as FIG. 44 are diagrams that describe the state of the HDD 1130, the RAM 1110, the first activated function log storage unit 1720, and the update flag 1730 at the time of updating the first activated function log.

Here, the original state of the first activated function log storage unit 1720 is the state shown in FIG. 38. After turning the power on, an example in which a job that first uses the fax function has been issued will be described.

FIG. 43A is a diagram that shows the state of the HDD 1130, the RAM 110, the first activated function log storage unit 1720, and the update flag 1730 when all function programs have been loaded into the RAM 1110.

FIGS. 43B and 44 are diagrams that show the state of the HDD 1130, the RAM 1110, the first activated function log storage unit 1720, and the update flag 1730 when a job first using the fax function has been issued from the state of FIG. 43A. First, when the fax job is issued, the number of times indicating that the fax function of the first activated function log storage unit 1720 has been used is incremented by 1, as indicated by FIG. 43B. This corresponds to the state of having executed up to Step S84 of the flowchart of FIG. 42. Next, as indicated in FIG. 44, the update flag 1730 is rewritten to "completed". The flowchart of FIG. 42 shows the state in which up to Step S85 has been executed.

As explained above, according to the fifth embodiment, after electric power is turned on, the function program having the greatest number of times indicating that the function has been first started up is preferentially loaded into RAM and the function becomes executable. Consequently, the probability that the function desired by a user is rapidly launched becomes higher. In this manner, a user-friendly digital multifunction peripheral can be afforded to the user.

Other Embodiments

As described above, embodiments of the present invention have been described in detail. However, the present invention can also be applied to systems configured by a plurality of devices, or can be applied to an apparatus consisting of one device only.

Moreover, the present invention is also achieved by directly or indirectly supplying to a system or device, software programs that implement the functions of the above embodiments, wherein the computer of the system or device reads out the programs supplied to it and executes them. In this case, as long as the functionality of a program is present, the embodiment need not have a program.

Therefore, in order to implement the function processing of the present invention in a computer, the program code itself installed in that computer is for implementing the present invention. That is, in the claims of the present invention, computer programs themselves, which implement the function processing of the present invention, are included. In this case, the format of the program, whether it be object code, a program executed by a interpreter, or script data supplied by an OS, does not matter as long as it has the functionality of a program.

A variety of storage media can be used to supply the program. For example, the following media can be used: floppy (registered trademark) disk, hard disk, optical disk, magneto-optical disk, MO, CD-ROM, CD-R, CD-RW, magnetic tape, non-volatile memory card, ROM, DVD (DVD-ROM, DVD-R), etc.

As another method of supplying a program, a web page can be accessed through the Internet using a browser on a client computer, and the program can be downloaded to a storage medium such as a hard disk through the web page. In this case, what is downloaded may be the computer program itself of the present invention, or a compressed file that has an automatic installation function. It is also possible to implement the present invention by dividing program code that comprise the program of the present invention into a plurality of files, and then downloading each file from different web pages. In other words, the claims of the present invention include a WWW server that makes a plurality of users download program files for implementing the function processing of the present invention.

Moreover, the present invention can also take the form of encoding the program and storing it on a storage medium such as a CD-ROM and delivering it to users. In this case, a user who has passed a predetermined condition can log on to a web page on the Internet and download a key containing data for decoding the program and install the program on the user's computer.

In addition, it is also possible to implement the present invention by having the computer execute the read out program. For example, an OS operating on a computer can carry out all or part of the actual processing according to instructions by that program, and actualize the function described in the above embodiments.

Furthermore, it is also possible to have the program read out from the storage medium be written in the memory of a function expansion unit connected to a computer or a function expansion board inserted into a computer. In this case, a CPU built into the function expansion board or function expansion unit can perform all or part of the actual processing according to the instructions by that program, and the function of the previously described embodiments can be implemented through this process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-053803, filed Feb. 28, 2006, which is hereby incorporated by reference herein in its entirety.

What is claimed is:

1. An apparatus capable of executing a plurality of functions, comprising:

a first storage unit configured to store a plurality of programs corresponding respectively to a plurality of functions;

a second storage unit different from the first storage unit and configured to store a first program to be preferentially loaded into a memory for implementing the first program, among the plurality of programs, the memory being different from the first storage unit and the second storage unit;

a first load control unit configured to preferentially load the first program stored in said second storage unit into the memory;

a second load control unit configured to load a second program stored in said first storage unit which differs from the first program stored in said second storage unit into the memory, after the first load control unit preferentially loads the first program stored in said second storage unit into the memory; and a change unit configured to replace the first program stored in said second storage unit with another program different from the first program and stored in said first storage unit, so that the another program is next to be preferentially loaded into the memory by the first load control unit instead of the first program, wherein the second storage unit is configured to operate faster than the first storage unit, wherein the second storage unit is configured to store the first program to be preferentially loaded at power on of the apparatus into the memory for implementing the first program, among the plurality of programs, wherein the first load control unit is configured to preferentially load the first program stored in said second storage unit into the memory upon powering on the apparatus, wherein the apparatus further comprises a determining unit configured to determine that the another program different from the first program is selected for execution at a time of receiving an instruction to turn off power to the apparatus, and to consequently determine that the another program is to be preferentially loaded at next power on of the apparatus into the memory instead of the first program, and wherein said change unit is configured to replace the first program stored in said second storage unit with the another program, which is stored in said first storage unit, so that the another program is preferentially loaded at next power on of the apparatus into the memory by the first load control unit instead of the first program.

2. The apparatus according to claim 1, further comprising a display unit configured to display a message indicating that a function corresponding to the first program loaded into the memory is executable.

3. The apparatus according to claim 1, further comprising:
a timer unit configured to supply time information; and
a function identification storage unit configured to store function identification data for specifying a function to be preferentially started up according to a time,
wherein said change unit is configured to replace the first program in said second storage unit with the another program according to the time indicated by time information supplied by said timer unit, wherein the another program corresponds to a function expressed by the function identification data stored in said function identification storage unit.

4. The apparatus according to claim 3, wherein if the time information supplied by said timer unit indicates a predetermined time, said change unit is configured to replace the first program in said second storage unit with the another program corresponding to the predetermined time.

5. The apparatus according to claim 1, wherein said change unit is configured to replace the first program with the another program, which corresponds to a function that was first used after powering on said apparatus or recovering from a power saving mode.

6. The apparatus according to claim 1, further comprising a prohibit unit configured to prohibit replacing of the another program by said change unit after replacing of the first program by said change unit, until the next time power is turned on or recovery from a power saving mode is achieved.

7. A method for controlling an apparatus including a first storage unit for storing a plurality of programs which correspond respectively to a plurality of functions, comprising:
a first load step of preferentially loading into a memory a first program stored in a second storage unit, the first program being one of the plurality of programs that is to be preferentially started up out of the plurality of programs, the second storage unit being different from the first storage unit, the second storage unit being configured to operate faster than the first storage unit, and the memory being different from the first storage unit and the second storage unit;
a second load step of loading, after the first program stored in said second storage unit has been preferentially loaded into the memory in the first load step, a second program stored in said first storage unit that differs from the first program stored in said second storage unit into the memory; and
a change step of replacing the first program stored in said second storage unit with another program different from the first program and stored in said first storage unit, so that the another program is next to be preferentially loaded into the memory instead of the first program,
wherein the first program is to be preferentially loaded at power on of the apparatus into the memory for implementing the first program, among the plurality of programs,
wherein the first load step preferentially loads the first program stored in said second storage unit into the memory upon powering on the apparatus,
wherein the method further comprises a determining step of determining that the another program different from the first program is selected for execution at a time of receiving an instruction to turn off power to the apparatus, and consequently determining that the another program is to be preferentially loaded at next power on of the apparatus into the memory instead of the first program, and
wherein in said change step, the first program stored in said second storage unit is replaced with the anotherprogram, which is stored in said first storage unit, so that the another program is preferentially loaded at next power on of the apparatus into the memory instead of the first program.

8. The method according to claim 7, further comprising a step of displaying a message indicating that a function corresponding to the first program loaded into the memory is executable.

9. The method according to claim 7, further comprising a function identification storage step of storing function identification data for specifying a function to be preferentially started up according to time,
wherein in said change step, according to the time, the first program stored in said second storage unit is replaced with the another program, which corresponds to the function identification data stored in said function identification storage step.

10. The method according to claim 9, wherein in said change step, if it is a predetermined time, the first program stored in said second storage unit is replaced with the another program corresponding to the predetermined time.

11. The method according to claim 7, wherein in said change step, the first program stored in said second storage unit is replaced with the another program, which corresponds to a function used first either after power of said apparatus is turned on or after recovering from a power saving mode.

12. The method according to claim 7, further comprising a prohibit step of prohibiting replacing of the another program after replacing the first program program in said change step, until a next time power of said apparatus is turned on or recovery is achieved from the power saving mode.

13. A non-transitory computer-readable storage medium storing a program that, when executed by a computer in an apparatus including a first storage unit for storing a plurality of programs which correspond respectively to a plurality of functions, causes the computer to execute a control method, the method comprising the steps of:

a first load step of preferentially loading into a memory a first program stored in a second storage unit, the first program being one of the plurality of programs that is to be preferentially started up out of the plurality of programs, the second storage unit being different from the first storage unit, the second storage unit being configured to operate faster than the first storage unit, and the memory being different from the first storage unit and the second storage unit;

a second load step of loading, after the first program stored in said second storage unit has been preferentially loaded into the memory in the first load step, a second program stored in said first storage unit that differs from the first program stored in said second storage unit into the memory; and a change step of replacing the first program stored in said second storage unit with another program different from the first program and stored in said first storage unit, so that the another program is next to be preferentially loaded into the memory instead of the first program, wherein the first program is to be preferentially loaded at power on of the apparatus into the memory for implementing the first program, among the plurality of programs, wherein the first load step preferentially loads the first program stored in said second storage unit into the memory upon powering on the apparatus, wherein the method further comprises a determining step of determining that the another program different from the first program is selected for execution at a time of receiving an instruction to turn off power to the apparatus, and consequently determining that the another program is to be preferentially loaded at next power on of the apparatus into the memory instead of the first program, and wherein in said change step, the first program stored in said second storage unit is replaced with the another program, which is stored in said first storage unit, so that the another program is preferentially loaded at next power on of the apparatus into the memory instead of the first program.

* * * * *